United States Patent
Jang et al.

(10) Patent No.: US 12,464,395 B2
(45) Date of Patent: Nov. 4, 2025

(54) METHOD AND APPARATUS FOR REPORTING CHANNEL STATE INFORMATION IN WIRELESS COMMUNICATION SYSTEMS

(71) Applicant: Samsung Electronics Co., Ltd., Suwon-si (KR)

(72) Inventors: Youngrok Jang, Suwon-si (KR); Jaeyeon Shim, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 17/817,316

(22) Filed: Aug. 3, 2022

(65) Prior Publication Data
US 2023/0090986 A1 Mar. 23, 2023

(30) Foreign Application Priority Data
Aug. 3, 2021 (KR) ........................ 10-2021-0102121

(51) Int. Cl.
*H04B 17/20* (2015.01)
*H04B 17/24* (2015.01)
(Continued)

(52) U.S. Cl.
CPC .......... *H04W 24/10* (2013.01); *H04B 17/204* (2023.05); *H04B 17/24* (2015.01);
(Continued)

(58) Field of Classification Search
CPC ..... H04B 7/02–12; H04B 17/0082–409; H04J 11/0023–0093;
(Continued)

(56) References Cited

U.S. PATENT DOCUMENTS

| | | |
|---|---|---|
| 2013/0301450 A1 | 11/2013 | Geirhofer et al. |
| 2019/0159215 A1 | 5/2019 | Su et al. |

(Continued)

FOREIGN PATENT DOCUMENTS

| | | |
|---|---|---|
| WO | 2019100257 A1 | 5/2019 |
| WO | 2021071337 A1 | 4/2021 |

OTHER PUBLICATIONS

Supplementary European Search Report dated Sep. 26, 2024, in connection with European Application No. 22853471.5, 9 pages.
(Continued)

*Primary Examiner* — Timothy J Weidner

(57) ABSTRACT

A method of reporting channel state information by first user equipment (UE) includes receiving, from a base station, channel measurement resource (CMR) configuration information, receiving, from at least one second UE, uplink interference measurement resource (UL IMR) configuration information for measurement of cross link interference (CLI) between the at least one second UE and the first UE, measuring one or more signal to interference pulse noise ratio (SINR) based on at least one downlink reference signal (DL RS) received on CMR identified from the CMR configuration information and at least one uplink reference signal (UL RS) received on UL IMR identified from the UL IMR configuration information; and transmitting, to the base station, information about the measured one or more SINR.

20 Claims, 22 Drawing Sheets

(51) Int. Cl.
| | |
|---|---|
| *H04B 17/336* | (2015.01) |
| *H04J 11/00* | (2006.01) |
| *H04L 5/00* | (2006.01) |
| *H04W 8/22* | (2009.01) |
| *H04W 24/10* | (2009.01) |
| *H04W 56/00* | (2009.01) |
| *H04W 72/23* | (2023.01) |
| *H04W 72/25* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ......... *H04B 17/252* (2023.05); *H04B 17/336* (2015.01); *H04J 11/0026* (2013.01); *H04J 11/0066* (2013.01); *H04L 5/0051* (2013.01); *H04L 5/0057* (2013.01); *H04W 8/22* (2013.01); *H04W 56/001* (2013.01); *H04W 72/23* (2023.01); *H04W 72/25* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC ...... H04J 2011/0003–0096; H04L 5/00–0098; H04W 8/22–245; H04W 24/00–10; H04W 36/0005–385; H04W 56/001–0025; H04W 72/02–569; H04W 84/02–16; H04W 88/02–12; H04W 92/02–04; H04W 92/10; H04W 92/16–18
See application file for complete search history.

(56) References Cited

U.S. PATENT DOCUMENTS

2020/0389805 A1  12/2020  Kim et al.
2023/0319605 A1  10/2023  Park et al.

OTHER PUBLICATIONS

International Search Report and Written Opinion of the International Searching Authority dated Oct. 28, 2022, in connection with International Application No. PCT/KR2022/011500, 8 pages.
3GPP TS 38.133 V17.2.0 (Jun. 2021), Technical Specification, 3rd Generation Partnership Project; Technical Specification Group Radio Access Network; NR; Requirements for support of radio resource management (Release 17), Jun. 2021, 3177 pages.

METHOD AND APPARATUS FOR REPORTING CHANNEL STATE INFORMATION IN WIRELESS COMMUNICATION SYSTEMS

CROSS-REFERENCE TO RELATED APPLICATION

This application is based on and claims priority under 35 U.S.C. § 119 to Korean Patent Application No. 10-2021-0102121, filed on Aug. 3, 2021, in the Korean Intellectual Property Office, the disclosure of which is incorporated by reference herein in its entirety.

BACKGROUND

1. Field

The disclosure relates to a method and apparatus for reporting channel state information in a wireless communication system.

2. Description of the Related Art

In order to meet increasing demand with respect to wireless data traffic after the commercialization of 4th generation (4G) communication systems, efforts have been made to develop 5th generation (5G) or pre-5G communication systems. For this reason, the 5G or pre-5G communication systems are also called beyond 4G network communication systems or post long term evolution (LTE) systems. In order to achieve a high data rate, 5G communication systems are being considered to be implemented in an ultra-high frequency band (millimeter wave (mmWave)), e.g., a band of 60 GHz. In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and received-interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances, and advanced medical services through convergence and combination between existing information technology (IT) and various industrial applications.

Accordingly, various attempts have been made to apply 5G communication systems to IoT networks. For example, technologies related to sensor networks, M2M communication, and MTC are being implemented by using 5G communication technology including beamforming, MIMO, and array antennas. The application of cloud radio access networks (cloud-RAN) as the above-described big data processing technology may also be an example of convergence of 5G technology and IoT technology.

As various services may be provided with the development of wireless communication systems as described above, there is a demand for a method of seamlessly providing the various services. In particular, in order to provide a service to a user for a longer time, a method of effectively operating a dormant cell is required, and in particular, a method of reporting channel state information is required.

SUMMARY

Provided are a method and apparatus for reporting channel state information in a wireless communication system.

Additional aspects will be set forth in part in the description which follows and, in part, will be apparent from the description, or may be learned by practice of the presented embodiments of the disclosure.

According to an embodiment of the disclosure, a method of reporting channel state information by first user equipment (UE) includes receiving, from a base station, channel measurement resource (CMR) configuration information, receiving, from at least one second UE, uplink interference measurement resource (UL IMR) configuration information for measurement of cross link interference (CLI) between the at least one second UE and the first UE, measuring one or more signal to interference pulse noise ratio (SINR) based on at least one downlink reference signal (DL RS) received on CMR identified from the CMR configuration information and at least one uplink reference signal (UL RS) received on UL IMR identified from the UL IMR configuration information, and transmitting, to the base station, information about the measured one or more SINR.

According to another embodiment of the disclosure, a method of receiving channel state information by a base station includes transmitting, to a first user equipment (UE), channel measurement resource (CMR) configuration information, and receiving, from the first UE, information about one or more signal to interference pulse noise ratio (SINR) measured at the first UE, wherein the one or more SINR are measured based on at least one downlink reference signal (DL RS) received on CMR identified from the CMR configuration information and at least one uplink reference signal (UL RS) received on uplink interference measurement resource (UL IMR) identified from UL IMR configuration information, and the UL IMR configuration information is received at the first UE from at least one second UE for measurement of cross link interference (CLI) between the at least one second UE and the first UE.

According to another embodiment, a first user equipment (UE) configured to report channel state information includes a transceiver, and at least one processor coupled with the transceiver, wherein the at least one processor is configured to receive, from a base station, channel measurement resource (CMR) configuration information, receive, from at least one second UE, uplink interference measurement resource (UL IMR) configuration information for measurement of cross link interference (CLI) between the at least one second UE and the first UE, measure one or more signal to interference pulse noise ratio (SINR) based on at least one downlink reference signal (DL RS) received on CMR identified from the CMR configuration information and at least one uplink reference signal (UL RS) received on UL IMR identified from the UL IMR configuration information, and transmit, to the base station, information about the measured one or more SINR.

According to another embodiment, a base station configured to receive channel state information includes a transceiver, and at least one processor coupled with the transceiver, wherein the at least one processor is configured to transmit, to a first user equipment (UE), channel measurement resource (CMR) configuration information, and receive, from the first UE, information about one or more signal to interference pulse noise ratio (SINR) measured at the first UE, wherein the one or more SINR are measured based on at least one downlink reference signal (DL RS) received on CMR identified from the CMR configuration information and at least one uplink reference signal (UL RS) received on uplink interference measurement resource (UL IMR) identified, from UL IMR configuration information, and the UL IMR configuration information is received at the first UE from at least one second UE for measurement of cross link interference (CLI) between the at least one second UE and the first UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
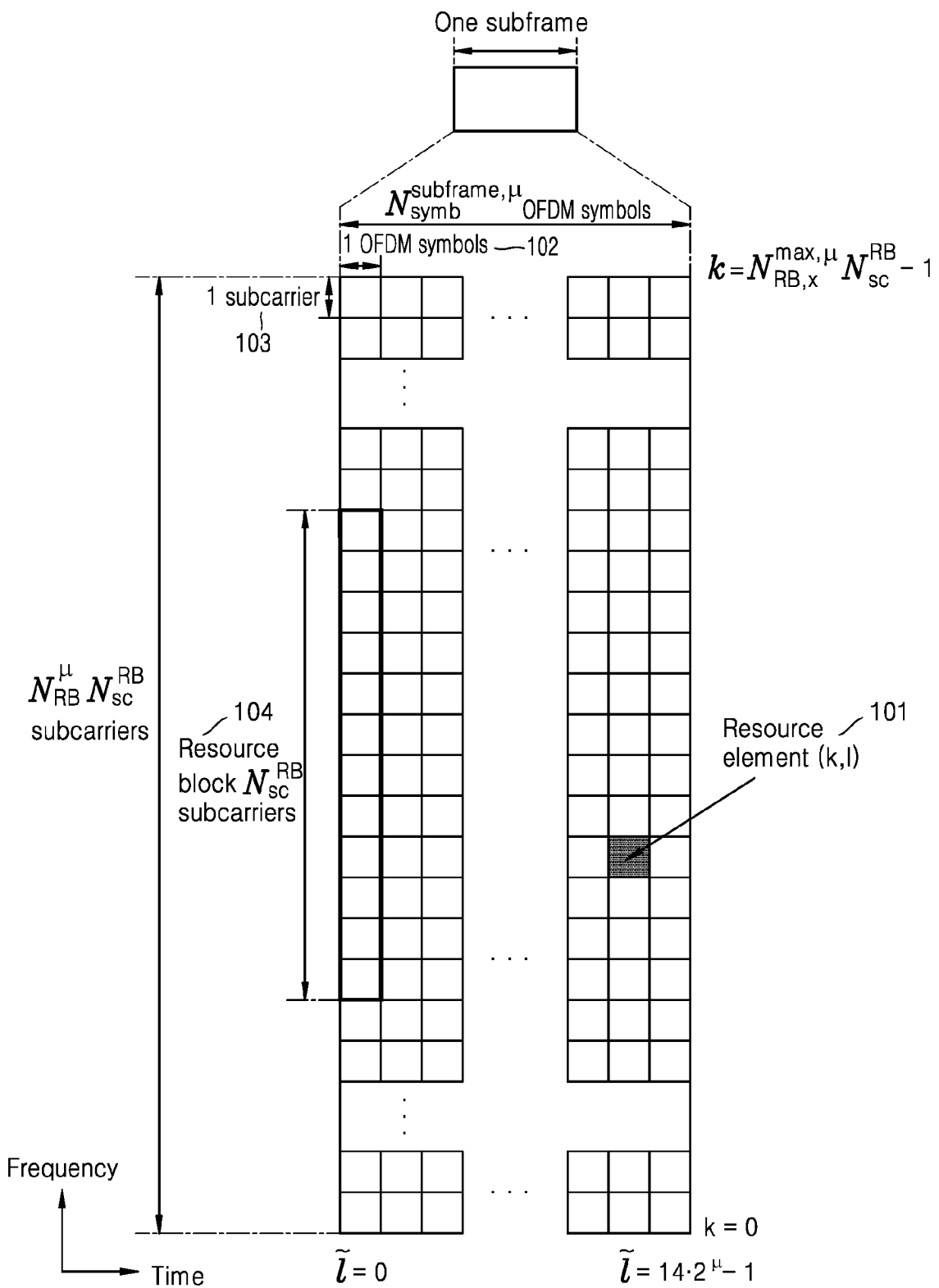
FIG. 1 illustrates a diagram of a basic structure of a time-frequency domain that is a radio resource region where data or a control channel is transmitted in a 5th generation (5G) wireless communication system.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the attached drawings.

While describing embodiments of the disclosure, descriptions of techniques that are well known in the art and not directly related to the disclosure are omitted. This is to clearly convey the gist of the disclosure by omitting an unnecessary description.

For the same reasons, some elements are exaggerated, omitted, or schematically illustrated in the drawings. In addition, the size of each element may not substantially reflect its actual size. In each drawing, the same or corresponding element is denoted by the same reference numeral.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the claims. In the specification, the same reference numerals denote the same elements. In the descriptions of the disclosure, detailed explanations of the related art are omitted when it is deemed that they may unnecessarily obscure the essence of the disclosure. The terms used herein are those defined in consideration of functions in the disclosure, and may vary according to the intention of users or operators, precedents, etc. Hence, the terms used herein have to be defined based on the meaning of the terms together with the descriptions throughout the specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Hereinafter, a base station is an entity that allocates resources to a terminal and may be at least one of a gNode B, an eNode B, a node B, a base station (BS), a radio access unit, a base station controller, or a node on a network. A terminal may include a user equipment (UE), a mobile station (MS), a cellular phone, a smartphone, a computer, or a multimedia system capable of performing a communication function. In the disclosure, a downlink (DL) denotes a wireless transmission path of a signal transmitted by a base station to a terminal, and an uplink (UL) denotes a wireless transmission path of a signal transmitted by a terminal to a base station. Hereinafter, although a long term evolution-advanced (LTE-A), or a 5th generation (5G) system is described in an embodiment of the disclosure, the embodiment of the disclosure may be applied to other communication systems having a similar technical background or channel type. For example, such communication systems may include 5th generation mobile communication systems (e.g., 5G or new radio (NR) systems) developed after LTE-A, and 5G in the following description may be a concept including existing LTE, LTE-A, and other similar services. Also, the disclosure may be applied to other communication systems through some modifications without departing from the scope of the disclosure by the judgement of one of ordinary skill in the art.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

As used herein, the term " . . . unit" means a software component or hardware component such as a field-programmable gate array (FPGA) or an application-specific integrated circuit (ASIC), and performs a specific function. However, the term " . . . unit" does not mean to be limited to software or hardware. A " . . . unit" may be configured to be in an addressable storage medium or may be configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or may be further separated into additional components and " . . . units". Furthermore, components and " . . . units" may be implemented to operate one or more central processing units (CPUs) in a device or a secure multimedia card. Also, a " . . . unit" may include one or more processors in embodiments of the disclosure.

In the following descriptions of the disclosure, well-known functions or configurations are not described in detail because they would obscure the disclosure with unnecessary details. Hereinafter, embodiments of the disclosure will be described with reference to the drawings.

A wireless communication system has evolved from an initial one that provides a voice-oriented service to a broadband wireless communication system that provides a high-speed and high-quality packet data service, using communication standards such as 3rd generation partnership project (3GPP) high speed packet access (HSPA), long-term evolution (LTE) or evolved universal terrestrial radio access (E-UTRA), LTE-advanced (LTE-A), LTE-Pro, 3GPP2 high rate packet data (HRPD), ultra-mobile broadband (UMB), and the institute of electrical and electronics engineers (IEEE) 802.16e.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a terminal (a user equipment (UE) or a mobile station (MS)) transmits data or a control signal to a base station (BS) (e.g., eNode B), and the downlink refers to a radio link through which a base station transmits data or a control signal to a terminal. In the multiple access scheme as described above, data or control information of each user may be identified by performing assignment and operation so that time-frequency resources for carrying data or control information for each user do not overlap each other, that is, orthogonality therebetween is established.

As post-LTE systems, 5G systems need to support services capable of simultaneously reflecting and satisfying various requirements of users, service providers, etc. The services considered for the 5G communication systems include enhanced mobile broadband (eMBB), massive machine type communication (mMTC), ultra reliability low latency communication (hereinafter, URLLC), etc.

The eMBB aims to provide a higher data rate than a data rate supported by the existing LTE, LTE-A, or LTE-Pro. For example, the eMBB service in the 5G systems need to provide a peak data rate of 20 gigabits per second (Gbps) for a downlink and a peak data rate of 10 Gbps for an uplink in view of a single base station. At the same time, the 5G systems need to provide an increased user-perceived data rate. In order to satisfy such requirements, improvement of various transmitting/receiving technologies including a further improved multiple-input and multiple-output (MIMO) transmission technology may be demanded. Also, in a 2 GHz band used by LTE, signals are transmitted using up to 20 MHz transmission bandwidth. However, 5G communication systems use a frequency bandwidth wider than 20 MHz in 3 to 6 GHz frequency bands or 6 GHz or higher frequency bands. Therefore, the data rate required by 5G communication systems may be satisfied.

At the same time, the mMTC service is considered for the 5G systems to support application services such as the Internet of things (IoT). The mMTC service is required to, for example, support massive user accesses within a cell, enhance terminal coverage, increase battery time, and reduce user charges in order to efficiently provide the IoT service. The IoT is attached to various sensors and various devices to provide a communication function, and thus, should be able to support many terminals (e.g., 1,000,000 terminals/km2) within a cell. Also, due to the nature of the service, the terminal supporting mMTC is likely to be located in a shaded area that is not covered by the cell, such as the basement of a building. Therefore, wider coverage than other services provided by the 5G communication systems may be required. Because the terminal supporting mMTC should include a cheap terminal and it is difficult to replace a battery of the terminal frequently, a very long battery life time (e.g., 10-15 years) may be required.

Lastly, the URLLC service is a cellular-based wireless communication service used in a mission-critical manner. For example, the URLLC may be used in remote control of robots or machinery, industrial automation, unmanned aerial vehicles, remote health care, emergency alert, etc. Thus, URLLC communication needs to provide a very low latency and a very high reliability. For example, a service supporting URLLC has to satisfy an air interface latency of less than 0.5 milliseconds and simultaneously has a requirement of a packet error rate of 10-5 or less. Therefore, for the URLLC service, the 5G systems need to provide a smaller transmit time interval (TTI) compared to other services and, at the same time, may be required to allocate a wide resource in a frequency band to ensure the reliability of a communication link.

The three services of 5G, i.e., eMBB, URLLC, and mMTC, may be multiplexed and provided by a single system. In this case, in order to satisfy different requirements of the services, different transmission and reception schemes and transmission/reception parameters may be used between the services. 5G is not limited to the above-described three services.

A frame structure of a 5G system will now be described in more detail with reference to the drawings.

FIG. 1 illustrates a diagram of a basic structure of a time-frequency domain that is a radio resource domain in which data or a control channel is transmitted in a 5G wireless communication system.

Referring to FIG. 1, a horizontal axis represents a time domain, and a vertical axis represents a frequency domain. A basic unit of a resource in the time and frequency domain is a resource element (RE) 101, and may be defined by one orthogonal frequency-division multiplexing (OFDM) symbol 102 along a time axis and one subcarrier 103 along a frequency axis. In the frequency domain, $N_{sc}^{RB}$ (e.g., 12) consecutive REs may constitute one resource block (RB) 104.

Figure 2:
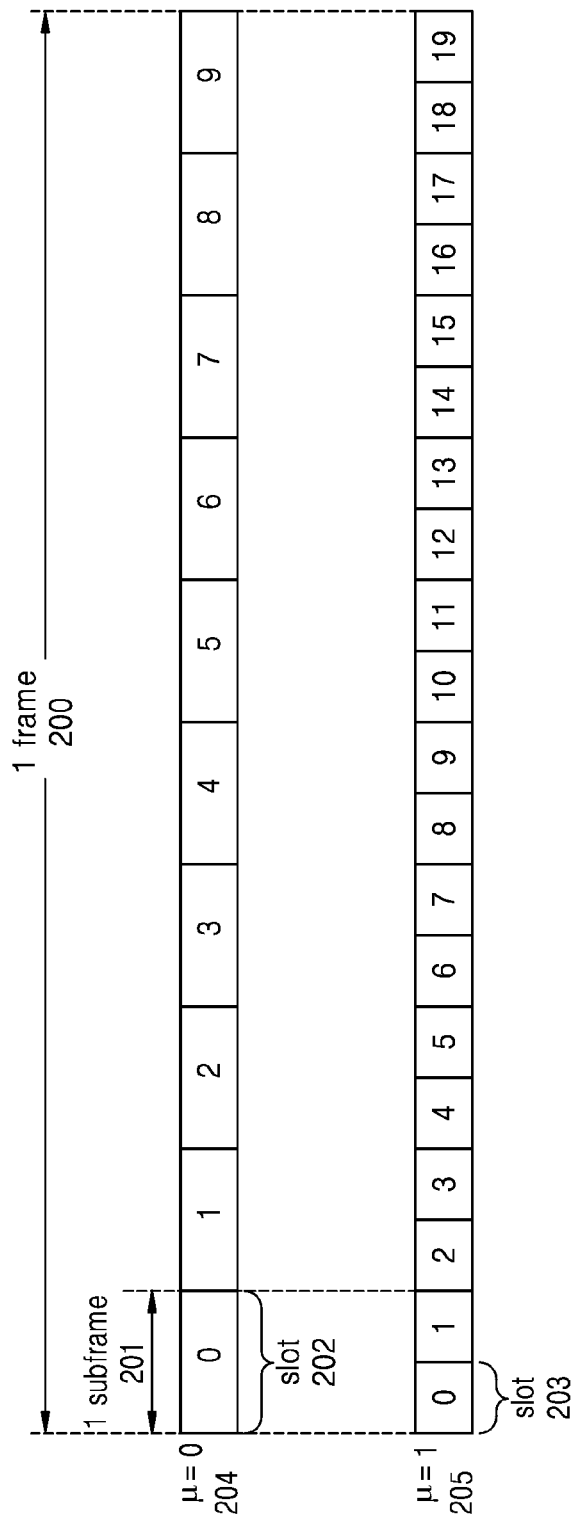
FIG. 2 illustrates a diagram of a slot structure used in a 5G wireless communication system.

FIG. 2 illustrates a diagram of a slot structure used in a 5G wireless communication system.

FIG. 2 illustrates structures of a frame 200, a subframe 201, and a slot 202. One frame 200 may be defined as 10 ms. One subframe 201 may be defined as 1 ms, and thus, one frame 200 may include a total of 10 subframes 201. One slot 202 or 203 may be defined as 14 OFDM symbols (i.e., the number of symbols per slot $N_{symb}^{slot}=14$). One subframe 201 may include one or more slots 202 or 203, and the number of slots 202 or 203 per subframe 201 may vary according to a subcarrier spacing configuration value µ (204 and 205). FIG. 2 illustrates a case where the subcarrier spacing configuration value µ=0 (204) and a case where the subcarrier spacing configuration value µ=1 (205). When µ=0 (204), one subframe 201 may include one slot 202, and when µ=1 (205), one subframe 201 may include two slots 203. That is, the number of slots per subframe $N_{slot}^{subframe,\mu}$ may vary according to the subcarrier spacing configuration value µ, and the number of slots per frame $N_{slot}^{frame,\mu}$ may accordingly vary. $N_{slot}^{subframe,\mu}$ and $N_{slot}^{frame,\mu}$ according to each subcarrier spacing configuration value may be defined as in Table 1.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A bandwidth part (BWP) configuration in a 5G communication system will now be described in detail with reference to the drawings.

Figure 3:
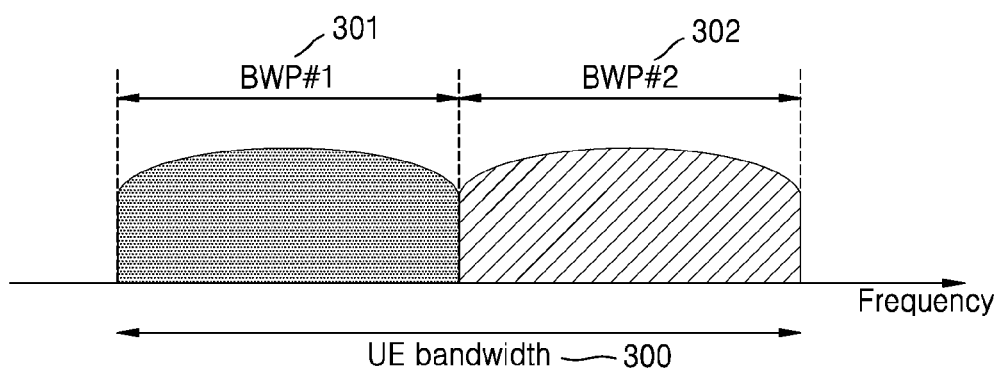
FIG. 3 illustrates a diagram of a configuration of a bandwidth part (BWP) of a 5G wireless communication system.

FIG. 3 illustrates a diagram of a configuration of a bandwidth part (BWP) in a 5G wireless communication system.

Referring to FIG. 3, a user equipment (UE) bandwidth 300 includes two BWPs, that is, a BWP #1 301 and a BWP #2 302. A base station may configure one or more BWPs in a UE, and may configure the following information for each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

However, the configuration of the BWP is not limited to the example of Table 2, and various parameters related to the BWP, in addition to the configuration information of Table 2, may be configured for the UE. The configuration information may be transmitted from the base station to the UE through higher layer signaling, for example, radio resource control (RRC) signaling. At least one of the configured one or more BWPs may be activated. An indication indicating whether the configured BWP is activated may be semi-statically transmitted from the base station to the UE through RRC signaling or may be dynamically transmitted through downlink control information (DCI).

According to an embodiment of the disclosure, the UE before radio resource control (RRC) connection may be configured with an initial BWP for initial access through a master information block (MIB) from the base station. In more detail, the UE may receive configuration information for a search space and a control resource set (CORESET) where a physical downlink control channel (PDCCH) may be transmitted in order to receive system information (e.g., remaining system information (RMSI) or system information block 1 (SIB1)) required for initial access through the MIB in an initial access stage. An identifier (ID) of the control resource set and the search space configured through the MIB may be considered as 0. The base station may indicate, to the UE, configuration information such as frequency allocation information, time allocation information, and a numerology for a control resource set #0 through the MIB. Also, the base station may indicate, to the UE, configuration information for a monitoring period and an occasion for the control resource set #0, that is, configuration information for a search space #0, through the MIB. The UE may consider a frequency domain configured as the control resource set #0 obtained from the MIB as the initial BWP for initial access. In this case, an ID of the initial BWP may be considered as 0.

A configuration of a BWP supported by the 5G wireless communication system may be used for various purposes.

According to an embodiment of the disclosure, when the bandwidth supported by the UE is smaller than a system bandwidth, a BWP configuration may be used. For example, the base station may configure a frequency position (configuration information 2) of a BWP in the UE so that the UE transmits and receives data at a specific frequency position within the system bandwidth.

Also, according to an embodiment of the disclosure, the base station may configure a plurality of BWPs in the UE in order to support different numerologies. For example, in order to support data transmission and reception using both a subcarrier spacing of 15 kHz and a subcarrier spacing of 30 kHz to and from a certain UE, the base station may configure two BWPs as subcarrier spacings of 15 kHz and 30 kHz. Different BWPs may be frequency division multiplexed, and when the base station is to transmit and receive data at a specific subcarrier spacing, a BWP configured as the specific subcarrier spacing may be activated.

Also, according to an embodiment of the disclosure, the base station may configure BWPs having different bandwidths in the UE in order to reduce power consumption of the UE. For example, when the UE supports a very large bandwidth, for example, a bandwidth of 100 MHz, and always transmits and receives data in the bandwidth, very high power consumption may occur. In particular, monitoring an unnecessary downlink control channel by using a large bandwidth of 100 MHz when there is no traffic may be very inefficient in terms of power consumption. In order to reduce power consumption of the UE, the base station may configure, in the UE, a BWP having a relatively small bandwidth, for example, a BWP of 20 MHz. The UE may perform a monitoring operation in the BWP of 20 MHz when there is no traffic, and the UE may transmit and receive data in the BWP of 100 MHz according to an indication of the base station when data is generated.

In a method of configuring a BWP, UEs before RRC connection may receive configuration information regarding an initial BWP through an MIB in an initial access stage. In more detail, a UE may be configured with a control resource set (CORESET) for a downlink control channel via which downlink control information (DCI) for scheduling a system information block (SIB) may be transmitted, from an MIB of a physical broadcast channel (PBCH). A bandwidth of the control resource set configured through the MIB may be considered as an initial BWP, and the UE may receive a physical downlink shared channel (PDSCH) via which the SIB is transmitted through the configured initial BWP. The initial BWP may be used for other system information (OSI), paging, and random access as well as for reception of the SIB.

When one or more BWPs are configured for the UE, the base station may indicate the UE to change a BWP by using a BWP indicator field in DCI. For example, when a currently activated BWP of the UE is the BWP #1 301 in FIG. 3, the base station may indicate the BWP #2 302 to the UE through the BWP indicator in the DCI, and the UE may change the BWP to the BWP #2 302 indicated by the BWP indicator in the received DCI.

Because a DCI-based BWP change may be indicated by the DCI for scheduling a PDSCH or a physical uplink shared channel (PUSCH) as described above, when the UE receives a BWP change request, the UE should receive or transmit the PDSCH or the PUSCH scheduled by the DCI in a changed BWP without difficulty. To this end, requirements for a delay time TBWP required for a BWP change are specified in a standard, and may be defined, for example, as shown in Table 3. However, the disclosure is not limited thereto.

TABLE 3

| | NR Slot | BWP switch delay TBWP (slots) | |
|---|---|---|---|
| μ | length (ms) | Type 1[Note1] | Type 2[Note1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
if the BWP switch involves changing of SCS, the BWP switchdelay is determined by the larger one between the SCS before BWP switch and the SCS after BWP switch.

The requirements for the BWP change delay time may support Type 1 and Type 2 according to a capability of the UE. The UE may report a supportable BWP delay time type to the base station.

According to requirements for a BWP change delay time, when the UE receives the DCI including a BWP change indicator in a slot n, the UE may complete changing to a new BWP indicated by the BWP change indicator no later than a slot $n+T_{BWP}$, and may transmit and receive a data channel scheduled by the DCI in the new BWP. When the base station is to schedule a data channel to the new BWP, the base station may determine time domain resource allocation for the data channel by considering a BWP change delay time $T_{BWP}$ of the UE. That is, when the base station is to schedule the data channel to the new BWP, in a method of determining time domain resource allocation for the data channel, the base station may schedule the data channel after the BWP change delay time. Accordingly, the UE may not expect that the DCI indicating the BWP change indicates a slot offset K0 or K2 smaller than the BWP change delay time $T_{BWP}$.

When the UE received the DCI indicating the BWP change (e.g., DCI format 1_1 or 0_1), the UE may not perform any transmission or reception during a time duration from a third symbol of a slot in which a PDCCH including the DCI is received to a start point of a slot indicated by the slot offset K0 or K2 indicated by a time domain resource allocation indicator field in the DCI. For example, when the UE receives the DCI indicating the BWP change in the slot n and a slot offset value indicated in the DCI is K, the UE may not perform any transmission or reception during a time duration from a third symbol of the slot n to a symbol before a slot n+K (i.e., a last symbol of a slot n+K−1).

A synchronization signal (SS)/PBCH block in a 5G wireless communication system will now be described.

The SS/PBCH block may refer to a physical layer channel block including a primary SS (PSS), a secondary SS (SSS), and a PBCH. In detail, the SS/PBCH block may be as follows.

PSS: a reference signal for downlink time/frequency synchronization, which provides some information of a cell ID.

SSS: a reference signal for downlink time/frequency synchronization, which provides the remaining information of the cell ID which is not provided by the PSS. Additionally, the SSS may serve as another reference signal for demodulation of the PBCH.

PBCH: a channel for providing essential system information required for transmission and reception of a data channel and a control channel of the UE. The essential system information may include search space-related control information indicating radio resource mapping information of the control channel, and scheduling control information for a separate data channel that transmits system information.

SS/PBCH block: the SS/PBCH block is a combination of the PSS, the SSS, and the PBCH. One or more SS/PBCH blocks may be transmitted within 5 ms, and each of the transmitted SS/PBCH blocks may be distinguished by an index.

The UE may detect the PSS and the SSS in the initial access stage, and may decode the PBCH. The UE may obtain an MIB from the PBCH, and may be configured with a control resource set #0 (which may correspond to a control resource set having a control resource set index of 0). The UE may monitor the control resource set #0 by assuming that a selected SS/PBCH block and a demodulation reference signal (DMRS) transmitted in the control resource set #0 are quasi-co-located (QCLed). The UE may receive system information as downlink control information transmitted in the control resource set #0. The UE may obtain random-access-channel (RACH)-related configuration information required for initial access from the received system information. The UE may transmit a physical RACH (PRACH) to the base station in consideration of the selected SS/PBCH index, and the base station receiving the PRACH may obtain information about the SS/PBCH block index selected by the UE. The base station may recognize which block has been selected by the UE from among the SS/PBCH blocks and may recognize that the UE monitors the control resource set #0 associated with the SS/PBCH block.

Downlink control information (DCI) in a 5G wireless communication system will now be described in detail.

In the 5G system, scheduling information for uplink data (or physical uplink shared channel (PUSCH)) or downlink data (or physical downlink shared channel (PDSCH)) may be transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be channel-coded and modulated and then be transmitted through a physical downlink control channel (PDCCH). A cyclic redundancy check (CRC) may be attached to a payload of a DCI message, and may be scrambled with a radio network temporary identifier (RNTI) corresponding to the identity of the UE. Different RNTIs may be used according to the purpose of the DCI message, for example, transmission of-UE specific data, a power control command, or a random access response. That is, the RNTI is included in a CRC calculation process and is transmitted, instead of being explicitly transmitted. When the UE receives the DCI message transmitted through the PDCCH, the UE may check the CRC by using the assigned RNTI. When the CRC check result is correct, the UE may recognize that the message is intended for the UE.

For example, the DCI for scheduling a PDSCH for system information (SI) may be scrambled with a system information RNTI (SI-RNTI). The DCI for scheduling a PDSCH for a random access response (RAR) message may be scrambled with a random access RNTI (RA-RNTI). The DCI for scheduling a PDSCH for a paging message may be scrambled with a paging RNTI (P-RNTI). The DCI for indicating a slot format indicator (SFI) may be scrambled with a slot format indicator RNTI (SFI-RNTI). The DCI for indicating transmit power control (TPC) may be scrambled with a transmit power control RNTI (TPC-RNTI). The DCI for scheduling a UE-specific PDSCH or PUSCH may be scrambled with a cell RNTI (C-RNTI), modulation coding scheme C-RNTI (MCS-C-RNTI), or configured scheduling RNTI (CS-RNT.)

DCI format 0_0 may be used as fallback DCI that schedules a PUSCH. In this case, a CRC may be scrambled with a C-RNTI. DCI format 0_0 with the CRC scrambled with the C-RNTI may include information as shown in Table 4. However, the disclosure is not limited thereto.

TABLE 4

- Identifier for DCI formats - 1 bit
  - The value of this bit field is always set to 0, indicating an UL DCI format
- Frequency domain resource assignment - $\lceil \log_2(N_{RB}^{UL,BWP}(N_{RB}^{UL,BWP}+1)/2) \rceil$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
    - $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
  - For non-PUSCH hopping with resource allocation type 1:
    - $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
- Time domain resource assignment- 4 bits as defined in Subclause 6.1.2.1 of [6, TS 38.214]
- Frequency hopping flag - 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator - 1 bit
- Redundancy version 2 bits as defined in Table 7.3.1.1.1-2
- HARQ process number - 4 bits
- TPC command for scheduled PUSCH - 2 bits as defined in Subclause 7.1.1 of [5, TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
- If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameterpucch-Config is configured;
- If the UL/SUL indicator is not present in DCI format 0_0 and pucch-Config is configured, the corresponding PUSCH scheduled by the DCI format 0_0 is for the UL or SUL for which high layer parameter pucch-Config is configured.
- If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as non-fallback DCI that schedules a PUSCH. In this case, a CRC may be scrambled with a C-RNTI. DCI format 0_1 with the CRC scrambled with the C-RNTI may include information as shown in Table 5. However, the disclosure is not limited thereto.

TABLE 5

- Identifier for DCI formats-1 bit
  - The value of this bit field is always set to 0, indicating an UL DCI format
- Carrier indicator-0 or 3 bits, as defined in Subclause 10.1 of [5, TS38.213].
- UL/SUL indicator-0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator-0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  - $n_{BWP} = n_{BWP,RRC}$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment-number of bits determined by the following, where $N_{RB}^{UL,BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}^{UL,BWP}(N_{RB}^{UL,BWP} +1)/2) \rceil$ bits if only resource allocation type 1 is configured, or $\max(\lceil \log_2(N_{RB}^{UL,BWP}(N_{RB}^{UL,BWP} +1)/2) \rceil, N_{RBG})+1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 6.1.2.2.1 of [6, TS 38.214].
  - For resource allocation type 1, the $\lceil \log_2(N_{RB}^{UL,BWP}(N_{RB}^{UL,BWP} +1)/2) \rceil$ LSBs provide the resource allocation as follows:
    - For PUSCH hopping with resource allocation type 1:
      - $N_{UL\_hop}$ MSB bits are used to indicate the frequency offset according to Subclause 6.3 of [6, TS 38.214], where $N_{UL\_hop}$ =1 if the higher layer parameter frequencyHoppingOffsetLists contains two offset values and $N_{UL\_hop}$= 2 if the higher layer parameter frequencyHoppingOffsetLists contains four offset values
      - $\lceil \log_2(N_{RB}^{UL,BWP}(N_{RB}^{UL,BWP} +1)/2) \rceil - N_{UL\_hop}$ bits provides the frequency domain resource allocation according to Subclause 6.1.2.2.2 of [6, TS 38.214]
    - For non-PUSCH hopping with resource allocation type 1:
      - $\lceil \log_2(N_{RB}^{UL,BWP}(N_{RB}^{UL,BWP} +1)/2) \rceil$ bits provides the frequency domain resource allocation according to Subclause 6.1.2.2.2 of [6, TS 38.214]
    If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment-0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
- Frequency hopping flag-0 or 1 bit:
  - 0 bit if only resource allocation type 0 is configured or if the higher layer parameter frequencyHopping is not configured;
  - 1 bit according to Table 7.3.1.1.1-3 otherwise, only applicable to resource allocation type 1, as defined in Subclause 6.3 of [6, TS 38.214].
- Modulation and coding scheme-5 bits as defined in Subclause 6.1.4.1 of [6, TS 38.214]
- New data indicator-1 bit
- Redundancy version-2 bits as defined in Table 7.3.1.1.1-2
- HARQ process number-4 bits
- 1$^{st}$ downlink assignment index-1 or 2 bits:
  - 1 bit for semi-static HARQ-ACK codebook;
  - 2 bits for dynamic HARQ-ACK codebook.
- 2$^{nd}$ downlink assignment index-0 or 2 bits:
  - 2 bits for dynamic HARQ-ACK codebook with two HARQ-ACK sub-codebooks;
  - 0 bit otherwise.

TABLE 5-continued

- TPC command for scheduled PUSCH-2 bits as defined in Subclause 7.1.1 of [5, TS38.213]

$$\text{SRS resource indicator} - \left\lceil \log_2\left(\sum_{k=1}^{min\{L_{max}, N_{SRS}\}} \binom{N_{SRS}}{k}\right)\right\rceil \text{ or } \lceil \log_2(N_{SRS}) \rceil \text{ bits, where}$$

$N_{SRS}$ is the number of configured SRS resources in the SRS resource set associated with the higher layer parameter usage of value 'codeBook' or 'nonCode Book', $$\left\lceil \log_2\left(\sum_{k=1}^{min\{L_{max}, N_{SRS}\}} \binom{N_{SRS}}{k}\right)\right\rceil \text{ bits according to Tables 7.3.1.2–28/29/30/31 if the}$$

higher layer parameter txConfig = nonCodebook, where $N_{SRS}$ is the number of configured SRS resources in the SRS resource set associated with the higher layer parameter usage of value 'nonCodeBook' and
- if UE supports operation with maxMIMO-Layers and the higher layer parameter maxMIMO-Layers of PUSCH-ServingCellConfig of the serving cell is configured, $L_{max}$ is given by that parameter
- otherwise, $L_{max}$ is given by the maximum number of layers for PUSCH supported by the UE for the serving cell for non-codebook based operation.
- $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
- Precoding information and number of layers-number of bits determined by the following:
  - 0 bits if the higher layer parameter txConfig = nonCodeBook,
  - 0 bits for 1 antenna port and if the higher layer parameter txConfig = codebook,
  - 4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset,
  - 2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset,
  - 2 or 4 bits according to Table7.3.1.1.2-4 for 2 antenna ports, if txConfig = codebook, and according to whether transform precoder is enabled or disabled, and the values of higher layer parameters maxRank and codebookSubset,
  - 1 or 3 bits according to Table7.3.1.1.2-5 for 2 antenna ports, if txConfig = codebook, and according to whether transform precoder is enabled or disabled, and the values of higher layer parameters maxRank and codebookSubset.
- Antenna ports-number of bits determined by the following
  - 2 bits as defined by Tables 7.3.1.1.2-6, if transform precoder is enabled, dmrs-Type=1 , and maxLength=1,
  - 4 bits as defined by Tables 7.3.1.1.2-7, if transform precoder is enabled, dmrs-Type=1 , and maxLength=2;
  - 3 bits as defined by Tables 7.3.1.1.2-8/9/10/11, if transform precoder is disabled, dmrs-Type=1 , and maxLength=1 , and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-12/13/14/15, if transform precoder is disabled, dmrs-Type=1, and maxLength=2, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-16/17/18/19, if transform precoder is disabled, dmrs-Type=2, and maxLength=1, and the value of rank is determined according to the SRS resource indicator field if the higher layer parameter txConfig = nonCodebook and according to the Precoding information and number of layers field if the higher layer parameter txConfig = codebook;
  - 5 bits as defined by Tables 7.3.1.1.2-20/21/22/23, if transform precoder is disabled, dmrs-Type=2, and maxLength=2, and the value of rank is determined according to the SRS resource indicator field if the higher layer parameter txConfig = nonCodebook and according to the Precoding information and number of layers field if the higher layer parameter txConfig = codebook.
  where the number of CDM groups without data of values 1, 2, and 3 in Tables 7.3.1.1.2-6 to 7.3.1.1.2-23 refers to CDM groups {0}, {0,1}, and {0, 1,2} respectively.

TABLE 5-continued

If a UE is configured with both dmrs-UplinkForPUSCH-MappingTypeA and
dmrs-UplinkForPUSCH-MappingTypeB, the bitwidth of this field equals
max{$x_A, x_B$}, where $x_A$ is the "Antenna ports" bitwidth derived according to
dmrs-UplinkForPUSCH-MappingTypeA and $x_B$ is the "Antenna ports" bitwidth
derived according to dmrs-UplinkForPUSCH-MappingTypeB. A number of
|$x_A - x_B$| zeros are padded in the MSB of this field, if the mapping type of the
PUSCH corresponds to the smaller value of $x_A$ and $x_B$.
- SRS request-2 bits as defined by Table 7.3.1.1.2-24 for UEs not configured with
supplementaryUplink in ServingCellConfig in the cell; 3 bits for UEs configured
with supplementaryUplink in ServingCellConfig in the cell where the first bit is
the non-SUL/SUL indicator as defined in Table 7.3.1.1.1-1 and the second and
third bits are defined by Table 7.3.1.1.2-24. This bit field may also indicate the
associated CSI-RS according to Subclause 6.1.1.2 of [6, TS 38.214].
- CSI request-0, 1, 2, 3, 4, 5, or 6 bits determined by higher layer parameter
reportTriggerSize.
- CBG transmission information (CBGTI)-0 bit if higher layer parameter
codeBlockGroupTransmission for PDSCH is not configured, otherwise, 2, 4, 6, or
8 bits determined by higher layer parameter
maxCodeBlockGroupsPerTransportBlock for PUSCH.
- PTRS-DMRS association-number of bits determined as follows
  - 0 bit if PTRS-UplinkConfig is not configured and transform precoder is
    disabled, or if transform precoder is enabled, or if maxRank=1;
  - 2 bits otherwise, where Table 7.3.1.1.2-25 and 7.3.1.1.2-26 are used to indicate
    the association between PTRS port(s) and DMRS port(s) for transmission of
    one PT-RS port and two PT-RS ports respectively, and the DMRS ports are
    indicated by the Antenna ports field.
  If "Bandwidth part indicator" field indicates a bandwidth part other than the
  active bandwidth part and the "PTRS-DMRS association" field is present for the
  indicated bandwidth part but not present for the active bandwidth part, the UE
  assumes the "PTRS-DMRS association" field is not present for the indicated
  bandwidth part.
- beta_offset indicator-0 if the higher layer parameter betaOffsets = semiStatic,
otherwise 2 bits as defined by Table 9.3-3 in [5, TS 38.213].
- DMRS sequence initialization-0 bit if transform precoder is enabled; 1 bit if
transform precoder is disabled.
- UL-SCH indicator-1 bit. A value of "1" indicates UL-SCH shall be transmitted
on the PUSCH and a value of "0" indicates UL-SCH shall not be transmitted on
the PUSCH. Except for DCI format 0_1 with CRC scrambled by SP-CSI-RNTI, a
UE is not expected to receive a DCI format 0_1 with UL-SCH indicator of "0"
and CSI request of all zero(s).

DCI format 1_0 may be used as fallback DCI that schedules a PDSCH. In this case, a CRC may be scrambled with a C-RNTI. DCI format 1_0 with the CRC scrambled with the C-RNTI may include information as shown in Table 6. However, the disclosure is not limited thereto.

TABLE 6

- Identifier for DCI formats - 1 bits
  - The value of this bit field is always set to 1, indicating a DL DCI format
- Frequency domain resource assignment - $\lceil \log_2(N_{RB}^{DL,BWP}(N_{RB}^{DL,BWP}+1)/2) \rceil$ bits
  where $N_{RB}^{DL,BWP}$ is given by subclause 7.3.1.0
If the CRC of the DCI format 1_0 is scrambled by C-RNTI and the "Frequency
domain resource assignment" field are of all ones, the DCI format 1_0 is for random
access procedure initiated by a PDCCH order, with all remaining fields set as
follows:
- Random Access Preamble index - 6 bits according to ra-PreambleIndex in
  Subclause 5.1.2 of [8, TS38.321]
- UL/SUL indicator - 1 bit. If the value of the "Random Access Preamble index" is
  not all zeros and if the UE is configured with supplementaryUplink in
  ServingCellConfig in the cell, this field indicates which UL carrier in the cell to
  transmit the PRACH according to Table 7.3.1.1.1-1; otherwise, this field is
  reserved
- SS/PBCH index - 6 bits. If the value of the "Random Access Preamble index" is
  not all zeros, this field indicates the SS/PBCH that shall be used to determine the
  RACH occasion for the PRACH transmission; otherwise, this field is reserved.
- PRACH Mask index - 4 bits. If the value of the "Random Access Preamble
  index" is not all zeros, this field indicates the RACH occasion associated with the
  SS/PBCH indicated by "SS/PBCH index" for the PRACH transmission,
  according to Subclause 5.1.1 of [8, TS38.321]; otherwise, this field is reserved
- Reserved bits - 10 bits
Otherwise, all remaining fields are set as follows:
- Time domain resource assignment - 4 bits as defined in Subclause 5.1.2.1 of [6,
  TS 38.214]

TABLE 6-continued

- VRB-to-PRB mapping - 1 bit according to Table 7.3.1.2.2-5
- Modulation and coding scheme - 5 bits as defined in Subclause 5.1.3 of [6, TS 38.214]
- New data indicator - 1 bit
- Redundancy version - 2 bits as defined in Table 7.3.1.1.1-2
- HARQ process number - 4 bits
- Downlink assignment index - 2 bits as defined in Subclause 9.1.3 of [5, TS 38.213], as counter DAI
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 3 bits as defined in Subclause 9.2.3 of [5, TS38.213]

15

DCI format 1_1 may be used as non-fallback DCI that schedules a PDSCH. In this case, a CRC may be scrambled with a C-RNTI. DCI format 1_1 with the CRC scrambled with the C-RNTI may include information as shown in Table 7. However, the disclosure is not limited thereto.

TABLE 7

- Identifier for DCI formats - 1 bits
  - The value of this bit field is always set to 1, indicating a DL DCI format
- Carrier indicator - 0 or 3 bits as defined in Subclause 10.1 of [5, TS 38.213].
- Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id,
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment - number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2(N_{RB}^{DL,BWP} (N_{RB}^{DL,BWP} +1)/2) \rceil$ bits if only resource allocation type 1 is configured, or
  - $\max( \lceil \log_2(N_{RB}^{DL,BWP} (N_{RB}^{DL,BWP} +1)/2) \rceil ,N_{RBG})+1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214].
  - For resource allocation type 1, the $\log_2$ (NRE BWP (NPLBWP +1) / 2)1 LSBs provide the resource allocation as defined in Subclause 5.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
  - VRB-to-PRB mapping - 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
  - PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

TABLE 7-continued

- ZP CSI-RS trigger - 0, 1, or 2 bits as defined in Subclause 5.1.4.2 of [6, TS 38.214]. The bitwidth for this field is determined as $\lceil \log_2(n_{ZP}+1) \rceil$ bits, where $n_{zp}$ is the number of aperiodic ZP CSI-RS resource sets configured by higher layer.
  For transport block 1:
- Modulation and coding scheme - 5 bits as defined in Subclause 5.1.3.1 of [6, TS 38.214]
  - New data indicator - 1 bit
  - Redundancy version - 2 bits as defined in Table 7.3.1.1.1-2
For transport block 2 (only present if maxNrofCodeWordsScheduledByDCI equals 2):
- Modulation and coding scheme - 5 bits as defined in Subclause 5.1.3.1 of [6, TS 38.214]
  - New data indicator - 1 bit
  - Redundancy version - 2 bits as defined in Table 7.3.1.1.1-2
  If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding schem"", "New data indicator", and "Redundancy version" fields of transport block 2 for the indicated bandwidth part.
    - HARQ process number - 4 bits
- Downlink assignment index - number of bits as defined in the following
- 4 bits if more than one serving cell are configured in the DL and the higher layer parameterpdsch-HARQ-ACK-Codebook dynamic. where the 2 MSB bits are the counter DAI and the 2 LSB bits are the total DAI;
- 2 bits if only one serving cell is configured in the DL and the higher layer parameter pdsch-HARQ-ACK-Code book dynamic, where the 2 bits are the counter DAI;
    - 0 bits otherwise.
- TPC command for scheduled PUCCH - 2 bits as defined in Subclause 7.2.1 of [5, TS 38.213]
  - PUCCH resource indicator - 3 bits as defined in Subclause 9.2.3 of [5, TS 38.213]
  - PDSCH-to-HARQ_feedback timing indicator - 0, 1, 2, or 3 bits as defined in Subclause 9.2.3 of [5, TS 38.213]. The bitwidth for this field is determined as $\lceil \log_2(I) \rceil$ bits, where $I$ is the number of entries in the higher layer parameter dl-DataToUL-ACK.
- Antenna port(s) - 4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively. The antenna ports $\{P_0,..., P_{0\text{-}1}\}$ shall be determined according to the ordering of DMRS port(s) given by Tables 7.3.1.2.2-1/2/3/4.
  If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
- Transmission configuration indication - 0 bit if higher layer parameter tci-PresentInDCIis not enabled; otherwise 3 bits as defined in Subclause 5.1.5 of [6, TS38.214],
  If "Bandwidth part indicator" field indicates a bandwidth part other than the active bandwidth part,
    - if the higher layer parameter tci-PresentInDCI is not enabled for the CORESET used for the PDCCH carrying the DCI format 1_1,
    - the UE assumes tci-PresentInDCI is not enabled for all CORESETs in the indicated bandwidth part;
      - otherwise,
    - the UE assumes tci-PresentInDCI is enabled for all CORESETs in the indicated bandwidth part.
- SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
  - CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
  - CBG flushing out information (CBGFI)- 1 bit if higher layer parameter codeBlockGroupFlushIndicator is configured as "TRUE", 0 bit otherwise.
    - DMRS sequence initialization - 1 bit.

A time domain resource allocation method for a data channel in a 5G wireless communication system will now be described.

The base station may configure, in the UE, a table regarding time domain resource allocation information for a PDSCH and a PUSCH, through higher layer signaling (e.g., RRC signaling). For the PDSCH, a table including up to maxNrofDL-Allocations=16 entries may be configured, and for the PUSCH, a table including up to maxNrofUL-Allocations=16 entries may be configured. The time domain resource allocation information may include, for example, a PDCCH-to-PDSCH slot timing (corresponding to a time interval in units of slots between a time point when the PDCCH is received and a time point when the PDSCH scheduled by the received PDCCH is transmitted, denoted by K0), a PDCCH-to-PUSCH slot timing (corresponding to a time interval in units of slots between a time point when the PDCCH is received and a time point when the PUSCH scheduled by the received PDCCH is transmitted, denoted by K2), information about a location and length of a start symbol where the PDSCH or PUSCH is scheduled within a slot, and a mapping type of the PDCH or PUSCH. For example, a plurality of pieces of information shown in Table 8 or Table 9 may be notified from the base station to the UE. However, the disclosure is not limited thereto.

TABLE 8

PDSCH-TimeDomainResourceAllocationList information element

PDSCH-TimeDomainResourceAllocationList ::=    SEQUENCE  (SIZE(1..maxNrofDL-Allocations)) OF PDSCH-TimeDomainResourceAllocation
PDSCH-TimeDomainResourceAllocation ::=         SEQUENCE {
  k0                                                            INTEGER(0..32)
OPTIONAL,    -- Need S
  (PDCCH-to-PDSCH timing, slot unit)
mappingType                                          ENUMERATED {typeA, typeB},
  (PDSCH mapping type)
startSymbolAndLength                                 INTEGER (0..127)
(start symbol and length of PDSCH)
}

TABLE 9

PUSCH-TimeDomainResourceAllocation information element

PUDSCH-TimeDomainResourceAllocationList ::=          SEQUENCE
(SIZE(1..maxNrofUL-Allocations)) OF PUSCH-TimeDomainResourceAllocation
PUSCH-TimeDomainResourceAllocation ::=         SEQUENCE {
  k2                                                            INTEGER(0..32)
OPTIONAL,   -- Need S
  (PDCCH-to-PUSCH timing, slot unit)
  mappingType                                        ENUMERATED {typeA, typeB},
  (PUSCH mapping type)
  startSymbolAndLength                               INTEGER (0..127)
  (start symbol and length of PUSCH)
}

The base station may notify the UE of one of the entries in the table for the time domain resource allocation information through L1 signaling, e.g., DCI (e.g., the base station may notify the UE by using a field 'time domain resource allocation' in the DCI). The UE may obtain time domain resource allocation information for the PDSCH or PUSCH, based on the DCI received from the base station.

A frequency domain resource allocation method for a data channel in a 5G wireless communication system will now be described.

In the 5G wireless communication system, two types, i.e., resource allocation type 0 and resource allocation type 1, are supported as a method of indicating frequency domain resource allocation information for a PDSCH and a PUSCH.

Resource Allocation Type 0

Resource block (RB) allocation information may be notified from the base station to the UE as a bitmap for a resource block group (RBG). In this case, the RBG may include a set of consecutive virtual RBs (VRBs), and a size P of the RBG may be determined based on a value configured as a higher layer parameter rbg-Size and a BWP size value defined in Table 10.

TABLE 10

| | Nominal RBG size P | |
| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

The total number $N_{RBG}$ of RBGs of a BWP i with a size of $N_{BWP,i}^{size}$ may be defined as follows.

$N_{RBG} = \lceil (N_{BWP,i}^{size} + (N_{BWP,i}^{start} \bmod P))/P \rceil$, where the size of the first RBG is $RBG_0^{size} = P - N_{BWP,i}^{start} \bmod P$, the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P \geq 0$ and P otherwise, the size of all other RBGs is P.

Each bit of the bitmap with the size of $N_{RBG}$ bits may correspond to each RBG. RBGs may be indexed in an order of increasing frequency, starting from a lowest frequency position of the BWP. For $N_{RBG}$ RBGs in the BWP, RBG #0 to RBG #$N_{RBG}$–1 may be mapped from a most significant bit (MSB) to a least significant bit (LSB) of the RBG bitmap. When a specific bit value in the bitmap is 1, the UE may determine that the RBG corresponding to the specific bit value is allocated, and when a specific bit value in the bitmap is 0, the UE may determine that the RBG corresponding to the specific bit value is not allocated.

Resource Allocation Type 1

RB allocation information may be notified from the base station to the UE as information about a start position and a length for consecutively allocated VRBs. In this case, interleaving or non-interleaving may be additionally applied to the consecutively allocated VRBs. A resource allocation field of resource allocation type 1 may include a resource indication value (MV), and the MV include a start point $RB_{start}$ of the VRB and a length $L_{RBs}$ of consecutively allocated RBs. In more detail, the MV in a BWP having a size of $N_{BWP}^{size}$ may be defined as follows.

if $(L_{RBs}-1) \leq \lceil N_{BWP}^{size}/2 \rceil$ then $$RIV = N_{BWP}^{size}(L_{RBs}-1) + RB_{start}$$

else $$RIV = N_{BWP}^{size}(N_{BWP}^{size}-L_{RBs}+1) + (N_{BWP}^{size}-1-RB_{start})$$

where $L_{RBs} \geq 1$ and shall not exceed $N_{BWP}^{size}-RB_{start}$.

The base station may configure, in the UE, a resource allocation type through higher layer signaling (e.g., a higher layer parameter resourceAllocation may be configured to be one value among resourceAllocationType0, resourceAllocationType1, or dynamicSwitch). When the UE is configured with both resource allocation types 0 and 1 (or when the higher layer parameter resourceAllocation is configured to be dynamic Switch), a bit corresponding to the MSB in a resource allocation indication field in a DCI format indicating scheduling may indicate resource allocation type 0 or 1. Also, resource allocation information may be indicated through the remaining bits except for the bit corresponding to the MSB based on the indicated resource allocation type, and the UE may interpret resource allocation field information of the DCI field, based on the indication. When the UE is configured with one of resource allocation types 0 and 1 (or when the higher layer parameter resourceAllocation is configured to be resourceAllocationType0 or resourceAllocation Type1), a resource allocation indication field in a DCI format indicating scheduling may indicate resource allocation information, based on the configured resource allocation type, and the UE may interpret resource allocation field information of the DCI field, based on the indication.

A modulation and coding scheme (MCS) used in a 5G wireless communication system will now be described in detail.

In 5G, a plurality of MCS index tables are defined for PDSCH and PUSCH scheduling. Which MCS table is assumed by the UE from among a plurality of MCS tables may be configured or indicated from the base station to the UE through higher layer signal, L1 signaling, or an RNTI value assumed by the UE during PDCCH decoding.

MCS index table 1 for PDSCH and cyclic prefix (CP)-OFDM-based PUSCH (or PUSCH without transform precoding) may be as shown in Table 11.

TABLE 11

MCS index table 1 for PDSCH
Table 5.1.3.1-1: MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for PDSCH and CP-OFDM-based PUSCH (or PUSCH without transform precoding) may be as shown in Table 12.

TABLE 12

MCS index table 2 for PDSCH
Table 5.1.3.1-2: MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |

TABLE 12-continued

MCS index table 2 for PDSCH
Table 5.1.3.1-2: MCS index table 2 for PDSCH

| MCS Index $I_{MCS}$ | Modulation Order $Q_m$ | Target code Rate R × [1024] | Spectral efficiency |
|---|---|---|---|
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for PDSCH and CP-OFDM-based PUSCH (or PUSCH without transform precoding) may be as shown in Table 13.

TABLE 13

MCS index table 3 for PDSCH
Table 5.1.3.1-3: MCS index table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 26 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index table 1 for discrete Fourier transform-spread-OFDM (DFT-s-OFDM)-based PUSCH (or PUSCH with transform precoding) may be as shown in Table 14.

TABLE 14

MCS index table for PUSCH with transform precoding and 64QAM
Table 6.1.4.1-1: MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |

TABLE 14-continued

MCS index table for PUSCH with transform precoding and 64QAM
Table 6.1.4.1-1: MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table 2 for DFT-s-OFDM-based PUSCH (or PUSCH with transform precoding) may be as shown in Table 15.

TABLE 15

MCS index table 2 for PUSCH with transform precoding and 64QAM
Table 6.1.4.1-2: MCS index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |

TABLE 15-continued

MCS index table 2 for PUSCH with transform
precoding and 64QAM
Table 6.1.4.1-2: MCS index table 2 for PUSCH
with transform precoding and 64QAM

| MCS Index $I_{MCS}$ | Modulation Order $Q_m$ | Target code Rate R × 1024 | Spectral efficiency |
|---|---|---|---|
| 28 | q | reserved | |
| 29 | 2 | reserved | |
| 30 | 4 | reserved | |
| 31 | 6 | reserved | |

MCS index table for PUSCH with transform precoding (or discrete Fourier transform (DFT) precoding) and 64 QAM may be as shown in Table 16.

TABLE 16

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 16 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table for PUSCH with transform precoding (or DFT precoding) and 64 QAM may be as shown in Table 17.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |

TABLE 17-continued

| MCS Index $I_{MCS}$ | Modulation Order $Q_m$ | Target code Rate R × 1024 | Spectral efficiency |
|---|---|---|---|
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

A downlink control channel in a 5G wireless communication system will now be described in detail with reference to the drawings.

Figure 4:
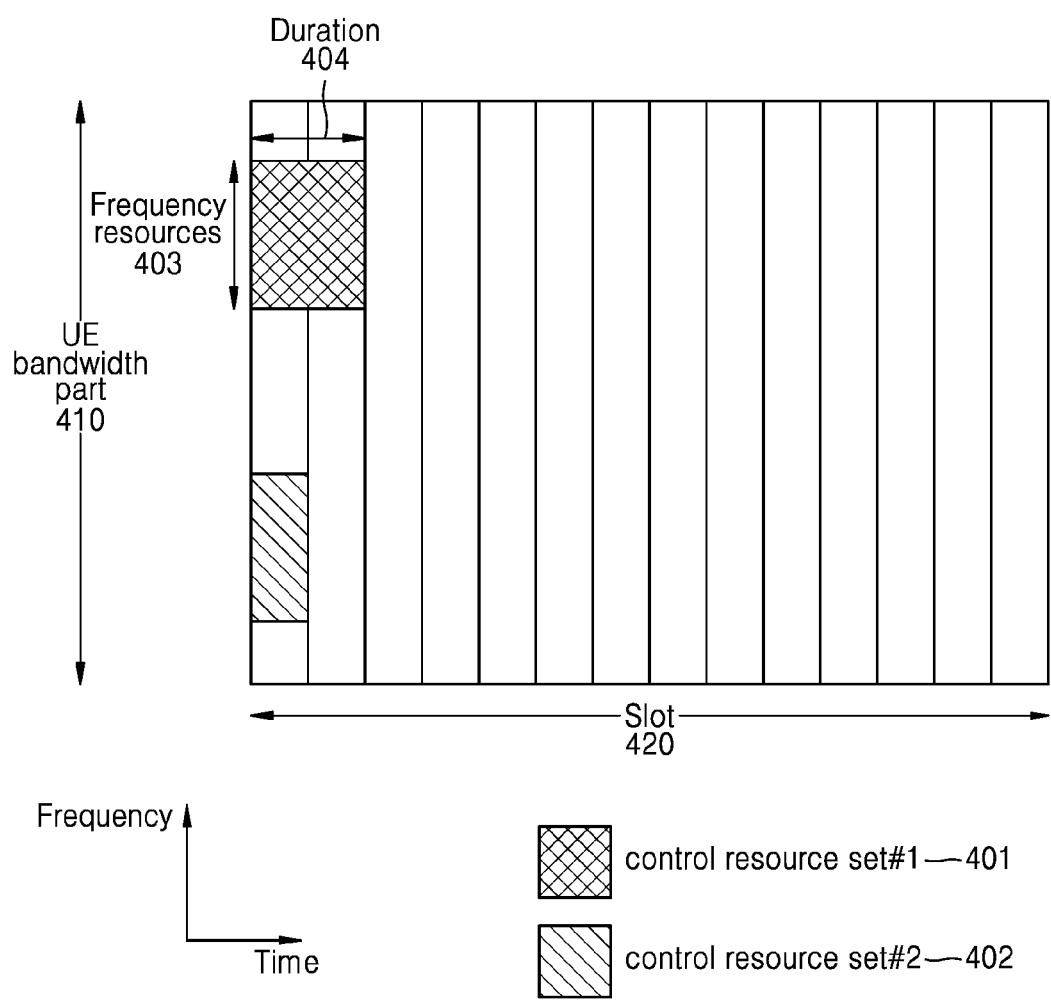
FIG. 4 illustrates a diagram of a control resource set in which a downlink control channel is transmitted in a 5G wireless communication system.

FIG. 4 illustrates a diagram of a control resource set (CORESET) in which a downlink control channel is transmitted in a 5G wireless communication system.

Referring to FIG. 4, a UE bandwidth part 410 is configured in a frequency axis, and two control resource sets (a control resource set #1 401 and a control resource set #2 402) are configured in one slot 420 in a time axis. The control resource sets 401 and 402 may be configured in a specific frequency resource 403 within the entire UE BWP 410 along the frequency axis. Also, the control resource sets 401 and 402 may be configured with one or more OFDM symbols along the time axis, and may be defined by a control resource set duration 404. Referring to FIG. 4, the control resource set #1 401 may be configured to have a control resource set duration of two symbols, and the control resource set #2 402 may be configured to have a control resource set duration of one symbol.

In the 5G wireless communication system, the base station may configure each control resource set in the UE through higher layer signaling (e.g., system information, master information block (MIB), or radio resource control (RRC) signaling). When the control resource set is configured for the UE, it means that information such as a control resource set ID, a frequency position of the control resource set, and a symbol length of the control resource set is provided to the UE. For example, information of Table 18 may be included. However, the disclosure is not limited thereto.

TABLE 18

```
ControlResourceSet ::=                 SEQUENCE {
    -- Corresponds to L1 parameter 'CORESET-ID'
    controlResourceSetId               ControlResourceSetId,
    (Control resource set identifier (Identity))
    frequencyDomainResources           BIT STRING (SIZE
(45)),
    (Frequency domain resource allocation information)
    duration                           INTEGER
(1..maxCoReSetDuration),
    (Time domain resource allocation information)
    cce-REG-MappingType
    CHOICE {
    (CCE-to-REG mapping scheme)
```

TABLE 18-continued

```
    interleaved
    SEQUENCE {
        reg-BundleSize
    ENUMERATED {n2, n3, n6},
    (REG bundle size)
        precoderGranularity
    ENUMERATED {sameAsREG-bundle, allContiguousRBs},
        interleaverSize
    ENUMERATED {n2, n3, n6}
        (Interleaver size)
        shiftIndex
    INTEGER(0..maxNrofPhysicalResourceBlocks-1)
        OPTIONAL
        (Interleaver shift (Shift))
    },
    nonInterleaved                              NULL
    },
    tci-StatesPDCCH
    SEQUENCE(SIZE (1..maxNrofTCI-StatesPDCCH)) OF TCI-StateId
        OPTIONAL,
    (QCL configuration information)
    tci-PresentInDCI                            ENUMERATED
{enabled}
            OPTIONAL,   -- Need S
}
```

In Table 18, tci-StatesPDCCH (simply referred to as transmission configuration indication (TCI) state) configuration information may include information of a channel state information reference signal (CSI-RS) index or one or more synchronization signal (SS)/physical broadcast channel (PBCH) block indexes having a quasi-co-located (QCLed) relationship with a DMRS transmitted in the corresponding control resource set.

Figure 5:
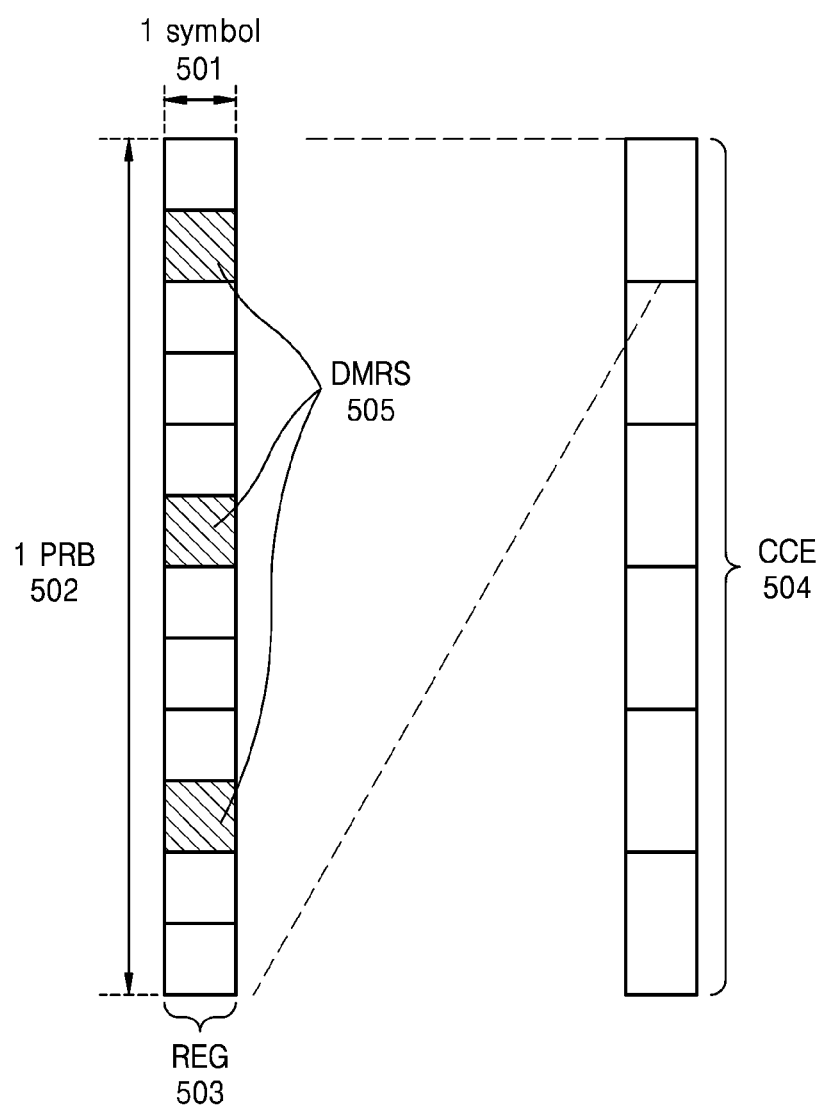
FIG. 5 illustrates a diagram of a structure of a downlink control channel of a 5G wireless communication system.

FIG. 5 illustrates a diagram of a structure of a downlink control channel of a 5G wireless communication system.

That is, FIG. 5 illustrates a diagram of a basic unit of time and frequency resources constituting a downlink control channel that is usable in a 5G wireless communication system.

Referring to FIG. 5, the basic unit of the time and frequency resources constituting the control channel may be referred to as a resource element group (REG) 503. The REG 503 may be defined as one OFDM symbol 501 on a time axis and one physical resource block (PRB) 502, that is, 12 subcarriers, on a frequency axis. A base station may configure a downlink control channel allocation unit by concatenating the REG 503.

As shown in FIG. 5, when a basic unit of allocating the downlink control channel is called a control channel element (CCE) 504 in a 5G wireless communication system, one CCE 504 may include a plurality of REGs 503. In FIG. 5, when the REG 503 includes 12 REs and one CCE 504 includes 6 REGs 503, one CCE 504 may include 72 REs. When a downlink control resource set is configured, the downlink control resource set may include a plurality of CCEs 504. A specific downlink control channel may be transmitted after being mapped to one or more CCEs 504 according to an aggregation level (AL) in the control resource set. The CCEs 504 in the control resource set may be distinguished by numbers. In this case, the numbers may be assigned to the CCEs 504 according to a logical mapping scheme.

The basic unit of the downlink control channel illustrated in FIG. 5, that is, the REG 503, may include both of REs to which DCI is mapped and regions to which a demodulation reference signal (DMRS) 505, which is a reference signal for decoding the DCI, is mapped. As shown in FIG. 5, three DMRSs 505 may be transmitted in one REG 503. The number of CCEs required for transmitting a PDCCH may be 1, 2, 4, 8, or 16 according to the aggregation level (AL), and a different number of CCEs may be used to implement link adaptation of the downlink control channel. For example, when AL=L, a single downlink control channel may be transmitted in L CCEs. A UE has to detect a signal in a state in which the UE does not know information about the downlink control channel. A search space representing a set of CCEs is defined for blind decoding. The search space is a set of downlink control channel candidates including CCEs that the UE has to attempt to decode at a given AL. Because there are various ALs that make one bundle from 1, 2, 4, 8, and 16 CCEs, the UE may have a plurality of search spaces. A search space set may be defined as a set of search spaces at all configured ALs.

The search spaces may be classified into common search spaces and UE-specific search spaces. A group of UEs or all UEs may examine a common search space of a PDCCH in order to receive cell-common control information such as a paging message or dynamic scheduling for system information. For example, PDSCH scheduling allocation information for transmitting a system information block (SIB) including cell operator information or the like may be received by examining the common search space of the PDCCH. Because a group of UEs or all UEs should receive the PDCCH, the common search space may be defined as a set of appointed CCEs. Scheduling allocation information for a UE-specific PDSCH or PUSCH may be received by examining the UE-specific search space of the PDCCH. The UE-specific search space may be UE-specifically defined through a function of various system parameters and an identity of the UE.

In the 5G wireless communication system, parameters of the search space of the PDCCH may be configured by the base station in the UE through higher layer signaling (e.g., SIB, MIB, or RRC signaling). For example, the base station may configure, in the UE, the number of PDCCH candidates at each aggregation level L, a monitoring period for the search space, a monitoring occasion of a symbol unit within a slot for the search space, a search space type (i.e., a common search space or a UE-specific search space), a combination of an RNTI and a DCI format to be monitored in the search space, and an index of a control resource set for monitoring the search space. For example, the parameters for the search space of the PDCCH may include pieces of information of Table 19. However, the disclosure is not limited thereto.

TABLE 19

```
SearchSpace ::=                                 SEQUENCE {
    -- Identity of the search space. SearchSpaceId = 0 identifies the SearchSpace
configured via PBCH (MIB) or ServingCellConfigCommon.
    searchSpaceId                               SearchSpaceId,
    (Search space identifier)
    controlResourceSetId                        ControlResourceSetId,
    (Control resource set identifier)
    monitoringSlotPeriodicityAndOffset          CHOICE {
```

TABLE 19-continued

```
  (Monitoring slot level period)
      sl1
    NULL,
      sl2
    INTEGER (0..1),
      sl4
    INTEGER (0..3),
      sl5
    INTEGER (0..4),
      sl8
    INTEGER (0..7),
      sl10
    INTEGER (0..9),
      sl16
    INTEGER (0..15),
      sl20
    INTEGER (0..19)
    }                                              OPTIONAL,
  duration(Monitoring duration)              INTEGER (2..2559)
  monitoringSymbolsWithinSlot                     BIT    STRING
(SIZE (14))
      OPTIONAL,
  (Monitoring symbol in slot)
    nrofCandidates                           SEQUENCE {
  (Number of PDCCH candidates per aggregation level)
      aggregationLevel1
    ENUMERATED {n0, n1, n2, n3, n4, n5, n6, n8},
      aggregationLevel2
    ENUMERATED {n0, n1, n2, n3, n4, n5, n6, n8},
      aggregationLevel4
    ENUMERATED {n0, n1, n2, n3, n4, n5, n6, n8},
      aggregationLevel8
    ENUMERATED {n0, n1, n2, n3, n4, n5, n6, n8},
      aggregationLevel16
    ENUMERATED {n0, n1, n2, n3, n4, n5, n6, n8}
    },
    searchSpaceType
    CHOICE {
    (Search space type)
      -- Configures this search space as common search space (CSS) and DCI
formats to monitor.
      common
    SEQUENCE {
    (Common search space)
    }
      ue-Specific
    SEQUENCE {
    (UE-specific search space)
        -- Indicates whether the UE monitors in this USS for DCI formats
0-0 and 1-0 or for formats 0-1 and 1-1.
        formats
    ENUMERATED {formats0-0-And-1-0, formats0-1-And-1-1},
      ...
    }
```

The base station may configure one or more search space sets in the UE according to configuration information. According to an embodiment of the disclosure, the base station may configure search space set 1 in the UE so that DCI format A scrambled with an X-RNTI is monitored in the common search space, and may configure search space set 2 in the UE so that DCI format B scrambled with a Y-RNTI is monitored in the UE-specific search space.

According to the configuration information, the common search space or the UE-specific search space may include one or more search space sets. For example, search space set #1 and search space set #2 may be configured as the common search space, and search space set #3 and search space set #4 may be configured as the UE-specific search space.

In the common search space, a combination of a DCI format and an RNTI as follows may be monitored. However, the disclosure is not limited thereto.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of a DCI format and an RNTI as follows may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and usages.

Cell RNTI (C-RNTI): For scheduling UE-specific PDSCH

MCS-C-RNTI (Modulation Coding Scheme C-RNTI): For scheduling UE-specific PDSCH

Temporary Cell RNTI (TC-RNTI): For scheduling UE-specific PDSCH

Configured Scheduling RNTI (CS-RNTI): For scheduling semi-statically configured UE-specific PDSCH Random Access RNTI (RA-RNTI): For scheduling PDSCH in random access operation Paging RNTI (P-RNTI): For scheduling PDSCH in which paging is transmitted System Information RNTI (SI-RNTI): For scheduling PDSCH in which system information is transmitted Interruption RNTI (INT-RNTI): For notifying whether to puncture PDSCH Transmit Power Control for PUSCH RNTI (TPC-PUSCH-RNTI): For indicating power control command for PUSCH Transmit Power Control for PUCCH RNTI (TPC-PUCCH-RNTI): For indicating power control command for PUCCH Transmit Power Control for SRS RNTI (TPC-SRS-RNTI): For indicating power control command for sounding reference signal (SRS)

The specified DCI formats may follow definitions of Table 20.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G wireless communication system, a search space of an aggregation level L in a control resource set p and a search space set s may be expressed as in Equation 1.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{[Equation 1]}$$

L: Aggregation level $n_{CI}$: Carrier index $N_{CCE,p}$: Total number of CCEs present in control resource set p $n_{s,f}^{\mu}$: Slot index $M_{p,s,max}^{(L)}$: Number of PDCCH candidates of aggregation level L $m_{s,n_{CI}} = 0, \ldots, M_{p,s,max}^{(L)} - 1$: Index of PDCCH candidates of aggregation level L $i = 0, \ldots, L-1$ $Y_{p,n_{s,f}^{\mu}} = (A_p \cdot Y_{p,n_{s,f}^{\mu}-1}) \mod D$, $Y_{p,-1} = n_{RNTI} \neq 0$, $A_0 = 39827$, $A_1 = 39829$, $A_2 = 39839$, $D = 65537$ $n_{RNTI}$: UE identifier $Y_{p, n_{s,f}^{\mu}}$ may correspond to 0 for a common search space.

$Y_{p, n_{s,f}^{\mu}}$ may correspond to a value that changes according to a UE Identity (C-RNTI or ID configured by the base station for the UE) and time index for a UE-specific search space.

Figure 6:
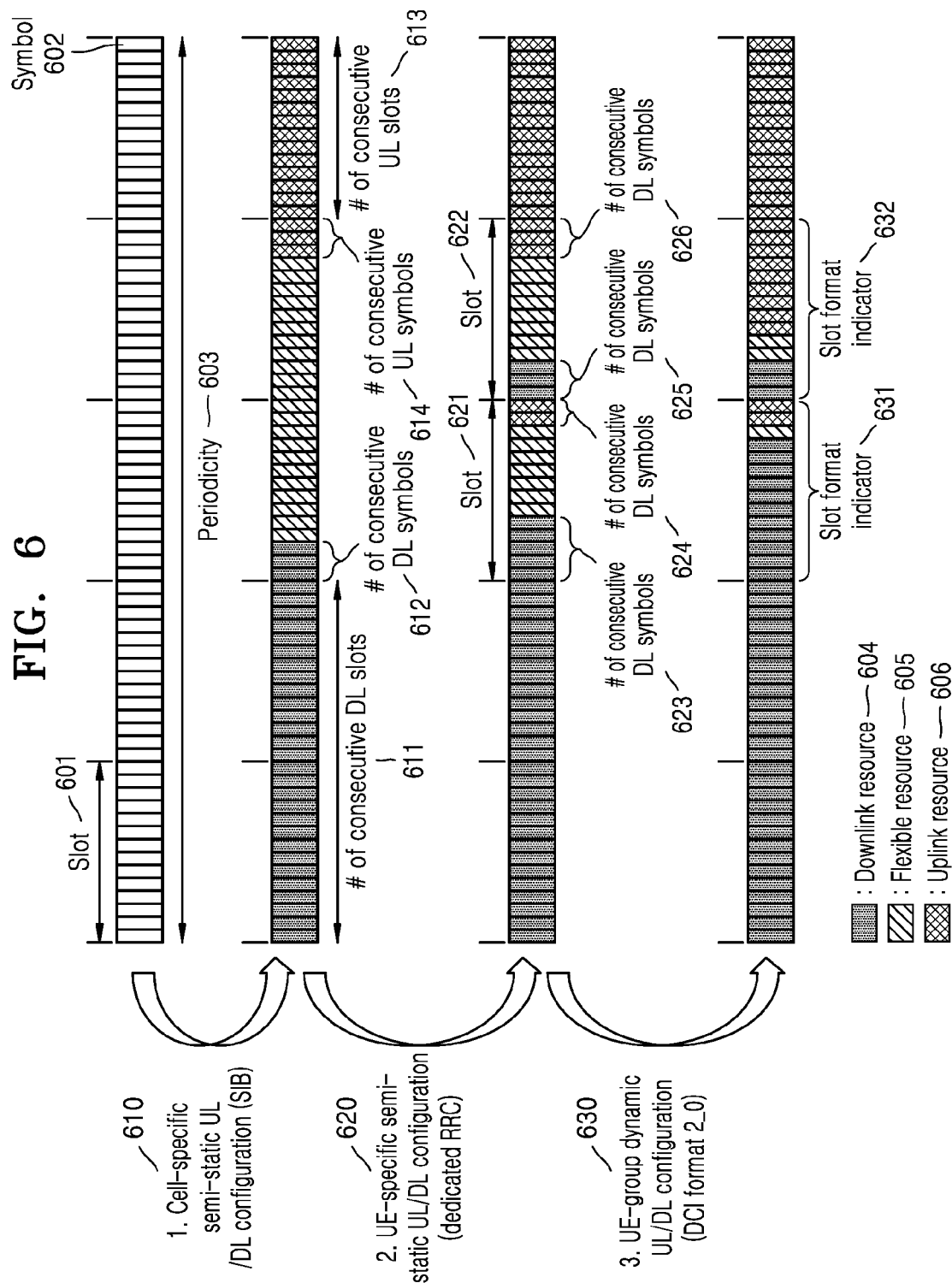
FIG. 6 illustrates a diagram of an uplink and downlink resource configuration method of a 5G wireless communication system.

FIG. 6 illustrates a diagram of uplink-downlink configuration considered in a 5G communication system. In this case, a downlink resource 604, a flexible resource 605, and an uplink resource 606 are shown in different patterns.

Referring to FIG. 6, a slot 601 may include 14 symbols 602. In a 5G communication system, uplink-downlink configuration of a symbol/slot may be configured in three steps. Firstly, uplink-downlink of the symbol/slot may be configured, through cell-specific semi-static uplink-downlink configuration information 610 through system information in a symbol unit. In detail, uplink-downlink pattern information and reference subcarrier information may be included in the cell-specific uplink-downlink configuration information through the system information. In the uplink-downlink pattern information, a pattern periodicity 603, the number of consecutive downlink slots 611 from a start point of each pattern, the number of symbols 612 of a next slot, the number of consecutive uplink slots 613 from the end of the pattern, and the number of symbols 614 of a next slot may be indicated. In this case, a slot/symbol not indicated as uplink and downlink may be determined as a flexible slot/symbol.

Secondly, through user-specific configuration information 620 through dedicated higher layer signaling, slots 621 and 622 including a flexible slot or a flexible symbol may be respectively indicated by the numbers of consecutive downlink symbols 623 and 625 each from a starting symbol of each slot and by the numbers of consecutive uplink symbols 624 and 626 each from the end of the slot, or may be indicated by entire slot downlink or entire slot uplink.

Also, lastly, in order to dynamically change a downlink signal transmission interval and an uplink signal transmission interval, regarding symbols indicated as flexible symbols in each slot (i.e., symbols not indicated as downlink and uplink), it may be indicated whether each is a downlink symbol, an uplink symbol, or a flexible symbol through slot format indicators (SFI) 631 and 632 included in downlink control channel configuration information 630. The slot format indicator may be selected by one index in a table in which uplink-downlink configuration of 14 symbols in one slot is pre-configured as in Table 21.

TABLE 21

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |

TABLE 21-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | U | U |
| 33 | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |

TABLE 21-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | D | D | F | U | U | U | U | U |
| 48 | D | F | U | U | U | U | D | F | U | U | U | U | U | U |
| 49 | D | D | D | D | D | U | D | D | D | F | F | F | U |
| 50 | D | D | F | U | U | U | D | D | F | U | U | U | U | U |
| 51 | D | F | F | U | U | U | D | F | U | U | U | U | U | U |
| 52 | D | F | F | F | F | F | U | D | F | F | F | F | F | U |
| 53 | D | D | F | F | F | F | U | D | F | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

[Csi Framework]

In NR, the base station has a channel state information (CSI) framework for indicating measurement and reporting of CSI of the UE. The CSI framework of NR may include at least two elements including resource setting and report setting. Report setting may have a connection relationship with resource setting by referring to at least one ID of the resource setting.

According to an embodiment of the disclosure, resource setting may include information related to a reference signal (RS) for measuring the CSI by the UE. The base station may configure at least one resource setting in the UE. For example, the base station and the UE may exchange signaling information as shown in Table 22 to transmit information about resource setting. However, the disclosure is not limited thereto.

TABLE 22

```
-- ASN1START
-- TAG-CSI-RESOURCECONFIG-START
CSI-ResourceConfig ::=       SEQUENCE {
  csi-ResourceConfigId       CSI-ResourceConfigId,
  csi-RS-ResourceSetList     CHOICE {
    nzp-CSI-RS-SSB           SEQUENCE {
      nzp-CSI-RS-ResourceSetList   SEQUENCE (SIZE (1..maxNrofNZP-CSI-RS-
ResourceSetsPerConfig)) OF NZP-CSI-RS-ResourceSetId
OPTIONAL, -- Need R
      csi-SSB-ResourceSetList    SEQUENCE (SIZE (1..maxNrofCSI-SSB-
ResourceSetsPerConfig)) OF CSI-SSB-ResourceSetId
OPTIONAL   -- Need R
    },
    csi-IM-ResourceSetList      SEQUENCE (SIZE (1..maxNrofCSI-IM-
ResourceSetsPerConfig)) OF CSI-IM-ResourceSetId
  },
  bwp-Id                     BWP-Id,
  resourceType               ENUMERATED { aperiodic, semiPersistent, periodic },
  ...
}
-- TAG-CSI-RESOURCECONFIG-STOP
-- ASN1STOP
```

In Table 22, signaling information CSI-ResourceConfig may include information about each resource setting. According to the signaling information, each resource setting may include a resource setting index (csi-ResourceConfigId), a BWP index (bwp-ID), time domain transmission configuration of resources (resourceType), or a resource set list (csi-RS-ResourceSetList) including at least one resource set. The time domain transmission configuration of resources may be configured to be aperiodic transmission, semi-persistent transmission, or periodic transmission. The resource set list may be a set including resource sets for channel measurement, or a set including resource sets for interference measurement. When the resource set list is a set including resource sets for channel measurement, each resource set may include at least one resource, and the at least one resource may correspond to an index of a CSI reference signal (CSI-RS) resource or a synchronization/broadcast channel block (SS/PBCH block, SSB). When the resource set list is a set including resource sets for interference measurement, each resource set may include at least one interference measurement resource (CSI interference measurement, CSI-IM).

For example, when a resource set includes a CSI-RS, the base station and the UE may exchange signaling information as shown in Table 23 to transmit information about the resource set. However, the disclosure is not limited thereto.

TABLE 23

```
-- ASN1START
-- TAG-NZP-CSI-RS-RESOURCESET-START
NZP-CSI-RS-ResourceSet ::=    SEQUENCE {
    nzp-CSI-ResourceSetId         NZP-CSI-RS-ResourceSetId,
    nzp-CSI-RS-Resources          SEQUENCE (SIZE (1..maxNrofNZP-CSI-RS-
ResourcesPerSet)) OF NZP-CSI-RS-ResourceId,
    repetition                    ENUMERATED { on, off }
OPTIONAL,    -- Need S
    aperiodicTriggeringOffset     INTEGER(0..6)
OPTIONAL,    -- Need S
    trs-Info                      ENUMERATED {true}
OPTIONAL,    -- Need R
    ...
}
-- TAG-NZP-CSI-RS-RESOURCESET-STOP
-- ASN1STOP
```

In Table 23, signaling information NZP-CSI-RS-ResourceSet includes information about each resource set. According to the signaling information, each resource set may include at least information about a resource set index (nzp-CSI-ResourceSetId) or a CSI-RS index set (nzp-CSI-RS-Resources). Further, each resource set may include a part of information (repetition) about a spatial domain transmission filter of a CSI-RS resource or information (trs-Info) about whether the CSI-RS resource has a tracking purpose.

A CSI-RS may be a most representative reference signal included in a resource set. The base station and the UE may exchange signaling information as shown in Table 24 to transmit information about a CSI-RS resource. However, the disclosure is not limited thereto.

TABLE 24

```
-- ASN1START
-- TAG-NZP-CSI-RS-RESOURCE-START
NZP-CSI-RS-Resource ::=    SEQUENCE {
    nzp-CSI-RS-ResourceId      NZP-CSI-RS-ResourceId,
    resourceMapping            CSI-RS-ResourceMapping,
    powerControlOffset         INTEGER (-8..15),
    powerControlOffsetSS       ENUMERATED {db-3, db0, db3, db6}
OPTIONAL,    -- Need R
    scramblingID               ScramblingId,
    periodicityAndOffset       CSI-ResourcePeriodicityAndOffset
OPTIONAL,    -- Cond PeriodicOrSemiPersistent
    qcl-InfoPeriodicCSI-RS     TCI-StateId
OPTIONAL,    -- Cond Periodic
    ...
}
```

TABLE 24-continued

```
-- TAG-NZP-CSI-RS-RESOURCE-STOP
-- ASN1STOP
```

In Table 24, signaling information NZP-CSI-RS-Resource includes information about each CSI-RS. Information included in the signaling information NZP-CSI-RS-Resource may have the following meaning.

nzp-CSI-RS-ResourceId: CSI-RS resource index resourceMapping: resource mapping information of a CSI-RS resource powerControlOffset: ratio between PDSCH EPRE (Energy Per RE) and CSI-RS EPRE powerControlOffsetSS: ratio between SS/PBCH block EPRE and CSI-RS EPRE scramblingID: scrambling index of CSI-RS sequence periodicityAndOffset: transmission period and slot offset of CSI-RS resource qcl-InfoPeriodicCSI-RS: TCI-state information when corresponding CSI-RS is periodic CSI-RS "resourceMapping" included in the signaling information NZP-CSI-RS-Resource may indicate resource mapping information of a CSI-RS resource, and may include resource element (RE) mapping for frequency resources, the number of ports, symbol mapping, CDM type, frequency resource density, and frequency band mapping information. Each of the number of ports, frequency resource density, CDM type, and time-frequency domain RE mapping, which may be configured through the resource mapping information, may have a determined value in one of the rows of Table 25.

TABLE 25

| Row | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |

TABLE 25-continued

| Row | Ports X | Density ρ | cdm-Type | $(\bar{k}, \bar{l})$ | CDM group index j | k' | l' |
|---|---|---|---|---|---|---|---|
| 13 | 24 | 1, 0.5 | FD-CDM2 | $(k_0, l_0), (k_1, l_0), (k_2, l_0),$<br>$(k_0, l_0 + 1), (k_1, l_0 + 1), (k_2, l_0 + 1),$<br>$(k_0, l_1), (k_1, l_1), (k_2, l_1),$<br>$(k_0, l_1 + 1), (k_1, l_1 + 1), (k_2, l_1 + 1)$ | 0, 1, 2, 3, 4, 5,<br>6, 7, 8, 9, 10, 11 | 0, 1 | 0 |
| 14 | 24 | 1, 0.5 | CDM4<br>(FD2, TD2) | $(k_0, l_0), (k_1, l_0), (k_2, l_0),$<br>$(k_0, l_1), (k_1, l_1), (k_2, l_1)$ | 0, 1, 2, 3, 4, 5 | 0, 1 | 0, 1 |
| 15 | 24 | 1, 0.5 | CDM8<br>(FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$<br>$(k_0, l_0 + 1), (k_1, l_0 + 1), (k_2, l_0 + 1), (k_3, l_0 + 1),$<br>$(k_0, l_1), (k_1, l_1), (k_2, l_1), (k_3, l_1),$<br>$(k_0, l_1 + 1), (k_1, l_1 + 1), (k_2, l_1 + 1), (k_3, l_1 + 1)$ | 0, 1, 2, 3, 4, 5, 6, 7, 8,<br>9, 10, 11, 12, 13, 14, 15 | 0, 1 | 0 |
| 17 | 32 | 1, 0.5 | CDM4<br>(FD2, TD2) | $(k_0, l_0), (k_1, l_0), (k_2, l_0), (k_3, l_0),$<br>$(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8<br>(FD2, TD4) | $(k_0, l_0), (k_1, l_0), (k_2, l_0), (k_3, l_0)$ | 0, 1, 2, 3 | 0, 1 | 0, 1, 2, 3 |

Table 25 shows a frequency resource density configurable according to the number (X) of CSI-RS ports, a CDM type, frequency and time domain starting positions $(\bar{k}, \bar{l})$ of a CSI-RS component RE pattern, and the number (k') of frequency domain REs and the number (l') of time domain REs of the CSI-RS component RE pattern. The CSI-RS component RE pattern described above may be a basic unit for configuring a CSI-RS resource. The CSI-RS component RE pattern may include YZ REs through Y=1+max(k') frequency domain REs and Z=1+max(l') time domain REs.

For example, when the number of CSI-RS ports is 1, a position of a CSI-RS RE may be designated in a physical resource block (PRB) without restriction on subcarriers, and may be designated by a bitmap having 12 bits. When the number of CSI-RS ports is one of {2, 4, 8, 12, 16, 24, 32}, and Y=2, a position of a CSI-RS RE may be designated for every two subcarriers in a PRB, and may be designated by a bitmap having 6 bits. When the number of CSI-RS ports is 4, and Y=4, a position of a CSI-RS RE may be designated for every four subcarriers in a PRB, and may be designated by a bitmap having 3 bits. Likewise, a time-axis RE location may be assigned by a total 14-bit bitmap. Although a length of a bitmap may vary, like in frequency position designation, according to a Z value of Table 18, the principle of the change is similar to the above description, and thus, a repeated description will be omitted.

According to an embodiment of the disclosure, report setting may have connections with resource setting by referring to at least one ID of the resource setting, and resource setting(s) having connections with report setting may provide configuration information including information about an RS for channel information measurement. When resource setting(s) having connections with report setting is used for channel information measurement, the measured channel information may be used for channel information reporting based on a reporting method configured in report setting having the connections.

According to an embodiment of the disclosure, report setting may include configuration information related to a CSI reporting method. For example, the base station and the UE may exchange signaling information as shown in Table 26 to transmit information about report setting. However, the disclosure is not limited thereto.

TABLE 26

```
-- ASN1START
-- TAG-CSI-REPORTCONFIG-START
CSI-ReportConfig ::=                       SEQUENCE {
    reportConfigId                             CSI-ReportConfigId,
    carrier                                    ServCellIndex                    OPTIONAL,  -- Need S
    resourcesForChannelMeasurement             CSI-ResourceConfigId,
    csi-IM-ResourcesForInterference            CSI-ResourceConfigId             OPTIONAL,  -- Need R
    nzp-CSI-RS-ResourcesForInterference        CSI-ResourceConfigId             OPTIONAL,  -- Need R
    reportConfigType                           CHOICE {
        periodic                                   SEQUENCE {
            reportSlotConfig                           CSI-ReportPeriodicityAndOffset,
            pucch-CSI-ResourceList                     SEQUENCE (SIZE (1..maxNrofBWPs)) OF PUCCH-CSI-
Resource
        },
        semiPersistentOnPUCCH                      SEQUENCE {
            reportSlotConfig                           CSI-ReportPeriodicityAndOffset,
            pucch-CSI-ResourceList                     SEQUENCE (SIZE (1..maxNrofBWPs)) OF PUCCH-CSI-
Resource
        },
        semiPersistentOnPUSCH                      SEQUENCE {
            reportSlotConfig                           ENUMERATED (sl5, sl10, sl20, sl40, sl80, sl160,
sl320},
            reportSlotOffsetList                       SEQUENCE (SIZE (1..maxNrofUL-Allocations)) OF
INTEGER(0..32),
            p0alpha                                    P0-PUSCH-AlphaSetId
        },
        aperiodic                                  SEQUENCE {
            reportSlotOffsetList                       SEQUENCE (SIZE (1..maxNrofUL-Allocations)) OF
```

TABLE 26-continued

```
        INTEGER(0 . . 32)
        }
    },
    reportQuantity                              CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                      ENUMERATED {n2, n4}
OPTIONAL  -- Need S
        },
        cri-RI-CQI                                  NULL,
        cri-RSRP                                    NULL,
        ssb-Index-RSRP                              NULL,
        cri-RI-LI-PMI-CQI                           NULL
    },
    reportFreqConfiguration                     SEQUENCE {
        cqi-FormatIndicator                         ENUMERATED { widebandCQI, subbandCQI }
OPTIONAL,  -- Need R
        pmi-FormatIndicator                         ENUMERATED { widebandPMI, subbandPMI }
OPTIONAL,  -- Need R
        csi-ReportingBand                           CHOICE {
            subbands3                                   BIT STRING(SIZE(3)),
            subbands4                                   BIT STRING(SIZE(4)),
            subbands5                                   BIT STRING(SIZE(5)),
            subbands6                                   BIT STRING(SIZE(6)),
            subbands7                                   BIT STRING(SIZE(7)),
            subbands8                                   BIT STRING(SIZE(8)),
            subbands9                                   BIT STRING(SIZE(9)),
            subbands10                                  BIT STRING(SIZE(10)),
            subbands11                                  BIT STRING(SIZE(11)),
            subbands12                                  BIT STRING(SIZE(12)),
            subbands13                                  BIT STRING(SIZE(13)),
            subbands14                                  BIT STRING(SIZE(14)),
            subbands15                                  BIT STRING(SIZE(15)),
            subbands16                                  BIT STRING(SIZE(16)),
            subbands17                                  BIT STRING(SIZE(17)),
            subbands18                                  BIT STRING(SIZE(18)),
            ...,
            subbands19-v1530                            BIT STRING(SIZE(19))
        }                   OPTIONAL  -- Need S
    }
OPTIONAL,  -- Need R
    timeRestrictionForChannelMeasurements       ENUMERATED {configured, notConfigured},
    timeRestrictionForInterferenceMeasurements      ENUMERATED {configured, notConfigured},
    codebookConfig                              CodebookConfig
OPTIONAL,  -- Need R
    dummy                                       ENUMERATED {n1, n2}
OPTIONAL,  -- Need R
    groupBasedBeamReporting                     CHOICE {
        enabled                                     NULL,
        disabled                                    SEQUENCE {
            nrofReportedRS                              ENUMERATED {n1, n2, n3, n4}
OPTIONAL  -- Need S
        }
    },
    cqi-Table                                   ENUMERATED {table1, table2, table3, spare1}
OPTIONAL,  -- Need R
    subbandSize                                 ENUMERATED {value1, value2},
    non-PMI-PortIndication                      SEQUENCE (SIZE (1..maxNrofNZP-CSI-RS-ResourcesPerConfig)) OF
PortIndexFor8Ranks OPTIONAL,  -- Need R
    ...,
    [[
    semiPersistentOnPUSCH-v1530                 SEQUENCE {
        reportSlotConfig-v1530                      ENUMERATED {sl4, sl8, sl16}
    }
OPTIONAL  -- Need R
    ]]
}
```

In Table 26, signaling information CSI-ReportConfig may include information about each report setting. Information included in the signaling information CSI-ReportConfig may have the following meaning.

reportConfigId: report setting index carrier: serving cell index resourcesForChannelMeasurement: resource setting index for channel measurement having connections with report setting csi-IM-ResourcesForInterference: resource setting index for CSI-IM for interference measurement having connections with report setting nzp-CSI-RS-ResourcesForInterference: resource setting index for CSI-RS index for interference measurement having connections with report setting reportConfigType: time-domain transmission setting and transmission channel of channel report, which may have configuration of aperiodic transmission, semi-persistent PUCCH transmission, semi-periodic PUSCH transmission, or periodic transmission reportQuantity: type of channel information to be reported, which may have type of channel information 'cri-RI-PMI-CQI', 'cri-RI-il', 'cri-RI-CQI', 'cri-RSRP', 'ssb-Index-RSRP', or 'cri-RI-LI-PMI-CQI', for case where channel report is not transmitted ('none') and case where channel report is transmitted Herein, an element included in the type of the channel information may mean a channel quality indicator (CQI), a precoding matrix indicator (PMI), a CSI-RS resource indicator (CRI), an SS/PBCH block resource indicator (SSBRI), a layer indicator (LI), a rank indicator (RI), and/or L1-reference signal received power (RSRP).

reportFreqConfiguration: whether channel information to be reported includes information about the entire wideband or information about each subband, in which when the channel information includes the information about each subband, configuration information about a subband including the channel information may be included timeRestrictionForChannelMeasurements: whether to restrict the time-domain regarding reference signal for channel measurement from among reference signals to which the channel information to be reported refers timeRestrictionForInterferenceMeasurements: whether to restrict the time-domain regarding reference signal for interference measurement from among reference signals to which the channel information to be reported refers codebookConfig: codebook information to which channel information to be reported refers groupBasedBeamReporting: whether to perform beam grouping of channel report cqi-Table: CQI table index to which channel information to be reported refers subbandSize: index indicating the subband size of channel information non-PMI-PortIndication: port mapping information which is to be referred to when non-PMI channel information is reported When the base station indicates a channel information report through higher-layer signaling or L1 signaling, the UE may perform channel information reporting by referring to the configuration information included in indicated report setting.

The base station may indicate a CSI report to the UE through higher-layer signaling including RRC signaling, MAC CE signaling or L1 signaling (e.g., common DCI, group-common DCI, or UE-specific DCI).

For example, the base station may indicate an aperiodic CSI report to the UE through higher-layer signaling or DCI using DCI format 0_1. The base station may configure a parameter for an aperiodic CSI report of the UE or multiple CSI report trigger states including a parameter for a CSI report through higher-layer signaling. The parameter for the CSI report or the CSI report trigger state may include a group including a slot interval between a PDCCH including DCI and a PUSCH including a CSI report or a possible slot interval, an RS ID for channel state measurement, a type of included channel information, etc.

According to an embodiment of the disclosure, when the base station indicates some of the multiple CSI report trigger states to the UE through the DCI, the UE reports channel information according to CSI report configuration of report setting configured in the indicated CSI report trigger state. The channel information reporting may be performed through a PUSCH scheduled in DCI format 0_1. Time-domain resource allocation of a PUSCH including a CSI report of the UE may be indicated through a slot interval with a PDCCH indicated through the DCI, a start symbol, and a symbol length in a slot for time-domain resource allocation of the PUSCH, etc. For example, a position of the slot in which the PUSCH including the CSI report of the UE is transmitted may be indicated through the slot interval with the PDCCH indicated through the DCI, and the start symbol and the symbol length in the slot may be indicated through a time-domain resource assignment field of the DCI.

For example, the base station may indicate a semi-persistent CSI report transmitted in a PUSCH to the UE through the DCI using DCI format 0_1. The base station may activate or deactivate the semi-persistent CSI report transmitted in the PUSCH through the DCI scrambled with a semi-persistent CSI-RNTI (SP-CSI-RNTI). When the semi-persistent CSI report is activated, the UE may periodically report channel information according to a configured slot interval. When the semi-persistent CSI report is deactivated, the UE may stop the activated periodic channel information reporting. The base station may configure a parameter for a semi-persistent CSI report of the UE or multiple CSI report trigger states including the parameter for the semi-persistent CSI report through higher-layer signaling. The parameter for the CSI report or the CSI report trigger state may include a group including a slot interval between a PDCCH including DCI indicating a CSI report and a PUSCH including a CSI report or a possible slot interval, a slot interval between a slot activated by higher layer signaling indicating a CSI report and a PUSCH including a CSI report, a slot interval period of a CSI report, a type of included channel information, etc. When the base station activates some of the multiple CSI report trigger states or some of the multiple report settings to the UE through higher-layer signaling or DCI, the UE may report channel information according to report setting included in the indicated CSI report trigger state or CSI report configuration configured in the activated report setting.

According to an embodiment of the disclosure, the channel information reporting may be performed through a PUSCH semi-persistently scheduled in DCI format 0_1 scrambled with an SP-CSI-RNTI. Time-domain resource allocation of a PUSCH including a CSI report of the UE may be indicated through a slot interval period of the CSI report, a slot interval with a slot in which higher-layer signaling is activated or a slot interval with a PDCCH indicated through DCI, a start symbol, and a symbol length in a slot for time-domain resource allocation of the PUSCH, etc. For example, a position of the slot in which the PUSCH including the CSI report of the UE is transmitted may be indicated through the slot interval with the PDCCH indicated through the DCI, and the start symbol and the symbol length in the slot may be indicated through a time-domain resource assignment field of DCI format 0_1.

For example, the base station may indicate a semi-persistent CSI report transmitted in a PUCCH to the UE through higher layer signaling such as MAC-CE. Through MAC-CE signaling, the base station may activate or deactivate the semi-persistent CSI report transmitted in the PUCCH through MAC-CE signaling. When the semi-persistent CSI report is activated, the UE may periodically report channel information according to a configured slot interval. When the semi-persistent CSI report is deactivated, the UE may stop the activated periodic channel information reporting.

According to an embodiment of the disclosure, the base station may configure a parameter for a semi-persistent CSI report of the UE through higher layer signaling. The parameter for the CSI report may include a PUCCH resource in which the CSI report is transmitted, a slot interval period of the CSI report, a type of included channel information, etc. The UE may transmit the CSI report through the PUCCH. When the PUCCH for the CSI report overlaps a PUSCH, the UE may transmit the CSI report through the PUSCH. A position of the slot in which the PUCCH including the CSI report of the UE is transmitted may be indicated through a slot interval period of the CSI report configured through higher layer signaling and a slot interval between a slot in which higher layer signaling is activated and a PUCCH including a CSI report, and a start symbol and a symbol length in the slot may be indicated through a start symbol and a symbol length for PUCCH resource allocation configured through higher layer signaling.

For example, the base station may indicate a periodic CSI report to the UE through higher layer signaling. The base station may activate or deactivate the periodic CSI report through higher layer signaling including RRC signaling. When the periodic CSI report is activated, the UE may periodically report channel information according to a configured slot interval. When the periodic CSI report is deactivated, the UE may stop the activated periodic channel information reporting.

According to an embodiment of the disclosure, the base station may configure report setting including a parameter for a periodic CSI report of the UE through higher layer signaling. The parameter for the CSI report may include a PUCCH resource configuration for a CSI report, a slot interval between a slot in which higher layer signaling indicating a CSI report is activated and a PUCCH including a CSI report, a slot interval period of the CSI report, an RS ID for channel state measurement, a type of included channel information, etc. The UE may transmit the CSI report through the PUCCH. When the PUCCH for the CSI report overlaps a PUSCH, the UE may transmit the CSI report through the PUSCH. A position of the slot in which the PUCCH including the CSI report of the UE is transmitted may be indicated through the slot interval period of the CSI report configured through higher layer signaling and the slot interval between the slot in which higher layer signaling is activated and the PUCCH including the CSI report, and a start symbol a symbol length in the slot may be indicated through a start symbol and a symbol length for PUCCH resource allocation configured through higher layer signaling.

When the base station indicates an aperiodic CSI report or a semi-persistent CSI report to the UE through the DCI, the UE may determine whether valid channel reporting may be performed through the indicated CSI report, by considering a CSI computation time necessary for the CSI report. The UE may perform valid CSI reporting from an uplink symbol after a Z symbol from the end of a last symbol included in a PDCCH including the DCI indicating the CSI report, for the aperiodic CSI report or the semi-persistent CSI report indicated by the DCI. The Z symbol may vary according to a numerology of a downlink BWP corresponding to the PDCCH including the DCI indicating the CSI report, a numerology of an uplink BWP corresponding to a PUSCH in which the CSI report is transmitted, or a type or characteristics (report quantity, frequency band granularity, a port number of an RS, a codebook type, etc.) of channel information reported in the CSI report.

In other words, to determine a certain CSI report as a valid CSI report (to determine a corresponding CSI report as a valid CSI report), uplink transmission of the CSI report should not be performed prior to a Zref symbol including a timing advance. In this case, the Zref symbol is an uplink symbol in which a cyclic prefix (CP) starts after a time $T_c = 1/(\Delta f_{max} \cdot N_f)$ from the end of a last symbol of a triggering PDCCH. A detailed value of Z may follow the description provided below, and $T_c = 1/(\Delta f_{max} \cdot N_f)$, $\Delta f_{max} = 480 \cdot 10^3$ Hz, $N_f = 4096$, $\kappa = 64$, and $\mu$ is a numerology. In this case, $\mu$ may be agreed to use one of $(\mu_{PDCCH}, \mu_{CSI-RS}, \mu_{UL})$, which causes the greatest $T_{proc,CSI}$, and $\mu_{PDCCH}$ may be a subcarrier spacing used for PDCCH transmission, $\mu_{CSI-RS}$ may be a subcarrier spacing used for CSI-RS transmission, and may be a subcarrier spacing of an uplink channel used for uplink control information (UCI) transmission for CSI reporting. In another example, $\mu$ may be agreed to use one of $(\mu_{PDCCH}, \mu_{UL})$, which causes the greatest $T_{proc,CSI}$. See the above description for definitions of $\mu_{PDCCH}$ and $\mu_{UL}$. For convenience of explanation, satisfying the above condition may be referred to as satisfying CSI reporting validity condition 1.

In addition, when an RS for channel measurement with respect to a aperiodic CSI report indicated to the UE through the DCI is an aperiodic RS, the UE may perform valid CSI reporting from an uplink symbol after a Z' symbol from the end of a last symbol including the RS, and the Z' symbol may vary according to a numerology of a downlink BWP corresponding to a PDCCH including the DCI indicating the CSI report corresponds, a numerology of a bandwidth corresponding to the RS for channel measurement for the CSI report, a numerology of an uplink BWP corresponding to a PUSCH in which the CSI report is transmitted, or a type or characteristics (report quantity, frequency band granularity, a port number of an RS, a codebook type, etc.) of channel information reported in the CSI report.

In other words, to determine a certain CSI report as a valid CSI report (to determine a corresponding CSI report as a valid CSI report), uplink transmission of the CSI report should not be performed prior to a Zref symbol including a timing advance. In this case, the Zref symbol is an uplink symbol in which a cyclic prefix (CP) starts after a time $T'_{proc,CSI} = (Z')(2048+144) \cdot \kappa 2^{-\mu} \cdot T_C$ from the end of a last symbol of an aperiodic CSI-RS or an aperiodic CSI-IM triggered by a triggering PDCCH. A detailed value of Z' may follow the description provided below, and $T_c = 1/(\Delta f_{max} \cdot N_f)$, $\Delta f_{max} = 480 \cdot 10^3$ Hz, $N_f = 4096$, $\kappa = 64$, and $\mu$ is a numerology. In this case, $\mu$ may be agreed to use one of $(\mu_{PDCCH}, \mu_{CSI-RS}, \mu_{UL})$, which causes the greatest $T_{proc,CSI}$ and $\mu_{PDCCH}$ may be a subcarrier spacing used for triggering PDCCH transmission, $\mu_{CSI-RS}$ may be a subcarrier spacing used for CSI-RS transmission, and $\mu_{UL}$ may be a subcarrier spacing of an uplink channel used for uplink control information (UCI) transmission for CSI reporting. In another example, $\mu$ may be agreed to use one of ($\mu$_PDCCH,$\mu$_UL), which causes the greatest $T_{proc,CSI}$. In this case, see the above description for definitions $\mu_{PDCCH}$ of and $\mu_{UL}$. For convenience of explanation, satisfying the above condition may be referred to as satisfying CSI reporting validity condition 2.

When the base station indicates an aperiodic CSI report for an aperiodic RS to the UE through the DCI, the UE may perform valid CSI reporting from a first uplink symbol which satisfies both a time point after a Z symbol from the end of a last symbol included in a PDCCH including the DCI indicating the CSI report and a time point after a Z' symbol from the end of a last symbol including the RS. That is, for aperiodic CSI reporting based on the aperiodic RS, the CSI report is determined as a valid CSI report when both CSI reporting validity conditions 1 and 2 are satisfied.

When a CSI reporting time indicated by the base station fails to satisfy CSI computation time requirements, the UE may determine the CSI report as being invalid and may not consider updating of a channel information state for the CSI report.

The Z and Z' symbols for calculation of the CSI computation time follow Table 27 and Table 28. For example, when channel information reported in the CSI report includes only wideband information, a port number of the RS is 4 or less, the number of RS resources is one, and a codebook type is 'typeI-SinglePanel' or a type (report quantity) of channel information to be reported is 'cri-RI-CQI', the Z and Z' symbols follow the value $Z_1$, $Z'_1$ of Table 28. This will be referred to as delay requirement 2. In addition, when a PUSCH including the CSI report does not include a TB or a hybrid automatic request (HARQ)-acknowledgement (ACK) and a CPU occupation of the UE is 0, the Z and Z' symbols follow the value $Z_1$, $Z'_1$ of Table 27, which will be referred to as delay requirement 1. The CPU occupation will be described below in detail. When the report quantity is 'cri-RSRP' or 'ssb-Index-RSRP', the Z and Z' symbols follow the value $Z_3$, $Z'_3$ of Table 28. X1, X2, X3, and X4 of Table 28 denote a UE capability for a beam reporting time, and KB1 and KB2 of Table 28 denote a UE capability for a beam changing time. When not corresponding to the type or characteristics of the channel information to be reported in the CSI report, the Z and Z' symbols follow the value $Z_2$, $Z'_2$ of Table 28.

TABLE 27

| | $Z_1$ [symbols] | |
|---|---|---|
| $\mu$ | $Z_1$ | $Z_1'$ |
| 0 | 10 | 8 |
| 1 | 13 | 11 |
| 2 | 25 | 21 |
| 3 | 43 | 36 |

TABLE 28

| | $Z_1$ [symbols] | | $Z_2$ [symbols] | | $Z_3$ [symbols] | |
|---|---|---|---|---|---|---|
| $\mu$ | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When the base station indicates an aperiodic/semi-persistent/periodic CSI report to the UE, the base station may configure a CSI reference resource to determine a reference time and frequency for a channel to be reported in the CSI report. A frequency of the CSI reference resource may be carrier and subband information for measuring CSI, indicated in CSI report configuration, and may each correspond to carrier and reportFreqConfiguration in Table 26. A time of the CSI reference resource may be defined based on a time at which the CSI report is transmitted.

For example, when CSI report #X is indicated to be transmitted in an uplink slot n' of a carrier and BWP for transmitting a CSI report, a time of a CSI reference resource of CSI report #X may be defined as a downlink slot n-nCSI-ref of a carrier and BWP for measuring CSI. The downlink slot n is calculated as $n=\lfloor n' \cdot 2^{\mu_{DL}}/2^{\mu_{UL}} \rfloor$, when a numerology of the carrier and BWP for measuring the CSI is $\mu DL$ and a numerology of the carrier and BWP for transmitting CSI report #X is $\mu UL$. When CSI report #X transmitted in the uplink slot n' is a semi-persistent or periodic CSI report, a slot interval nCSI-ref between the downlink slot n and a CSI reference signal follows $n_{CSI-ref}=4 \cdot 2^{\mu_{DL}}$ when a single CSI-RS resource is connected to the CSI report and follows $n_{CSI-ref}=5 \cdot 2^{\mu_{UL}}$ when multiple CSI-RS resources are connected to the CSI report, according to the number of CSI-RS resources for channel measurement. When CSI report #X transmitted in the uplink slot n' is an aperiodic CSI report, CSI report #X may be calculated as $n_{CSI-RS}=\lfloor Z'/N_{symb}^{slot} \rfloor$ by considering a CSI computation time Z' for channel measurement. $N_{symb}^{slot}$ may be the number of symbols included in one slot, and $N_{symb}^{slot}=14$ is assumed in NR When the base station indicates to the UE to transmit a certain CSI report in an uplink slot n' through higher layer signaling or DCI, the UE may report CSI by performing channel measurement or interference measurement with respect to a CSI-RS resource, a CSI-IM resource, and an SSB resource transmitted not later than a CSI reference resource slot of the CSI report transmitted in the uplink slot n' from among the CSI-RS resource, the CSI-IM resource, and the SSB resource associated with the CSI report.

The CSI-RS resource, the CSI-IM resource, or the SSB resource associated with the CSI report may be a CSI-RS resource, a CSI-IM resource, or an SSB resource included in a resource set configured in resource setting referred to by report setting for the CSI report of the UE configured through higher layer signaling, a CSI-RS resource, a CSI-IM resource, or an SSB resource referred to by a CSI report trigger state including a parameter for the CSI report, or a CSI-RS resource, a CSI-IM resource, or an SSB resource indicated by an ID of an RS group.

In embodiments of the disclosure, CSI-RS/CSI-IM/SSB occasions may be transmission time points of CSI-RS/CSI-IM/SSB resource(s) determined by higher layer configuration or a combination of higher layer configuration and DCI triggering. For example, a slot in which a semi-persistent or periodic CSI-RS resource is transmitted is determined according to a slot period and a slot offset configured through higher layer signaling, and transmission symbol(s) in the slot may be determined by referring to one of resource mapping methods in the slot in Table 25 according to resource mapping information resourceMapping. In another example, a slot in which an aperiodic CSI-RS resource is transmitted may be determined according to a slot offset with a PDCCH including DCI indicating a channel report configured through higher layer signaling, and transmission symbol(s) in the slot may be determined by referring to one of resource mapping methods in the slot in Table 25 according to resource mapping information resourceMapping.

The above-described CSI-RS occasion may be determined by independently considering a transmission time point of each CSI-RS resource or by collectively considering transmission time points of one or more CSI-RS resource(s) included in a resource set, and the following two analyses may be possible for a CSI-RS occasion corresponding to each resource set configuration.

Analysis 1-1: from a start point of an earliest symbol in which one certain resource among one or more CSI-RS resources included in resource set(s) configured in resource setting referred to by report setting configured for a CSI report is transmitted, to an end point of a last symbol in which the certain resource is transmitted Analysis 1-2: from a start point of an earliest symbol in which a CSI-RS resource transmitted at an earliest time point among all CSI-RS resources included in resource set(s) configured in resource setting referred to by report setting configured for a CSI report is transmitted, to an end point of a last symbol in which a CSI-RS resource transmitted at a last time point among them is transmitted Hereinbelow, in embodiments of the disclosure, both of the two analyses for a CSI-RS occasion may be considered for separate application. Moreover, both of the two analyses for a CSI-IM occasion and an SSB occasion may be considered as in the CSI-RS occasion, but a principle thereof is similar to the above description, and thus, a repeated description will be avoided.

In embodiments of the disclosure, CSI-RS/CSI-IM/SSB occasions for CSI report #X transmitted in an uplink slot n' refer to a set of a CSI-RS occasion, a CSI-IM occasion, and an SSB occasion which are not later than a CSI reference resource of CSI report #X transmitted in the uplink slot n' among CSI-RS occasions, CSI-IM occasions, and SSB occasions of CSI-RS resources, CSI-IM resources, and SSB resources included in a resource set configured in resource setting referred to by report setting configured for CSI report #X.

In embodiments of the disclosure, a last CSI-RS/CSI-IM/SSB occasion among the CSI-RS/CSI-IM/SSB occasions for CSI report #X transmitted in the uplink slot n' may be analyzed in two manners as follows.

Analysis 2-1: a set of occasions including a last CSI-RS occasion among CSI-RS occasions for CSI report #X transmitted in the uplink slot n, a last CSI-IM occasion among the CSI-IM occasions for CSI report #X transmitted in the uplink slot n, and a last SSB occasion among SSB occasions for CSI report #X transmitted in the uplink slot n Analysis 2-2: a last occasion among all of CSI-RS occasions, CSI-IM occasions, and SSB occasions for CSI report #X transmitted in the uplink slot n.

Hereinbelow, in embodiments of the disclosure, both of the two analyses for the last CSI-RS/CSI-IM/SSB occasion among the CSI-RS/CSI-IM/SSB occasions for CSI report #X transmitted in the uplink slot n' may be considered for separate application. Given the above two analyses (Analysis 1-1 and Analysis 1-2) for the CSI-RS occasion, the CSI-IM occasion, and the SSB occasion, for "the last CSI-RS/CSI-IM/SSB occasion among the CSI-RS/CSI-IM/SSB occasions for CSI report #X transmitted in the uplink slot n", separate application may be possible by considering four different analyses (application of Analysis 1-1 and Analysis 2-1, application of Analysis 1-1 and Analysis 2-2, application of Analysis 1-2 and Analysis 2-1, and application of Analysis 1-2 and Analysis 2-2) in embodiments of the disclosure.

The base station may indicate a CSI report, by considering the amount of channel information that may be simultaneously computed by the UE for the CSI report, i.e., the number of channel information computation units (CSI processing units: CPUs) of the UE. When the number of CPUs that may be simultaneously computed by the UE is $N_{CPU}$, the UE may not expect a CSI report indication of the base station, which needs channel information computation more than $N_{CPU}$, or may not consider updating of channel information which needs channel information computation more than $N_{CPU}$. $N_{CPU}$ may be reported by the UE to the base station through higher layer signaling or may be configured by the base station through higher layer signaling.

The CSI report indicated by the base station to the UE is assumed to occupy all or some of CPUs for channel information computation among a total number $N_{CPU}$ of channel information that may be simultaneously computed by the UE. When the number of CPUs required for each CSI report, e.g., a CSI report n (n=0, 1, . . . , N−1) is $O_{CPU}^{(n)}$, the number of CPUs required for total N CSI reports may be $\Sigma_{n=0}^{N-1} O_{CPU}^{(n)}$. A CPU required for each reportQuantity configured in the CSI report may be configured as shown in Table 29.

TABLE 29

- $O_{CPU}^{(n)}$ = 0 : case where reportQuantity configured in CSI report is configured as 'none', and trs-Info is configured in CSI-RS resource set connected to CSI report
- $O_{CPU}^{(n)}$ = 1 : case where ' reportQuantity configured in CSI report is configured as 'none', 'cri-RSRP', 'ssb-Index-RSRP', and trs-Info is not configured in CSI-RS resource set connected to CSI report
- case where reportQuantity configured in CSI report is configured as 'cri-RI-PMI-CQI', 'cri-RI-i1', 'cri-RI-i1-CQI', 'cri-RI-CQI', or 'cri-RI-LI-PMI-CQI'
  >> $O_{CPU}^{(n)}$ = $N_{CPU}$ : case where aperiodic CSI report is triggered and the CSI report is not multiplexed with one or all of TB/HARQ-ACK, case where the CSI report is wideband CSI and corresponds to up to 4 CSI-RS ports, and corresponds to a single resource with no CRI report, and codebookType corresponds to 'typeI-SinglePanel'or reportQuantity corresponds to 'cri-RI-CQI'
  (this case is a case corresponding to the above delay requirement 1 and may be seen as a case where a UE uses rapidly calculates and reports CSI by using all available CPUs)
  >> $O_{CPU}^{(n)}$ = $K_s$ : In all but the above cases . $K_s$ indicates the number of CSI-RS resources in a CSI-RS resource set for channel measurement When the number of channel information computations needed by the UE for multiple CSI reports at a certain time point is greater than the number $N_{CPU}$ of CPUs that may be simultaneously computed by the UE, the UE may not consider updating of channel information for some CSI reports. Among the indicated multiple CSI reports, a CSI report for which updating of channel information is not considered may be determined by at least considering a time for which channel information computation required for the CSI report occupies CPUs and a priority of channel information to be reported. For example, regarding the time for which channel information computation required for the CSI report occupies the CPUs, updating of channel information for a CSI report starting at a last time point may not be considered, and updating of channel information for a CSI report corresponding to a low priority of channel information may not be preferentially considered.

The CSI priority may be determined by referring to Table 30.

TABLE 30

CSI priority value $\text{Pri}_{iCSI}(y, k, c, s) = 2 \cdot N_{cells} \cdot M_s \cdot y + N_{cells} \cdot M_s \cdot k + M_s \cdot c + s$,
- in case of aperiodic CSI report transmitted through y = 0 PUSCH, in case of semi-persistent CSI report transmitted through y = 1 PUSCH, in case of semi-persistent CSI report transmitted through y = 2 PUCCH, in case of periodic CSI report transmitted through y = 3 PUCCH;
-case where k = 0 CSI report includes L1-RSRP, case where k = 1 CSI report does not include L1-RSRP;
   - c : serving cell index, $N_{cells}$ :maximum number of serving cells configured through higher layer signaling (maxNrofServingCells);
-s : CSI report configuration index (reportConfigID), $M_s$: maximum number of CSI report configurations configured through higher layer signalling (maxNrofCSI-ReportConfigurations).

A CSI priority for a CSI report may be determined through priority values $\text{Pri}_{iCSI}(y, k, c, s)$ of Table 30. Referring to Table 30, a CSI priority value may be determined through a type of channel information included in the CSI report, time-domain report characteristics (aperiodic, semi-persistent, or periodic) of the CSI report, a channel in which the CSI report is transmitted (PUSCH or PUCCH), a serving-cell index, and a CSI report configuration index. The CSI priority for the CSI report may be determined by comparing the priority values $\text{Pri}_{iCSI}(y, k, c, s)$ such that a CSI priority is higher for a CSI report having a lower priority value.

When a time for which channel information computation required for a CSI report indicated by the base station to the UE occupies CPUs is a CPU occupation time, the CPU occupation time is determined by considering a type (report quantity) of channel information included in the CSI report, time-domain characteristics (aperiodic, semi-persistent, periodic) of the CSI report, a slot or a symbol occupied by higher layer signaling or DCI indicating the CSI report, and some or all of a slot or a symbol occupied by an RS for channel state measurement.

Each CSI report setting (CSI-ReportConfig) may be associated with one downlink BWP identified by a higher layer parameter BWP identity (bwp-id) provided via CSI resource setting (CSI-ResourceConfig) associated with the CSI report setting. Aperiodic, semi-persistent, and periodic types are supported for a time domain reporting operation regarding each report setting CSI-ReportConfig, and may be configured by the base station in the UE via a parameter reportConfigType configured from a higher layer.

According to an embodiment of the disclosure, a semi-persistent CSI reporting method supports 'semi-PersistentOnPUCCH' and 'semi-PersistentOnPUSCH'. In a periodic or semi-persistent CSI reporting method, the UE may be configured with a PUCCH or PUSCH resource for transmitting CSI from the base station through higher layer signaling. A period and slot offset of the PUCCH or PUSCH resource for transmitting the CSI may be given as a numerology of an uplink BWP in which a CSI report is configured to be transmitted. In an aperiodic CSI reporting method, the UE may be scheduled with the PUSCH resource for transmitting the CSI through L1 signaling (DCI format 0_1 described above).

Each CSI resource setting CSI-ResourceConfig may include S (≥1) CSI resource sets (given by a higher layer parameter csi-RS-ResourceSetList). A CSI resource set list may include a non-zero power (NZP) CSI-RS resource set and a SS/PBCH block set or may include a CSI-interference measurement (CSI-IM) resource set. Each CSI resource setting may be located in a downlink BWP identified by a higher layer parameter bwp-id, and the CSI resource settings may be connected to CSI report setting of the same downlink BWP. A time domain behavior of a CSI-RS resource in CSI resource setting may be configured by a higher layer parameter resourceType as one of aperiodic, periodic, or semi-persistent. For periodic or semi-persistent CSI resource setting, the number of CSI-RS resource sets may be limited to S=1, and a configured period and slot offset may be given by a numerology of the downlink BWP identified by bwp-id. The UE may be configured with, by the base station, one or more CSI resource settings for channel or interference measurement through higher layer signaling, and for example, the following CSI resources may be included. However, the disclosure is not limited thereto.

CSI-IM resource for interference measurement
   NZP CSI-RS resource for interference measurement
   NZP CSI-RS resource for channel measurement For CSI-RS resource sets associated with resource setting in which a higher layer parameter resourceType is configured as 'aperiodic', 'periodic', or 'semi-persistent', a trigger state for CSI report setting in which reportType is configured as 'aperiodic' and resource setting for channel or interference measurement on one or more component cells (CCs) may be configured by a higher layer parameter CSI-AperiodicTriggerStateList.

Aperiodic CSI reporting of the UE may be performed by using a PUSCH, periodic CSI reporting may be performed by using a PUCCH, and semi-persistent CSI reporting may be performed by using a PUSCH when triggered or activated by DCI and may be performed by using a PUCCH after activated by MAC CE. As described above, CSI resource setting may be configured as aperiodic, periodic, or semi-persistent. A combination of CSI report setting and CSI resource setting may be supported based on Table 31.

TABLE 31

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH; the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Aperiodic CSI reporting may be triggered by a "CSI request" field of DCI format 0_1 corresponding to scheduling DCI for a PUSCH. The UE may obtain DCI format 0_1 by monitoring a PDCCH, and may obtain scheduling information for the PUSCH and a CSI request indicator. The CSI request indicator may be configured in NTS(=0, 1, 2, 3, 4, 5, or 6) bits, and may be determined by higher layer signaling reportTriggerSize. One trigger state from among one or more aperiodic CSI report trigger states that may be configured through higher layer signaling CSI-AperiodicTriggerStateList may be triggered by the CSI request indicator.

When all bits of the CSI request field are 0, this may mean that CSI reporting is not requested.

When the number M of CSI trigger states in CSI-AperiodicTriggerStateList is greater than $2^{NTS}-1$, M CSI trigger states may be mapped to $2^{NTS}-1$ according to a pre-defined mapping relationship, and one of the $2^{NTS}-1$ trigger states may be indicated by the CSI request field.

When the number M of CSI trigger states in CSI-AperiodicTriggerStateList is equal to or less than $2^{NTS}-1$, one of M CSI trigger states may be indicated by the CSI request field.

Table 32 shows a relationship between a CSI request indicator and a CSI trigger state indicatable by the CSI request indicator.

TABLE 32

| CSI request field | CSI trigger state | CSI-ReportConfigId | CSI-ReportConfigId |
|---|---|---|---|
| 00 | no CSI request | N/A | N/A |
| 01 | CSI trigger state#1 | CSI report#1, CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may perform measurement on a CSI resource in a CSI trigger state triggered by a CSI request field, and may generate CSI (including at least one of CQI, PMI, CRI, SSBRI, LI, RI, or L1-RSRP) therefrom. The UE may transmit the obtained CSI by using a PUSCH scheduled by DCI format 0_1. When 1 bit corresponding to an uplink data indicator (UL-SCH indicator) in DCI format 0_1 indicates "1", the UE may multiplex uplink data (UL-SCH) and the obtained CSI and may transmit the same to a PUSCH resource scheduled by DCI format 0_1. When the 1 bit corresponding to the uplink data indicator (UL-SCH indicator) in DCI format 0_1 indicates "0", the UE may map and transmit only the CSI to the PUSCH resource scheduled by DCI format 0_1, without the uplink data (UL-SCH).

Figure 13:
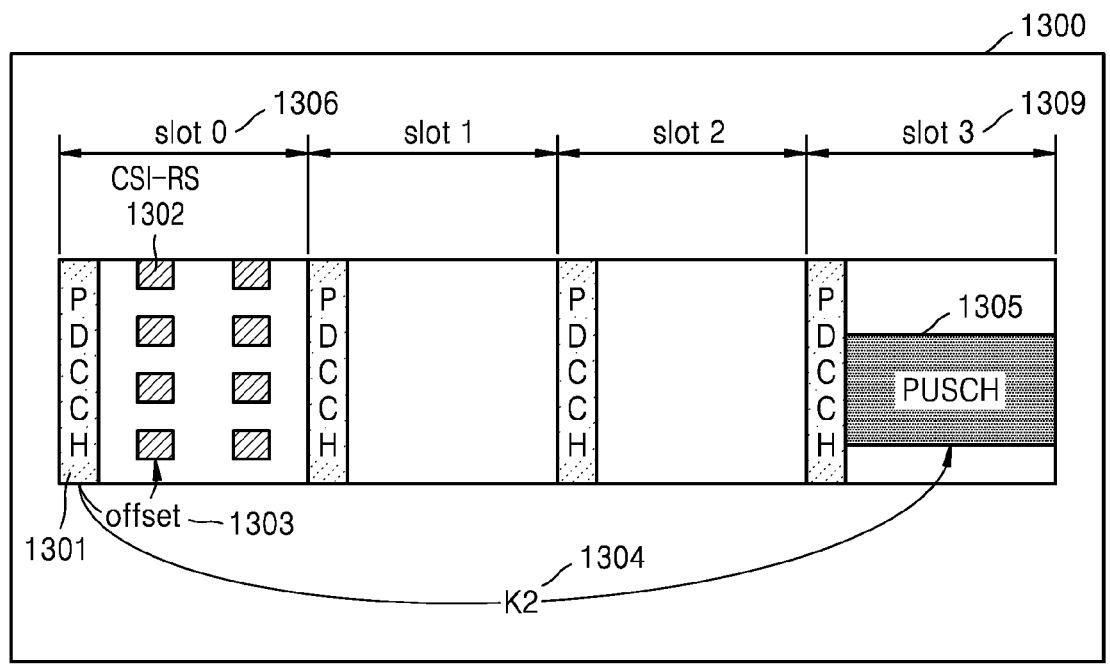
FIG. 13 illustrates a diagram of an aperiodic channel state information (CSI) reporting method.
Figure 13:
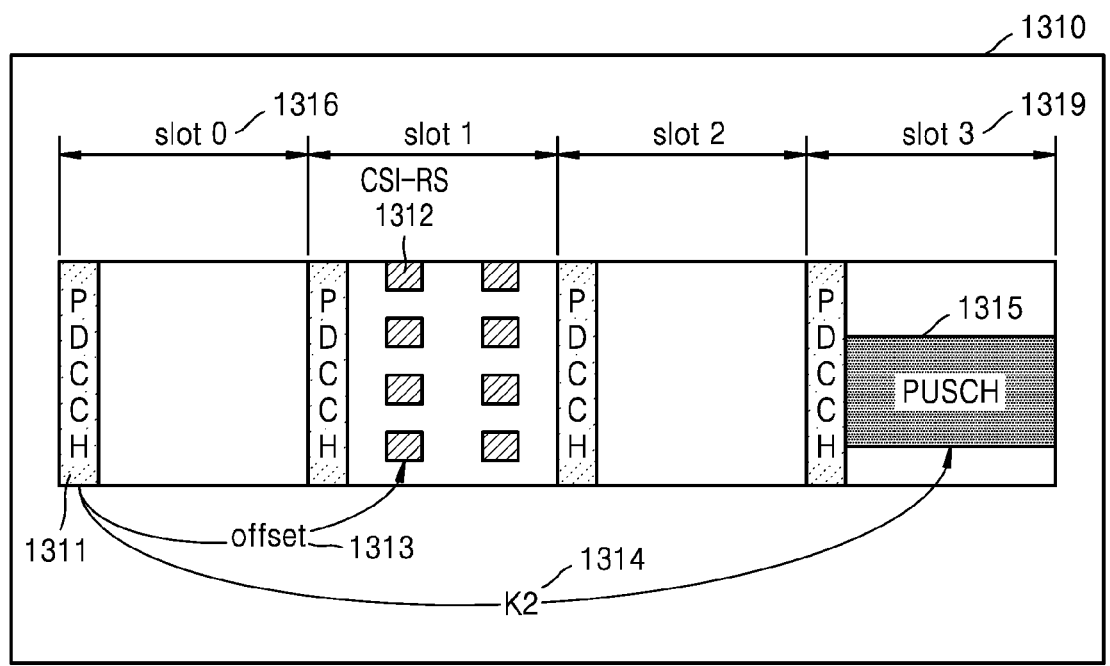

FIG. 13 illustrates a diagram of an aperiodic CSI reporting method.

In an example 1300 of FIG. 13, a UE may obtain DCI format 0_1 by monitoring a PDCCH 1301, and may obtain scheduling information and CSI request information for a PUSCH 1305 therefrom. The UE may obtain resource information for a CSI-RS 1302 to be measured from a received CSI request indicator. The UE may determine at what time a CSI-RS resource is to be measured, based on a time point when DCI format 0_1 is received and an offset parameter aperiodicTriggeringOffset in CSI resource set configuration (e.g., NZP CSI-RS resource set configuration NZP-CSI-RS-ResourceSet).

In detail, the UE may be configured with, by a base station through higher layer signaling, an offset value X of the parameter aperiodicTriggeringOffset in the NZP-CSI-RS resource set configuration, and the configured offset value X may refer to an offset between a slot where a CSI-RS resource is transmitted and a slot where DCI triggering an aperiodic CSI report is received. For example, the parameter aperiodicTriggeringOffset and the offset value X may have a mapping relationship shown in Table 33.

TABLE 33

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In the example 1300 of FIG. 13, an offset value 1303 is configured as X=0. In this case, the UE may receive the CSI-RS 1302 in a slot (corresponding to a slot 0 1306 of FIG. 13) in which DCI format 0_1 triggering an aperiodic CSI report is received, and may report, to the base station, CSI information measured by the received CSI-RS 1302 via the PUSCH 1305. The UE may obtain scheduling information (information corresponding to each field of DCI format 0_1) for the PUSCH 1305 for the CSI report, from DCI format 0_1.

For example, the UE may obtain information about a slot in which the PUSCH 1305 is to be transmitted from time domain resource allocation information for the PUSCH 1305 in DCI format 0_1. In the example 1300 of FIG. 13, the UE has obtained 3 as a K2 value 1304 corresponding to a slot offset value for PDCCH-to-PUSCH, and accordingly, the PUSCH 1305 may be transmitted from a slot 3 1309 that is 3 slots away from the slot 0 1306, i.e., when the PDCCH 1301 is received.

In an example 1310 of FIG. 13, the UE may obtain DCI format 0_1 by monitoring a PDCCH 1311, and may obtain scheduling information and CSI request information for a PUSCH 1315 therefrom. The UE may obtain resource information for a CSI-RS 1312 to be measured from a received CSI request indicator. In the example 1310 of FIG. 13, an offset value 1313 for the CSI-RS is configured as X=1. In this case, the UE may receive the CSI-RS 1312 in a slot (corresponding to a slot 0 1316 of FIG. 13) in which DCI format 0_1 triggering an aperiodic CSI report is received, and may report, to the base station, CSI information measured by the received CSI-RS 1312 via the PUSCH 1315. In the example 1310 of FIG. 13, the UE has obtained 3 as a K2 value 1314 corresponding to a slot offset value for PDCCH-to-PUSCH, and accordingly, the PUSCH 1315 may be transmitted from a slot 3 1319 that is 3 slots away from the slot 0 1316, i.e., when the PDCCH 1311 is received.

An aperiodic CSI report may include at least one or both of CSI part 1 and CSI part 2, and when the aperiodic CSI report is transmitted through a PUSCH, the aperiodic CSI report may be multiplexed with a transport block. For multiplexing, a CRC may be inserted into input bits of aperiodic CSI, may undergo encoding and rate matching, and then may be mapped to a resource element in the PUSCH in a specific pattern to be transmitted. The CRC insertion may be omitted according to a coding method or a length of the input bits. When CSI part 1 or CSI part 2 included in the aperiodic CSI report is multiplexed, the number of modulation symbols calculated for rate matching may be calculated as shown in Table 34.

TABLE 34

For CSI part 1 transmission on PUSCH not using repetition type B with UL-SCH, the number of coded modulation symbols per layer for CSI part 1 transmission, denoted as $Q'_{CSI-part1}$, is determined as follows:

$$Q'_{CSI-1} = \min\left\{\left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK/CG-UCI} \right\}$$

. . .

For CSI part I transmission on an actual repetition of a PUSCH with repetition Type B with UL-SCH, the number of coded modulation symbols per layer for CSI part I transmission, denoted as $Q'_{CSI-part1}$, determined as follows:

$$Q'_{CSI-1} = \min\left\{\left\lceil \frac{(O_{CSI-1} + L_{CSI-1}) \cdot \beta^{PUSCH}_{offset} \cdot \sum_{l=0}^{N^{PUSCH}_{symb,nominal}-1} M^{UCI}_{sc,nominal}(l)}{\sum_{r=0}^{C_{UL-SCH}-1} K_r} \right\rceil, \left\lceil \alpha \cdot \sum_{l=0}^{N^{PUSCH}_{symb,nominal}-1} M^{UCI}_{sc,actual}(l) \right\rceil - Q'_{ACK/CG-UCI}, \sum_{l=0}^{N^{PUSCH}_{symb,nominal}-1} M^{UCI}_{sc,actual}(l) - Q'_{ACK/CG-UCI} \right\}$$

. . .

For CSI part 1 transmission on PUSCH without UL-SCH, the number of coded modulation symbols per layer for CSI part 1 transmission, denoted as $Q'_{CSI-part1}$, is determined as follows:
if there is CSI part 2 to be transmitted on the PUSCH, $$Q'_{CSI-1} = \min\left\{\left\lceil \frac{(O_{CSI-1} + L_{CSI-1}) \cdot \beta^{PUSCH}_{offset}}{R \cdot Q_m} \right\rceil, \sum_{l=0}^{N^{PUSCH}_{symb,all}-1} M^{UCI}_{sc}(l) - Q'_{ACK} \right\}$$

TABLE 34-continued else $$Q'_{CSI-1} = \sum_{l=0}^{N^{PUSCH}_{symb,all}-1} M^{UCI}_{sc}(l) - Q'_{ACK}$$

end if

...

For CSI part 2 transmission on PUSCH not using repetition type B with UL-SCH, the number of coded modulation symbols per layer for CSI part 2 transmission, denoted as $Q_{CSI-part2}'$, is determined as follows:

$$Q'_{CSI-2} = \min \left\{ \left\lceil \frac{(O_{CSI-2} + L_{CSI-2}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK/CG-UCI} - Q'_{CSI-1} \right\}$$

For CSI part 2 transmission on an actual repetition of a PUSCH with repetition Type B with UL-SCH, the number of coded modulation symbols per layer for CSI part 2 transmission, denoted as $Q_{CSI-part2}'$, is determined as follows:

$$Q'_{CSI-2} = \min \left\{ \left\lceil \frac{(O_{CSI-2} + L_{CSI-2}) \cdot \beta^{PUSCH}_{offset} \cdot \sum_{l=0}^{N^{PUSCH}_{symb,nominial}-1} M^{UCI}_{sc,nominal}(l)}{\sum_{r=0}^{C_{UL-SCH}-1} K_r} \right\rceil, \left\lceil \alpha \cdot \sum_{l=0}^{N^{PUSCH}_{symb,nominial}-1} M^{UCI}_{sc,actual}(l) \right\rceil - Q'_{ACK/CG-UCI} - Q'_{CSI-1}, \sum_{l=0}^{N^{PUSCH}_{symb,nominial}-1} M^{UCI}_{sc,actual}(l) - Q'_{ACK/CG-UCI} - Q'_{CSI-1} \right\}$$

...

For CSI part 2 transmission on PUSCH without UL-SCH, the number of coded modulation symbols per layer for CSI part 2 transmission, denoted as $Q_{CSI-part2}'$, is determined as follows:

$$Q'_{CSI-2} = \sum_{l=0}^{N^{PUSCH}_{symb,all}-1} M^{UCI}_{sc}(l) - Q'_{ACK} - Q'_{CSI-1}$$

In particular, in PUSCH repetition types A and B, the UE may multiplex and transmit an aperiodic CSI report only on a first repetition from among PUSCH repetitions. This is because aperiodic CSI report information that is multiplexed is encoded in a polar code method, and in this case, to perform multiplexing on several PUSCH repetitions, each PUSCH repetition should have the same frequency and time resource allocation. In particular, in PUSCH repetition type B, because each actual repetition may have a different OFDM symbol length, the aperiodic CSI report may be multiplexed and transmitted only on the first PUSCH repetition.

Also, in PUSCH repetition type B, when the UE receives DCI that schedules an aperiodic CSI report or activates a semi-persistent CSI report without scheduling of a transport block, even when a PUSCH repetition number configured through higher layer signaling is greater than 1, a value of nominal repetition may be assumed to be 1. Also, when an aperiodic or semi-persistent CSI report is scheduled or activated without scheduling of a transport block based on PUSCH repetition type B, the UE may expect that a first nominal repetition is the same as a first actual repetition. For a PUSCH transmitted with semi-persistent CSI based on PUSCH repetition type B without scheduling of DCI after a semi-persistent CSI report is activated by the DCI, when a first nominal repetition is different from a first actual repetition, transmission for the first nominal repetition may be ignored.

[Related to XDD]

For a 5G mobile communication service, additional coverage extension technology was introduced compared to an LTE communication service, but the 5G mobile communication service may generally use a time division duplex (TDD) system suitable for a service with a high downlink traffic proportion. Also, as a center frequency is increased to increase a frequency band, the coverage of a base station and a UE is reduced, and thus, coverage enhancement is a core requirement of the 5G mobile communication service. In particular, because transmission power of a UE is generally lower than transmission power of a base station, it is necessary to support a service with a high downlink traffic proportion, and a ratio of downlink in a time domain is higher than that of uplink, coverage enhancement of an uplink channel is a core requirement of the 5G mobile communication service. Examples of a method of physically enhancing the coverage of an uplink channel between a base station and a UE may include a method of increasing a time resource of the uplink channel, a method of reducing a center frequency, and a method of increasing transmission power of the UE. However, changing a frequency may have a limitation because a frequency band is determined for each network operator. Also, increasing maximum transmission power of the UE may have a limitation because a maximum value is determined to reduce interference, that is, maximum transmission power of the UE is regulatively determined.

Accordingly, for coverage enhancement of the base station and the UE, uplink and downlink resources may be not only divided in a time domain according to traffic proportions of uplink and downlink as in a time division duplex (TDD) system but also divided in a frequency domain as in a frequency division duplex (FDD) system. In an embodiment of the disclosure, a system for flexibly dividing uplink and downlink resources in a time domain and a frequency domain may be referred to as a cross division duplex (XDD) system, a flexible TDD system, a hybrid TDD system, a TDD-FDD system, or a hybrid TDD-FDD system, and for convenience of explanation, is described as an XDD system in the disclosure. According to an embodiment of the disclosure, X in XDD may denote a time or a frequency.

Figure 7:
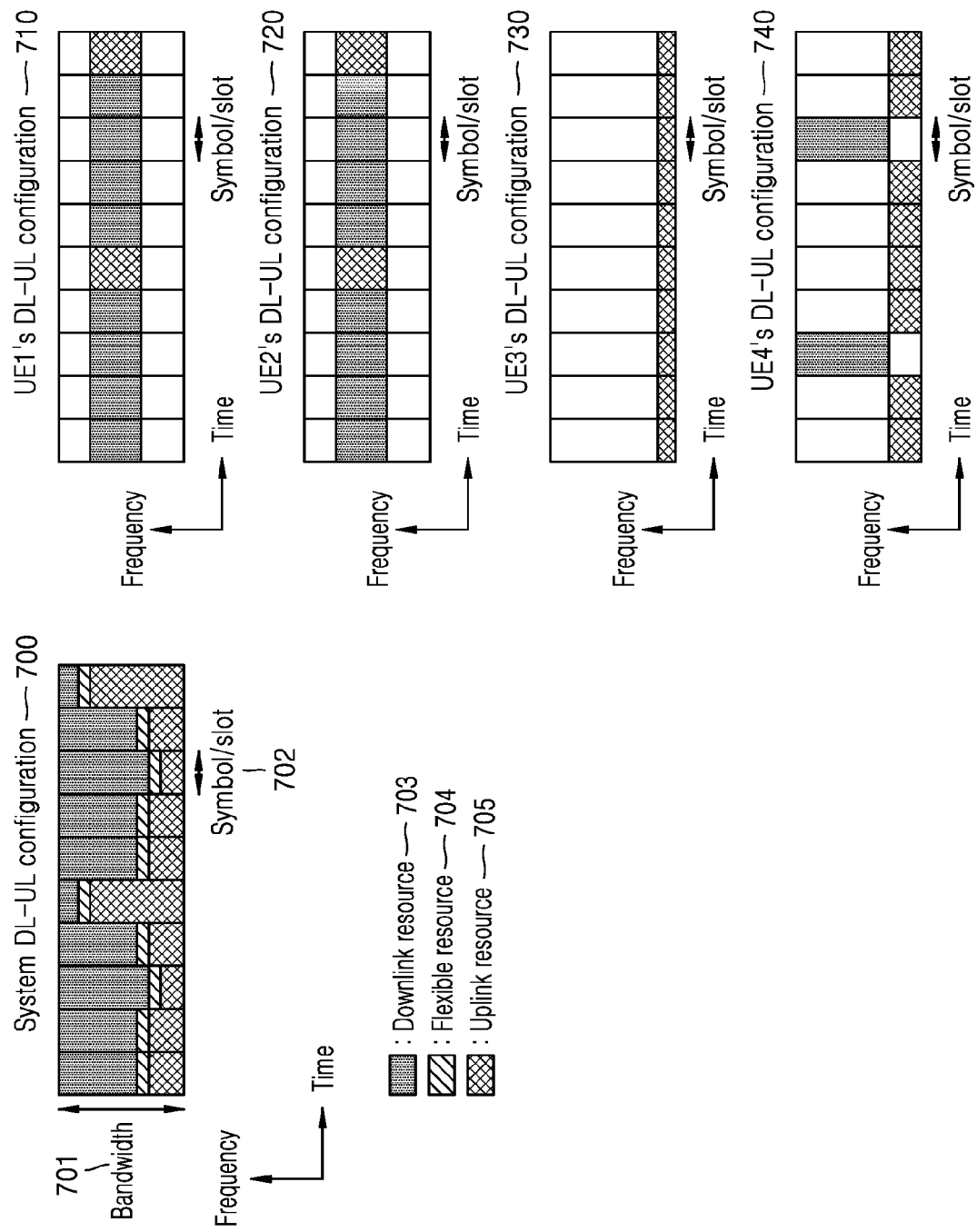
FIG. 7 illustrates a diagram of an uplink and downlink resource configuration method, according to an embodiment of the disclosure.

FIG. 7 illustrates a diagram of an uplink-downlink resource configuration of an XDD system in which uplink and downlink resources are flexibly divided in time and frequency domains, according to an embodiment of the disclosure.

Referring to FIG. 7, from the viewpoint of a base station, in uplink-downlink configuration 700 of an XDD system, in an entire frequency band 701, resources may be flexibly allocated for each symbol or slot 702, according to traffic proportions of uplink and downlink. However, this is merely an example, and a unit in which a resource is allocated is not limited to the symbol or slot 702, and a resource may be flexibly allocated according to a unit such as a mini-slot. In this case, a guard band 704 may be allocated in a frequency band between a downlink resource 703 and an uplink resource 705. The guard band 704 may be allocated to reduce interference in uplink channel or signal reception due to out-of-band emission occurring when the base station transmits a downlink channel or signal in the downlink resource 703. In this case, for example, a UE 1 710 and a UE 2 720 having more downlink traffic than uplink traffic may be allocated a downlink and uplink resource ratio of 4:1 in a time domain by a configuration of the base station. Also, a UE 3 730 operating at a cell edge and lacking uplink coverage may be allocated only an uplink resource in a specific time interval by a configuration of the base station. In addition, a UE 4 740 operating at a cell edge and lacking uplink coverage but having relatively large downlink and uplink traffic may be allocated a lot of uplink resources in a time domain and a lot of downlink resources in a frequency band for uplink coverage. As in the above example, more downlink resources in a time domain may be allocated to UEs that operate relatively at the cell center and have large downlink traffic, and more uplink resources in a time domain may be allocated to UEs that operate relatively at a cell edge and lack uplink coverage.

Figure 8:
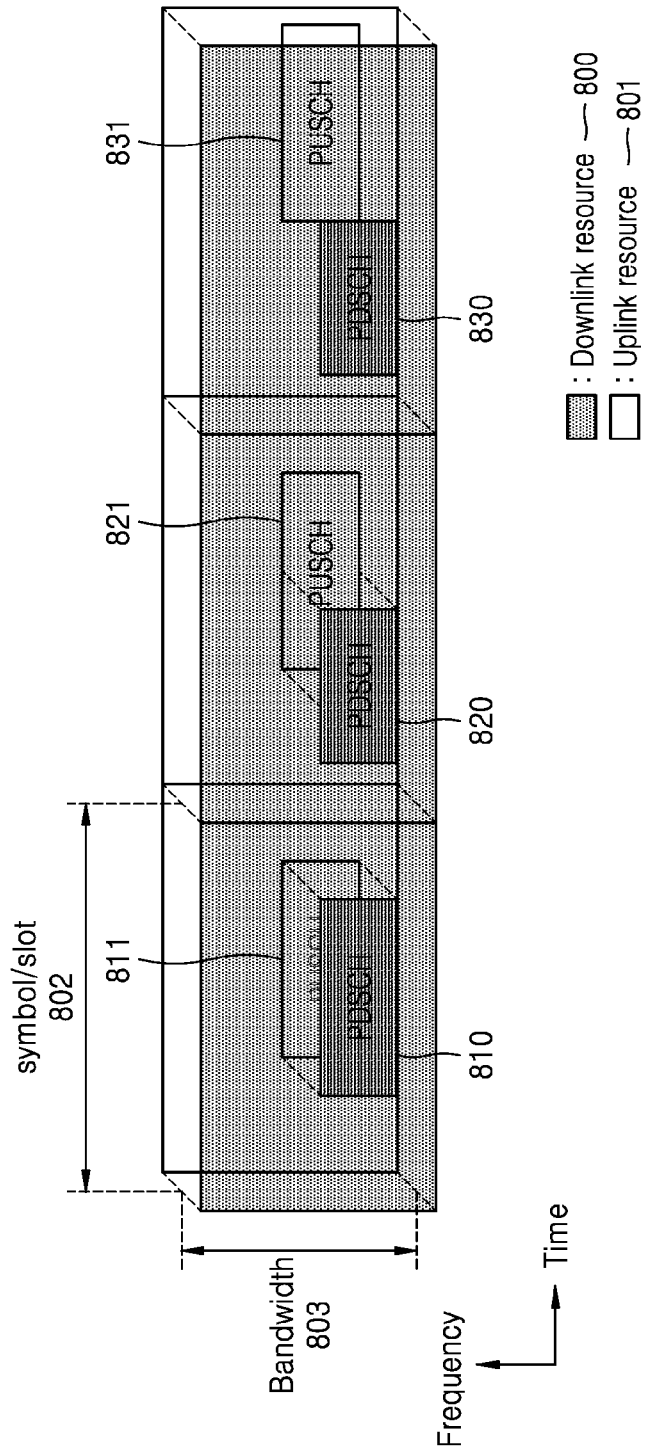
FIG. 8 illustrates a diagram of an uplink and downlink resource configuration method, according to an embodiment of the disclosure.

FIG. 8 illustrates a diagram of an uplink-downlink resource configuration of a full duplex communication system in which uplink and downlink resources are flexibly divided in time and frequency domains, according to an embodiment of the disclosure.

According to an embodiment of FIG. 8, a downlink resource 800 and an uplink resource 801 may be configured to entirely or partially overlap each other in time and frequency domains. In a region configured as the downlink resource 800, downlink transmission may be performed from a base station to a UE, and in a region configured as the uplink resource 801, uplink transmission may be performed from the UE to the base station.

In an example of FIG. 8, a downlink resource 810 and an uplink resource 811 may be configured to entirely overlap each other in a time resource corresponding to a symbol or a slot 802 and a frequency resource corresponding to a bandwidth 803. In this case, because the downlink resource 810 and the uplink resource 811 overlap each other in time and frequency, downlink and uplink transmission and reception of the base station or the UE may be simultaneously performed in the same time and frequency resource.

In another example of FIG. 8, a downlink resource 820 and an uplink resource 821 may be configured to partially overlap each other in a time resource corresponding to a symbol or a slot and a frequency resource corresponding to the bandwidth 803. In this case, downlink and uplink transmission and reception of the base station or the UE may be simultaneously performed in a partial region where the downlink resource 820 and the uplink resource 821 overlap each other.

In another example of FIG. 8, a downlink resource 830 and an uplink resource 831 may be configured not to overlap each other in a time resource corresponding to a symbol or a slot and a frequency resource corresponding to the bandwidth 803.

Figure 9:
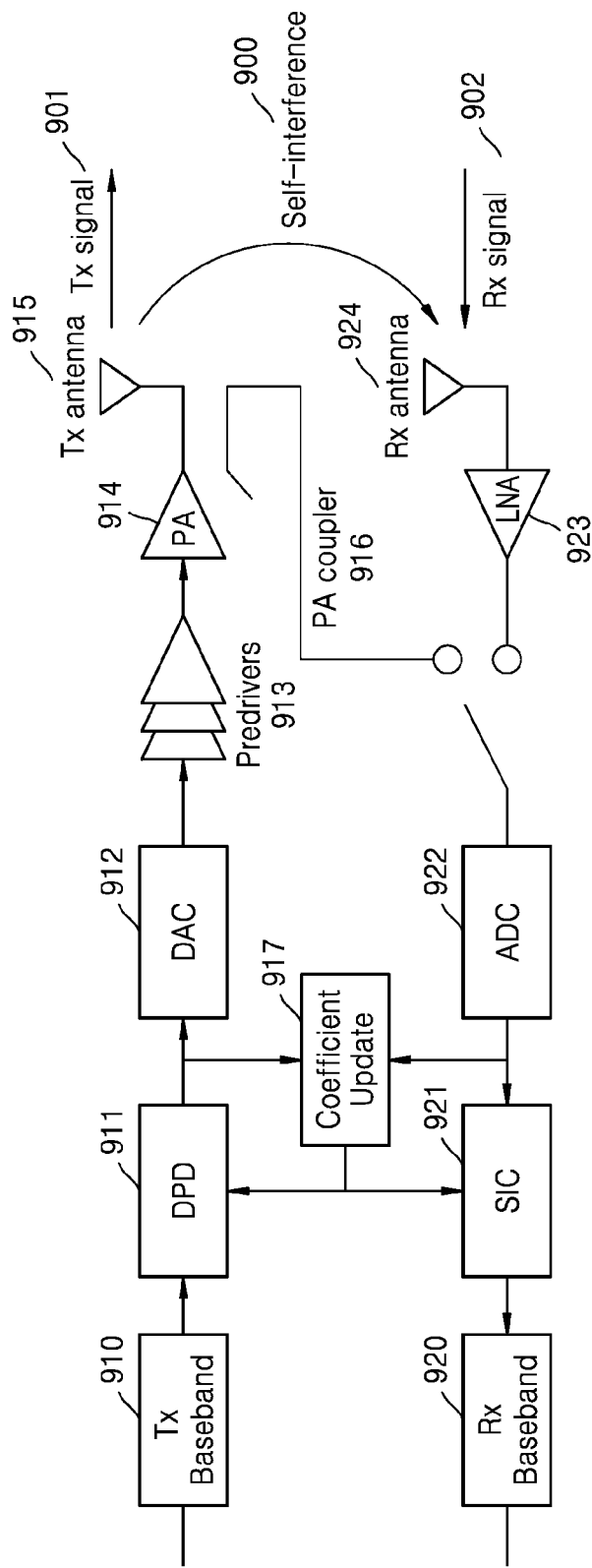
FIG. 9 illustrates a diagram of a structure of a transmitting end and a structure of a receiving end, according to an embodiment of the disclosure.

FIG. 9 illustrates a diagram of a transmission/reception structure for a duplex method, according to an embodiment of the disclosure.

The transmission/reception structure of FIG. 9 may be used in a base station device or a UE device. According to the transmission/reception structure of FIG. 9, a transmitting end may include a transmission (Tx) baseband block 910, a digital pre-distortion (DPD) block 911, a digital-to-analog converter (DAC) 912, a pre-driver 913, a power amplifier (PA) 914, and a Tx antenna 915. Each block may perform the following function.

Tx baseband block 910: digital processing block for a transmission signal
DPD block 911: pre-distort a digital transmission signal
DAC 912: convert a digital signal into an analog signal
pre-driver 913: gradually amplify power of an analog transmission signal
PA 914: amplify power of an analog transmission signal
Tx antenna 915: antenna for signal transmission According to the transmission/reception structure of FIG. 9, a receiving end may include a reception (Rx) antenna 924, a low noise amplifier (LNA) 923, an analog-to-digital converter (ADC) 922, a successive interference canceller (SIC) 921, and an Rx baseband block 920. Each block may perform the following function.

Rx antenna 924: antenna for signal reception
LNA 923: amplify power of an analog reception signal and minimize amplification of noise
ADC 922: convert an analog signal into a digital signal
SIC 921: interference canceller for a digital signal Rx baseband block 920: digital processing block for a reception signal According to the transmission/reception structure of FIG. 9, a PA coupler 916 and a coefficient update block 917 may be provided for additional signal processing between the transmitting end and the receiving end. Each block may perform the following function.

PA coupler 916: observe a waveform of an analog transmission signal passing through the power amplifier, at the receiving end coefficient update block 917: update various coefficients required for digital domain signal processing of the transmitting end and the receiving end, wherein the calculated coefficients may be used to set various parameters in the DPD block 911 of the transmitting end and the SIC 921 of the receiving end.

When transmission and reception operations are simultaneously performed in the base station device or the UE device, the transmission/reception structure of FIG. 9 may be used to effectively control interference between a transmission signal and a reception signal. For example, when transmission and reception are simultaneously performed in an arbitrary device, a Tx signal 901 transmitted through the Tx antenna 915 of the transmitting end may be received through the Rx antenna 924 of the receiving end, and in this case, the Tx signal 901 received by the receiving end may interfere with an Rx signal 902 intended to be received by the receiving end. Interference between the Tx signal 901 received by the receiving end and the Rx signal 902 is referred to as self-interference 900. For example, in detail, when the base station device simultaneously performs downlink transmission and uplink reception, a downlink signal transmitted by the base station may be received by the receiving end of the base station, and thus, at the receiving end of the base station, interference may occur between the downlink signal transmitted by the base station and an uplink signal intended to be received by the receiving end of the base station. When the UE device simultaneously performs downlink reception and uplink transmission, an uplink signal transmitted by the UE device may be received by the receiving end of the UE device, and thus, at the receiving end of the UE device, interference may occur between the uplink signal transmitted by the UE device and a downlink signal intended to be received by the receiving end of the UE device. As such, interference between links of different directions, that is, a downlink signal and an uplink signal, in the base station device and the UE device is referred to as cross-link interference.

In an embodiment of the disclosure, self-interference between a transmission signal (or a downlink signal) and a reception signal (or an uplink signal) may occur in a system where transmission and reception may be simultaneously performed.

For example, self-interference may occur in the above-described XDD system.

Figure 10:
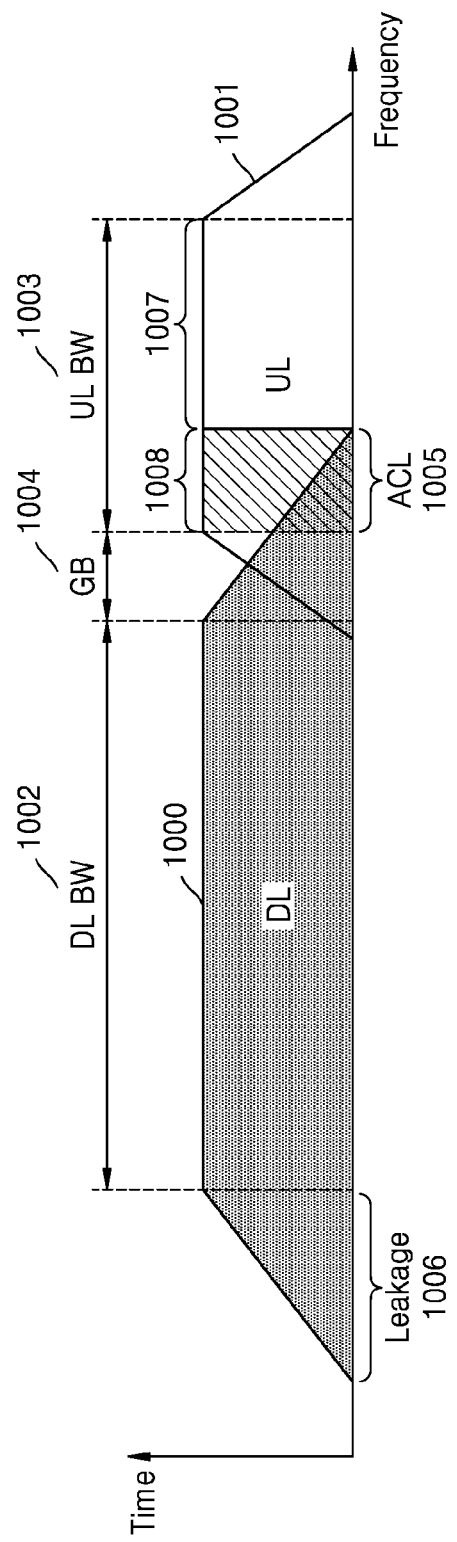
FIG. 10 illustrates a diagram of uplink and downlink resource configuration and self-interference, according to an embodiment of the disclosure.

FIG. 10 illustrates a diagram for describing downlink and uplink resource configuration in an XDD system.

In XDD, in a frequency domain, a downlink resource 1000 and an uplink resource 1001 may be distinguished, and in this case, a guard band (GB) 1004 may be located between the downlink resource 1000 and the uplink resource 1001. Actual downlink transmission may be performed in a downlink bandwidth 1002, and uplink transmission may be performed in an uplink bandwidth 1003. In this case, leakage 1006 may occur outside an uplink or downlink transmission band. Interference due to the leakage (which may be referred to as adjacent carrier leakage (ACL) 1005) may occur in a region where the downlink resource 1000 and the uplink resource 1001 are adjacent to each other.

FIG. 10 illustrates an example where ACL 1005 occurs from the downlink resource 1000 to the uplink resource 1001. As a distance between the downlink bandwidth 1002 and the uplink bandwidth 1003 decreases, the influence of signal interference due to the ACL 1005 may increase, thereby resulting in performance degradation. For example, as shown in FIG. 10, in a resource region 1008 in the uplink band 1003 which is adjacent to the downlink band 1002, the influence of interference due to the ACL 1005 may be large. In a resource region 1007 in the uplink band 1003 which is relatively far from the downlink band 1002, the influence of interference due to the ACL 1005 may be small. That is, in the uplink band 1003, there may be the resource region 1008 that is more affected by interference and the resource region 1007 that is less affected by interference. In order to reduce performance degradation due to the ACL 1005, the GB 1004 may be inserted between the downlink bandwidth 1002 and the uplink bandwidth 1003.

As a size of the GB 1004 increases, the influence of interference due to the ACL 1005 between the downlink bandwidth 1002 and the uplink bandwidth 1003 may decrease, but resources that may be used for transmission/reception may decrease, thereby reducing resource efficiency. In contrast, as a size of the GB 1004 decreases, resources that may be used for transmission/reception may increase and thus resource efficiency may be improved, but the influence of interference due to the ACL 1005 between the downlink bandwidth 1002 and the uplink bandwidth 1003 may increase. Accordingly, it may be important to determine an appropriate size of the GB 1004 by considering a tradeoff.

[Method of Operating XDD BWP]

Figure 11:
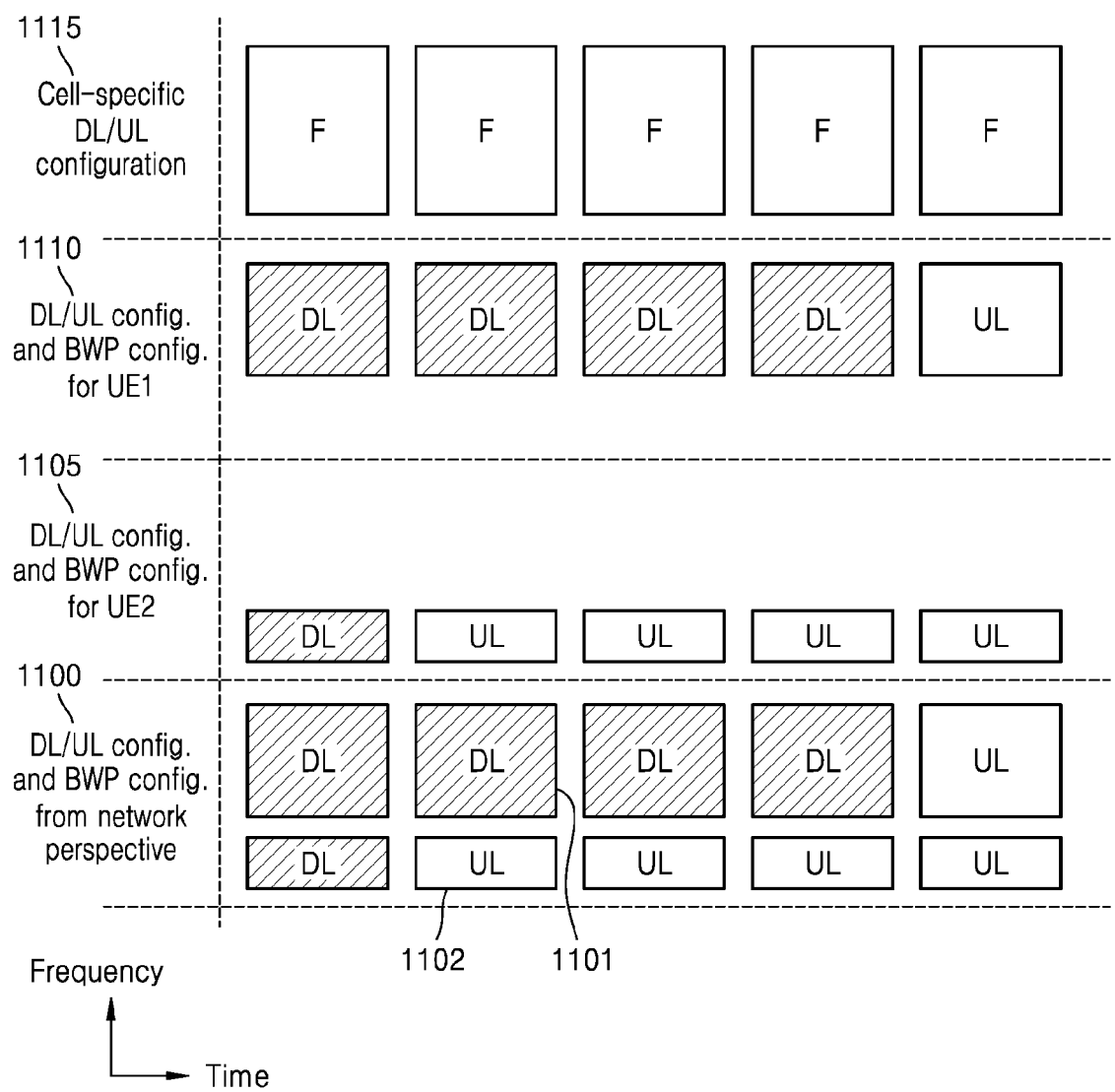
FIG. 11 illustrates a diagram of uplink-downlink configuration of an XDD system.

FIG. 11 illustrates a diagram of uplink-downlink configuration of an XDD system. From the viewpoint of a base station, in uplink-downlink configuration 1100 of an XDD system, in an entire frequency band, resources may be flexibly allocated for each symbol or slot, according to traffic proportions of uplink and downlink. In this case, a guard band may be allocated in a frequency band between a downlink resource 1101 and an uplink resource 1102. The guard band may be allocated to reduce interference in uplink channel or signal reception due to out-of-band emission occurring when the base station transmits a downlink channel or signal in the downlink resource. In this case, for example, a UE 1 1110 having more downlink traffic than uplink traffic may be allocated a downlink resource more than an uplink resource (in FIG. 11, e.g., a downlink and uplink resource ratio of 4:1 in a time domain) by a configuration of the base station. Also, a UE 2 1105 operating at a cell edge and lacking uplink coverage may be allocated a downlink resource less than an uplink resource by a configuration of the base station (in FIG. 11, e.g., a downlink and uplink resource ratio of 1:4 in the time domain).

As in the above example, more downlink resources in a time domain may be allocated to UEs that operate relatively at the cell center and have large downlink traffic to improve downlink transmission efficiency, and more uplink resources in a time domain may be allocated to UEs that operate relatively at a cell edge to improve coverage. In this case, the base station 1100 may configure most time resources as flexible (F) during cell-specific downlink/uplink configuration for flexible downlink/uplink configuration (1115).

In the present embodiment of the disclosure, for UEs that do not support full duplex capable of simultaneous uplink and downlink transmission and reception in the same time/ frequency resource, the base station needs to distinguish a downlink resource and an uplink resource of the UE 1 1110 that performs downlink reception and the UE 2 1105 that performs uplink transmission at a specific time (e.g., in second through fourth time intervals of FIG. 11). The downlink resource and the uplink resource may be distinguished by using one of the following two methods. The first method is a method by which frequency configuration information of a downlink BWP of the UE 1 1110 and frequency configuration information of an uplink BWP of the UE 2 1105 do not overlap each other.

According to this method, the impact on UE and base station implementation may be minimized, but when a frequency resource ratio between downlink and uplink is to be changed within one hour, BWP switching may be required, and thus flexibility may be reduced and it may take a long time. For convenience of explanation, the first method is referred to as a BWP-based XDD operating method. The second method is a method by which a scheduled PDSCH of the UE 1 1110 and a scheduled PUSCH of the UE 2 1105 are allocated not to overlap each other along a frequency axis. Because the method is based on base station scheduling, flexibility may be very high and a frequency resource ratio between downlink and uplink may be changed rapidly, but frequency configuration information of a downlink BWP of the UE 1 1110 and frequency configuration information of an uplink BWP of the UE 2 1105 may partially or entirely overlap each other, and thus various problems described below in the following embodiments of the disclosure may occur. For convenience of explanation, the second method is referred to as a scheduling-based XDD operating method.

Figure 12:
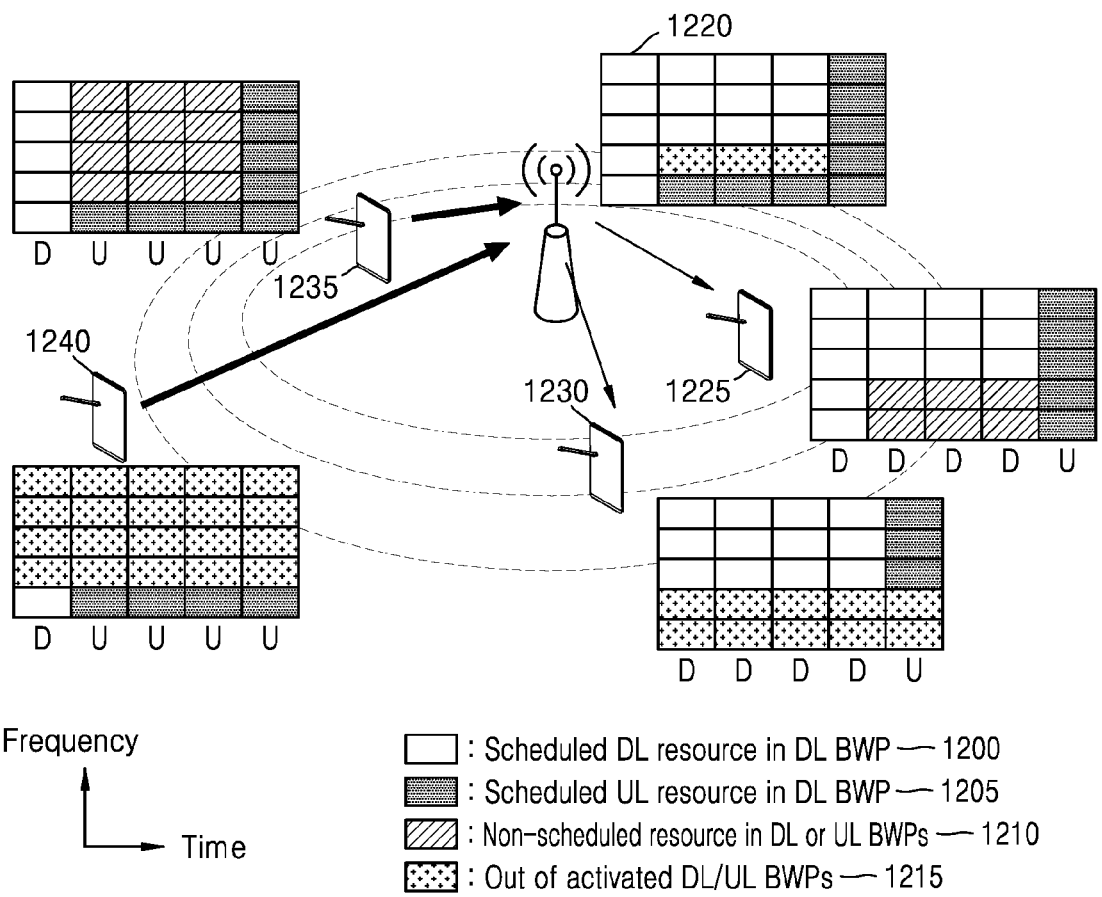
FIG. 12 illustrates a diagram of another uplink-downlink configuration of an XDD system.

FIG. 12 illustrates a diagram of another uplink-downlink configuration of an XDD system. Referring to FIG. 12, a base station may appropriately use the above-described two methods of distinguishing downlink and uplink frequency resources for XDD. For example, from the viewpoint of the base station, uplink-downlink configuration such as 1220 may be assumed. UEs 1225 and 1230 having more downlink traffic than uplink traffic may be allocated a downlink and uplink resource ratio of 4:1 in a time domain by the base station. In this case, when the base station applies a BWP-based XDD operating method to a certain UE (1230), because a scheduled PDSCH 1200 and a scheduled PUSCH 1205 may not be allocated to a region 1215 other than an activated downlink BWP and uplink BWP, uplink/downlink throughput of the UE is limited to some extent. When the base station applies a scheduling-based XDD operating method to a certain UE (1225), because the base station has a higher degree of scheduling freedom than a BWP-based XDD operating method, when necessary, the base station may allocate a PDSCH to a wide band (e.g., a first time interval of 1225) and may not allocate a PDSCH to an interval that requires uplink transmission of another UE (e.g., second through fourth time intervals of 1225). Likewise, UEs 1235 and 1240 having more uplink traffic than downlink traffic or having high uplink coverage importance may be allocated a downlink and uplink resource ratio of 1:4 in a time domain by the base station.

In this case, when the base station applies a BWP-based XDD operating method to a certain UE (1240), because the scheduled PDSCH 1200 and the scheduled PUSCH 1205 may not be allocated to the region 1215 other than an activated downlink BWP and uplink BWP, uplink/downlink throughput of the UE is limited to some extent. When the base station applies a scheduling-based XDD operating method to a certain UE (1235), because the base station has a higher degree of scheduling freedom than a BWP-based XDD operating method, when necessary, the base station may allocate a PUSCH to a wide band (e.g., a fifth time interval of 1235) and may not allocate a PUSCH to an interval that requires downlink reception of another UE (e.g., second through fourth time intervals of 1235).

In the above example, in a resource 1210 that is included in an activated downlink BWP or uplink BWP but where an actual PDSCH or PUSCH is not allocated for XDD operation, ambiguity may occur in base station and UE operations. For example, in the case of a CSI-RS for tracking (TRS), because a smaller one between a BWP bandwidth in which the TRP is transmitted and 52 RBs is used as a transmission bandwidth, a UE operating in an activated downlink BWP including an XDD uplink band of another UE such as the UE 1225 may incorrectly determine that the TRS is transmitted in the region 1210 where a downlink resource such as a PDSCH is not allocated for XDD operation. Likewise, a UE operating in an activated uplink BWP including an XDD downlink band of another UE such as the UE 1235 may incorrectly determine that a periodic or semi-persistent uplink channel or signal such as an SRS or PUCCH is transmitted in the region 1210 where a downlink resource such as a PUSCH is not allocated for XDD operation.

[PUSCH: Related to Transmission Method]

Next, a method of scheduling PUSCH transmission will be described. PUSCH transmission may be dynamically scheduled by an uplink grant in DCI, or may correspond to configured grant Type 1 or Type 2. Dynamic scheduling for PUSCH transmission may be indicated by DCI format 0_0 or 0_1.

Configured grant Type 1 PUSCH transmission may be semi-statically configured through reception of configuredGrantConfig including rrc-ConfiguredUplinkGrant of Table 35 through higher layer signaling, without reception of an uplink grant through DCI. Configured grant Type 2 PUSCH transmission may be semi-persistently scheduled by an uplink grant in DCI, after reception of configuredGrantConfig not including rrc-ConfiguredUplinkGrant of Table 35 through higher layer signaling. When PUSCH transmission is performed by a configured grant, parameters applied to the PUSCH transmission may be applied through configuredGrantConfig of Table 35 received through higher layer signaling except for dataScramblingIdentityPUSCH, txConfig, codebookSubset, maxRank, and scaling of UCI-On-PUSCH provided through pusch-Config of Table 36 which is higher layer signaling. When a UE receives transformPrecoder in configuredGrantConfig of Table 35 through higher layer signaling, the UE applies tp-pi2BPSK in puschConfig of Table 36, for PUSCH transmission performed by a configured grant.

TABLE 35

| | |
|---|---|
| ConfiguredGrantConfig ::= | SEQUENCE { |
| frequencyHopping | ENUMERATED {intraSlot, interSlot} |
| OPTIONAL, -- Need S, | |
| cg-DMRS-Configuration | DMRS-UplinkConfig, |
| mcs-Table | ENUMERATED {qam256, qam64LowSE} |

TABLE 35-continued

```
OPTIONAL,   -- Need S
   mcs-TableTransformPrecoder      ENUMERATED {qam256, qam64LowSE}
OPTIONAL,   -- Need S
   uci-OnPUSCH                     SetupRelease { CG-UCI-OnPUSCH }
OPTIONAL,   -- Need M
   resourceAllocation              ENUMERATED { resourceAllocationType0,
resourceAllocationType1, dynamicSwitch },
   rbg-Size                        ENUMERATED {config2}
OPTIONAL,   -- Need S
   powerControlLoopToUse           ENUMERATED {n0, n1},
   p0-PUSCH-Alpha                  P0-PUSCH-AlphaSetId,
   transformPrecoder               ENUMERATED {enabled, disabled}
OPTIONAL,   -- Need S
   nrofHARQ-Processes              INTEGER(1..16),
   repK                            ENUMERATED {n1, n2, n4, n8},
   repK-RV                         ENUMERATED {s1-0231, s2-0303, s3-
0000}                              OPTIONAL,   -- Need R
   periodicity                     ENUMERATED {
                                      sym2, sym7, sym1x14, sym2x14,
sym4x14, sym5x14, sym8x14, sym10x14, sym16x14, sym20x14,
                                      sym32x14, sym40x14, sym64x14,
sym80x14, sym128x14, sym160x14, sym256x14, sym320x14, sym512x14,
                                      sym640x14, sym1024x14,
sym1280x14, sym2560x14, sym5120x14,
                                      sym6, sym1x12, sym2x12,
sym4x12, sym5x12, sym8x12, sym10x12, sym16x12, sym20x12, sym32x12,
                                      sym40x12, sym64x12, sym80x12,
sym128x12, sym160x12, sym256x12, sym320x12, sym512x12, sym640x12,
                                      sym1280x12, sym2560x12
   },
   configuredGrantTimer            INTEGER (1..64)
OPTIONAL,   -- Need R
   rrc-ConfiguredUplinkGrant       SEQUENCE {
      timeDomainOffset                INTEGER (0..5119),
      timeDomainAllocation            INTEGER  (0..15),
      frequencyDomainAllocation       BIT STRING (SIZE(18)),
      antennaPort                     INTEGER (0..31),
      dmrs-SeqInitialization          INTEGER (0..1)
OPTIONAL,   -- Need R
      precodingAndNumberOfLayers      INTEGER (0..63),
      srs-ResourceIndicator           INTEGER (0..15)
OPTIONAL,   -- Need R
      mcsAndTBS                       INTEGER (0..31),
      frequencyHoppingOffset          INTEGER (1..
maxNrofPhysicalResourceBlocks-1)      OPTIONAL,   -- Need R
      pathlossReferenceIndex          INTEGER (0..maxNrofPUSCH-
PathlossReferenceRSs-1),
      ...
   }
OPTIONAL,   -- Need R
   ...
}
```

Next, a PUSCH transmission method will be described. A DMRS antenna port for PUSCH transmission is the same as an antenna port for SRS transmission. PUSCH transmission may follow a codebook-based transmission method and a non-codebook-based transmission method according to whether a value of txConfig in pusch-Config of Table 36 which is higher layer signaling is 'codebook' or 'nonCodebook'.

As described above, PUSCH transmission may be dynamically scheduled through DCI format 0_0 or 0_1, and may be semi-statically configured by a configured grant. When scheduling for PUSCH transmission is indicated through DCI format 0_0, the UE may perform beam configuration for PUSCH transmission by using pucch-spatialRelationInfoID corresponding to a UE-specific PUCCH resource corresponding to a minimum ID in an activated uplink BWP in a serving cell, and in this case, the PUSCH transmission is based on a single antenna port. The UE does not expect scheduling for PUSCH transmission through DCI format 0_0, in a BWP without a configured PUCCH resource including pucch-spatialRelationInfo. When the UE is not configured with txConfig in pusch-Config of Table 36, the UE does not expect scheduling through DCI format 0_1.

TABLE 36

| | |
|---|---|
| PUSCH-Config ::= | SEQUENCE { |
| dataScramblingIdentityPUSCH | INTEGER (0..1023) |
| OPTIONAL,   -- Need S | |
| txConfig | ENUMERATED {codebook, nonCodebook} |
| OPTIONAL,   -- Need S | |
| dmrs-UplinkForPUSCH-MappingTypeA | SetupRelease { DMRS-UplinkConfig } |

TABLE 36-continued

| | |
|---|---|
| OPTIONAL, -- Need M | |
|   dmrs-UplinkForPUSCH-MappingTypeB | SetupRelease { DMRS-UplinkConfig } |
| OPTIONAL, -- Need M | |
|   pusch-PowerControl | PUSCH-PowerControl |
| OPTIONAL, -- Need M | |
|   frequencyHopping | ENUMERATED {intraSlot, interSlot} |
| OPTIONAL, -- Need S | |
|   frequencyHoppingOffsetLists | SEQUENCE (SIZE (1..4)) OF INTEGER (1.. |
| maxNrofPhysicalResourceBlocks-1) | |
| OPTIONAL, -- Need M | |
|   resourceAllocation | ENUMERATED { resourceAllocationType0, |
| resourceAllocationType1, dynamicSwitch}, | |
|   pusch-TimeDomainAllocationList | SetupRelease { PUSCH- |
| TimeDomainResourceAllocationList } |   OPTIONAL, -- Need M |
|   pusch-AggregationFactor | ENUMERATED { n2, n4, n8 } |
| OPTIONAL, -- Need S | |
|   mcs-Table | ENUMERATED {qam256, qam64LowSE} |
| OPTIONAL, -- Need S | |
|   mcs-TableTransformPrecoder | ENUMERATED {qam256, qam64LowSE} |
| OPTIONAL, -- Need S | |
|   transformPrecoder | ENUMERATED {enabled, disabled} |
| OPTIONAL, -- Need S | |
|   codebookSubset | ENUMERATED |
| {fullyAndPartialAndNonCoherent, partialAndNonCoherent,nonCoherent} | |
| OPTIONAL, -- Cond codebookBased | |
|   maxRank | INTEGER (1..4) |
| OPTIONAL, -- Cond codebookBased | |
|   rbg-Size | ENUMERATED { config2} |
| OPTIONAL, -- Need S | |
|   uci-OnPUSCH | SetupRelease { UCI-OnPUSCH} |
| OPTIONAL, -- Need M | |
|   tp-pi2BPSK | ENUMERATED {enabled} |
| OPTIONAL, -- Need S | |
|   ... | |
| } | |

Next, codebook-based PUSCH transmission will be described. Codebook-based PUSCH transmission may be dynamically scheduled through DCI format 0_0 or 0_1, and may be semi-statically configured by a configured grant. When a codebook-based PUSCH is dynamically scheduled by DCI format 0_1 or is semi-statically configured by a configured grant, the UE determines a precoder for PUSCH transmission based on an SRS resource indicator (SRI), a transmission precoding matrix indicator (TPMI), and a transmission rank (the number of PUSCH transmission layers).

In this case, the SRI may be given through an SRS resource indicator field in DCI, or may be configured through srs-ResourceIndicator that is higher layer signaling. The UE may be configured with at least one SRS resource during codebook-based PUSCH transmission, and may be configured with up to 2 SRS resources. When the UE receives the SRI through the DCI, an SRS resource indicated by the SRI refers to an SRS resource corresponding to the SRI, from among SRS resources transmitted prior to a PDCCH including the SRI. Also, the TPMI and the transmission rank may be given through a precoding information and number of layers field in DCI, or may be configured through precodingAndNumberOfLayers that is higher layer signaling. The TPMI is used to indicate a precoder applied for PUSCH transmission. When the UE is configured with one SRS resource, the TPMI is used to indicate a precoder to be applied over the one configured SRS resource. When the UE is configured with a plurality of SRS resources, the TPMI is used to indicate a precoder to be applied over an SRS resource indicated by the SRI.

A precoder to be used in PUSCH transmission is selected from an uplink codebook having the same number of antenna ports as nrofSRS-Ports in SRS-Config that is higher layer signaling. In codebook-based PUSCH transmission, the UE determines a codebook subset based on a TPMI and codebook Subset in pusch-Config that is higher layer signaling. codebookSubset in pusch-Config that is higher layer signaling may be configured as one of 'fullyAndPartialAndNonCoherent', 'partialAndNonCoherent', or 'nonCoherent' based on UE capability reported by the UE to a base station. When the UE reports 'partialAndNonCoherent' as UE capability, the UE does not expect that codebookSubset that is higher layer signaling is configured as 'fullyAndPartialAndNonCoherent'.

Also, when the UE reports 'nonCoherent' as UE capability, the UE does not expect that codebookSubset that is higher layer signaling is configured as 'fullyAndPartialAndNonCoherent' or 'partialAndNonCoherent'. When nrofSRS-Ports in SRS-ResourceSet that is higher layer signaling indicates two SRS antenna ports, the UE does not expect that codebookSubset that is higher layer signaling is configured as 'partialAndNonCoherent'.

The UE may be configured with one SRS resource set in which a value of usage in SRS-ResourceSet that is higher layer signaling is configured as 'codebook', and one SRS resource in the SRS resource set may be indicated through the SRI. When multiple SRS resources are configured in an SRS resource set in which a value of usage in SRS-ResourceSet that is higher layer signaling is configured as 'codebook', the UE expects that nrofSRS-Ports in SRS-Resource that is higher layer signaling is configured with the same value for all SRS resources.

The UE transmits one or multiple SRS resources included in an SRS resource set in which a value of usage is configured as 'codebook' according to higher layer signaling to the base station, and the base station selects one of the transmitted SRS resources and indicates the UE to perform PUSCH transmission by using transmission beam information of the SRS resource. In this case, in codebook-based PUSCH transmission, the SRI is used as information for selecting an index of one SRS resource, and the SRI may be included in the DCI. In addition, the base station includes information indicating the TPMI and rank to be used by the UE for PUSCH transmission in the DCI. The UE uses the SRS resource indicated by the SRI and performs PUSCH transmission by applying a precoder indicated by the TPMI and the rank indicated based on a transmission beam of the SRS resource.

Next, non-codebook-based PUSCH transmission will be described. Non-codebook-based PUSCH transmission may be dynamically scheduled through DCI format 0_0 or 0_1, and may be semi-statically configured by a configured grant. When at least one SRS resource is configured in an SRS resource set in which a value of usage in SRS-ResourceSet that is higher layer signaling is configured as 'nonCodebook', non-codebook-based PUSCH transmission may be scheduled through DCI format 0_1.

The UE may be configured with one non-zero power (NZP) CSI-RS resource connected to an SRS resource set in which a value of usage in SRS-ResourceSet that is higher layer signaling is configured as 'nonCodebook'. The UE may perform calculation on a precoder for SRS transmission through measurement on the NZP CSI-RS resource connected to the SRS resource set. When a difference between a last reception symbol of an aperiodic NZP CSI-RS resource connected to the SRS resource set and a first symbol of aperiodic SRS transmission in the UE is less than 42 symbols, the UE does not expect that information about the precoder for SRS transmission is updated.

When resourceType in SRS-ResourceSet that is higher layer signaling is configured as 'aperiodic', the connected NZP CSI-RS is indicated by an SRS request field in DCI format 0_1 or 1_1. In this case, when the connected NZP CSI-RS resource is an aperiodic NZP CSI-RS resource and a value of the SRS request field in DCI format 0_1 or 1_1 is not '00', the presence of the NZP CSI-RS connected to the SRS resource set may be indicated. In this case, the DCI should not indicate cross carrier or cross BWP scheduling. Also, when a value of the SRS request indicates the presence of the NZP CSI-RS, the NZP CSI-RS is located in a slot in which a PDCCH including the SRS request field is transmitted. In this case, TCI states configured in a scheduled subcarrier are not configured as QCL-TypeD.

When a periodic or semi-persistent SRS resource set is configured, the connected NZP CSI-RS may be indicated through associatedCSI-RS in SRS-ResourceSet that is higher layer signaling. For non-codebook-based transmission, the UE does not expect that both spatialRelationInfo that is higher layer signaling for an SRS resource and associatedCSI-RS in SRS-ResourceSet that is higher layer signaling are configured.

When the UE is configured with a plurality of SRS resources, the UE may determine a precoder and transmission rank to be applied for PUSCH transmission based on the SRI indicated by the base station. In this case, the SRI may be indicated through an SRS resource indicator field in the DCI, or may be configured through srs-ResourceIndicator that is higher layer signaling. Like codebook-based PUSCH transmission, when the UE receives the SRI through the DCI, an SRS resource indicated by the SRI refers to an SRS resource corresponding to the SRI, from among SRS resources transmitted prior to a PDCCH including the SRI. The UE may use one or multiple SRS resources for SRS transmission, and the maximum number of SRS resources enabled for simultaneous transmission on the same symbol in one SRS resource set and the maximum number of SRS resources are determined based on UE capability reported by the UE to the base station.

In this case, SRS resources that are simultaneously transmitted by the UE occupy the same RB. The UE configures one SRS port for each SRS resource. Only one SRS resource set in which a value of usage in SRS-ResourceSet that is higher layer signaling is configured as 'nonCodebook' may be configured, and up to four SRS resources for non-codebook-based PUSCH transmission may be configured.

The base station transmits one NZP-CSI-RS connected to the SRS resource set to the UE, and the UE calculates a precoder to be used during transmission of one or multiple SRS resources in the SRS resource set, based on a measurement result during NZP-CSI-RS reception. The UE applies the calculated precoder when one or multiple SRS resources in a SRS resource set in which usage is configured as 'nonCodebook' are transmitted to the base station, and the base station selects one or multiple SRS resources from among the received on or multiple SRS resources. In this case, in non-codebook-based PUSCH transmission, the SRI represents an index that may indicate a combination of the one or multiple SRS resources, and the SRI is included in the DCI. In this case, the number of SRS resources indicated by the SRI transmitted by the base station may be the number of transmission layers of a PUSCH, and the UE transmits the PUSCH by applying the precoder applied to SRS resource transmission.

In an embodiment of the disclosure, in order to effectively handle self-interference between a transmission signal (or a downlink signal) and a reception signal (or an uplink signal), special structures of transmitting and receiving ends may be required. For example, structures of transmitting and receiving ends of FIG. 9 may be considered. In the structures of the transmitting and receiving ends of FIG. 9, self-interference may be handled in various methods. For example, the DPD block 911 of the transmitting end may pre-distort the Tx signal 901 in a digital domain so as to minimize leakage power (e.g., the adjacent carrier leakage (ACL) 1005 of FIG. 10) to an adjacent band. In another example, the SIC 921 of the transmitting end may remove a transmission signal received by a receiving end, that is, self-interference, from a reception signal. Besides, various transmission and reception technologies for effective interference control may be applied. In this case, in order for the base station device or the UE device to effectively handle interference between the transmitting and receiving ends, a parameter value of each transmitting/receiving end block should be set to a specific value. In this case, an optimal parameter value of each transmitting/receiving end block for effectively handling interference may vary according to uplink and downlink transmission resource patterns, and thus, when the uplink and downlink transmission resource patterns are changed, a certain amount of delay time for pattern change may occur in each device.

In an embodiment of the disclosure, various embodiments for configuring resources for uplink and downlink transmission and reception in time and frequency domains are provided, and a method of changing a specific uplink and downlink transmission/reception resource pattern to another uplink and downlink transmission/reception resource pattern is provided.

Hereinafter, higher layer signaling may be signaling corresponding to at least one or a combination of one or more of the following signals.

Master information block (MIB)
System information block (SIB) or SIB X (X=1, 2, . . . )
Radio resource control (RRC)
Medium access control (MAC) control element (CE)
UE capability reporting
UE assistance information message Also, L1 signaling may be signaling corresponding to at least one or a combination of one or more of the following physical layer channels or signaling methods.
Physical downlink control channel (PDCCH)
Downlink control information (DCI)
UE-specific DCI
Group common DCI
Common DCI
Scheduling DCI (e.g., DCI used for scheduling downlink or uplink data)
Non-scheduling DCI (e.g., DCI not used for scheduling downlink or uplink data)
Physical uplink control channel (PUCCH)
Uplink control information (UCI)

Embodiment 1: Resource Configuration Method in an XDD System

Embodiment 1 of the disclosure relates to a method and apparatus for configuring resources for uplink or downlink transmission/reception in a time domain and a frequency domain through cell-specific configuration information in an XDD system. Through a resource configuration method for uplink or downlink transmission/reception according to an embodiment of the disclosure, the UE may be configured with uplink resources and downlink resources in different frequency domains in the same time domain. Accordingly, as time domain resource in which the UE may perform uplink transmission or downlink reception may increase, uplink coverage between the UE and a base station may be enhanced. Hereinafter, for convenience of explanation, resource configuration for uplink or downlink transmission/reception is referred to as uplink-downlink configuration.

In detail, in the XDD system, because the UE may be allocated resources for uplink and downlink transmission/reception not only in a time domain but also in a frequency domain, resources for uplink or downlink transmission/reception may not be configured only in the time domain as in a TDD system, but may be configured in the time domain and the frequency domain. Through resource configuration for uplink or downlink transmission/reception in the time domain and the frequency domain to the UE, the base station may configure a guard band as described above to control interference due to out-of-band (OOB) emission occurring when frequency bands of uplink and downlink resources are relatively close compared to FDD. Also, through resource configuration for uplink or downlink transmission/reception in the time domain and the frequency domain, even when an uplink BWP and a downlink BWP have the same center frequency, the UE may determine in which frequency band scheduling is performed and transmission/reception may be performed.

Hereinafter, an uplink or downlink configuration method in a time domain and a frequency domain of an XDD system is provided.

As a resource configuration method for uplink or downlink transmission/reception in a time domain and a frequency domain of an XDD system, the following methods may be considered.

[Method 1]

For resource configuration for uplink or downlink transmission/reception in a time domain and a frequency domain, the base station divides an entire frequency band into n frequency bands (in Embodiment 2, a method of dividing a frequency band into n frequency bands is proposed) and indicates uplink and downlink configuration in the time domain to the UE for each frequency band. Each of the n frequency bands may include a group of consecutive resource blocks, which may be referred to as a resource block set (RBS) or a resource block group and for convenience of explanation, is described as an RBS in the disclosure. In each frequency band, uplink-downlink configuration information may include uplink-downlink pattern information and reference subcarrier information. In the uplink-downlink pattern information, a pattern period 903 in the time domain, the number of consecutive downlink slots 911 from a start point of each pattern, the number of symbols of a next slot 912, the number of consecutive uplink slots 913 from the end of the pattern, and the number of symbols 914 of a next slot may be indicated. In this case, slots and symbols not indicated as uplink and downlink may be determined as flexible slots and symbols.

Figure 14:
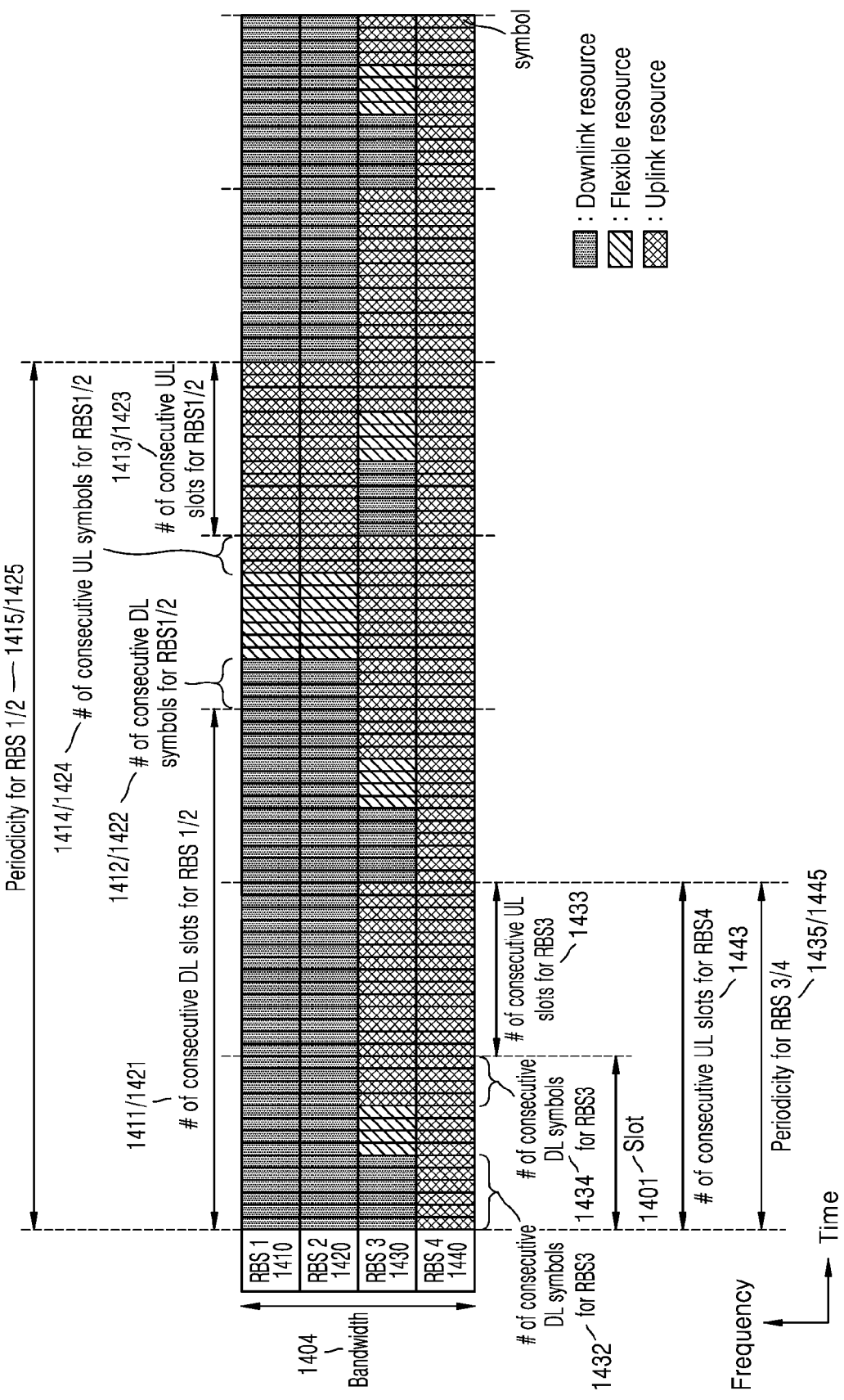
FIG. 14 illustrates a diagram for describing uplink-downlink configuration in a time domain and a frequency domain of an XDD system, according to an embodiment of the disclosure.

FIG. 14 illustrates a diagram for describing uplink-downlink configuration in a time domain and a frequency domain of an XDD system, according to an embodiment of the disclosure.

Referring to FIG. 14, an entire frequency band 1404 is divided into n=4 RBSs (RBS 1 1410, RBS 2 1420, RBS 3 1430, and RBS 4 1440), and uplink-downlink is configured in each time domain for each RBS. For example, a pattern period of the RBS 1 1410 may be configured as 5 slots (1415, or 5 ms based on a subcarrier spacing of 15 kHz), the number of consecutive downlink slots from a start point of a pattern may be configured as 3 (1411), the number of downlink symbols of a next slot may be configured as 4 (1412), the number of consecutive uplink slots from the end of the pattern may be configured as 1 (1413), and the number of uplink symbols of a next slot may be configured as 3 (1414). Uplink-downlink configuration of the RBS 2 1420 may be the same as that of the RBS 1 1410. (A pattern period of the RBS 2 1420 may be configured as 5 slots (1425, or 5 ms based on a subcarrier spacing of 15 kHz), the number of consecutive downlink slots from a start point of a pattern may be configured as 3 (1421), the number of downlink symbols of a next slot may be configured as 4 (1422), the number of consecutive uplink slots from the end of the pattern may be configured as 1 (1423), and the number of uplink symbols of a next slot may be configured as 3 (1424).)

An uplink-downlink pattern period of the RBS 3 1430 may be configured as 2 slots (1435, or 2 ms based on a subcarrier spacing of 15 kHz), the number of consecutive downlink slots from a start point of a pattern may be configured as 0, the number of downlink symbols of a next slot may be configured as 6 (1432), the number of consecutive uplink slots from the end of the pattern may be 1 (1433), and the number of uplink symbols of a next slot may be configured as 4 (1434). Last, an uplink-downlink pattern period of the RBS 4 1440 may be configured as 2 slots (1445, or 2 ms based on a subcarrier spacing of 15 kHz), the number of consecutive downlink slots from a start point of a pattern may be configured as 0, the number of downlink symbols of a next slot may be configured as 0, the number of consecutive uplink slots from the end of the pattern may be configured as 2 (1443), and the number of uplink symbols of a next slot may be configured as 0 (1444).

For uplink-downlink configuration, because uplink-downlink is configured for each RBS within limited overhead, uplink or downlink resources may be relatively flexibly configured in the time domain.

[Method 2]

During uplink-downlink configuration of a time domain and a frequency domain to the UE, the base station divides an entire frequency band into n frequency bands and indicates uplink-downlink configuration in the frequency domain. In each pattern, uplink-downlink configuration information may include uplink-downlink pattern information and reference subcarrier information. In the uplink-downlink pattern information, the number of slot(s)/symbol(s) in the time domain having the same pattern, the number of consecutive downlink RBSs from a start point of the entire frequency band, the number of downlink RBs of a next RBS, the number of consecutive uplink RBSs from the end of the entire frequency band, and the number of uplink RBs of a next RBS may be indicated. In this case, RBSs and RBs not indicated as uplink and downlink may be determined as flexible RBSs and RBs.

Figure 15:
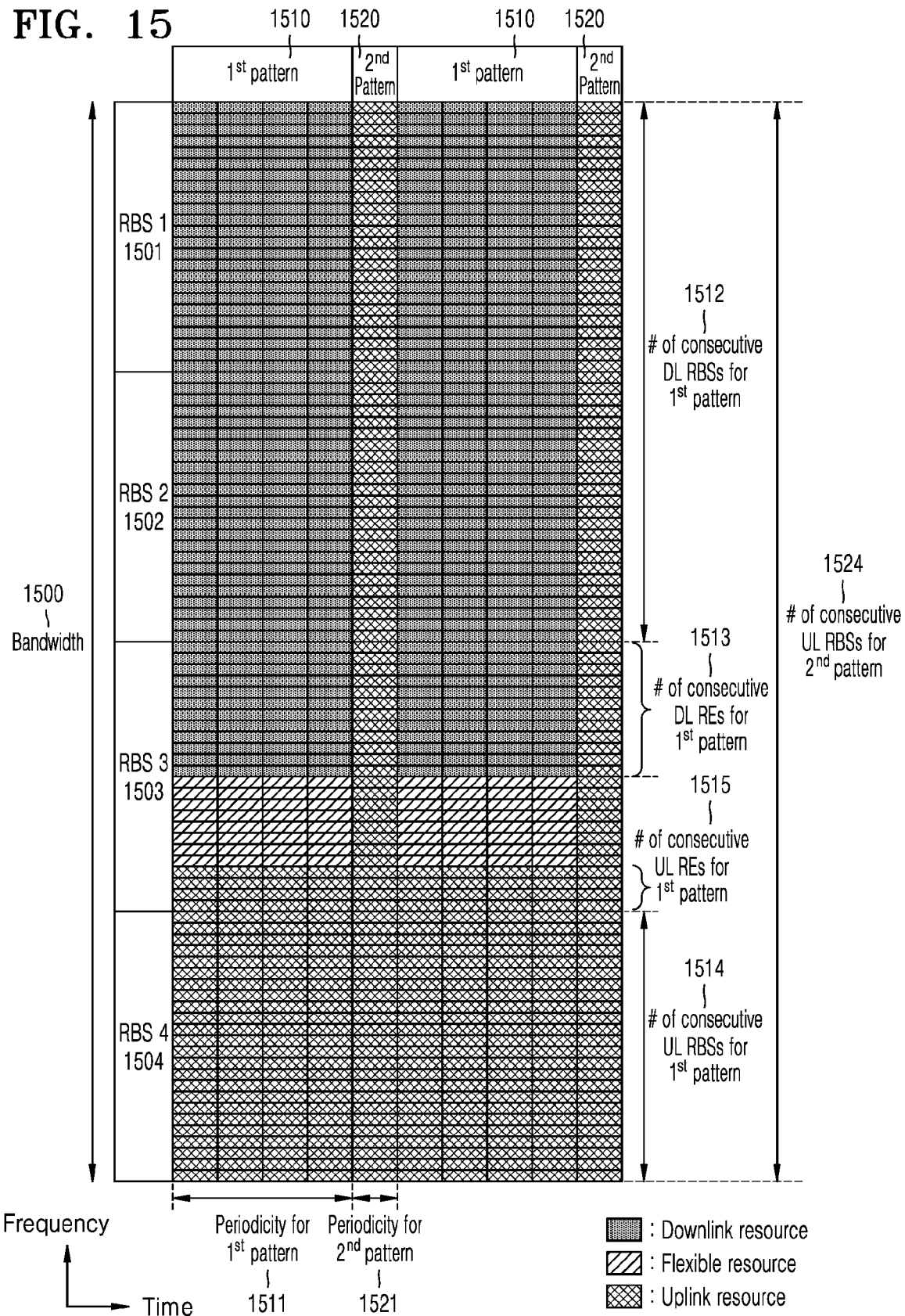
FIG. 15 illustrates a diagram of uplink-downlink configuration in time and frequency of an XDD system, according to another embodiment of the disclosure.

FIG. 15 illustrates a diagram for describing uplink-downlink configuration in a time domain and a frequency domain of an XDD system, according to another embodiment of the disclosure.

Referring to FIG. 15, an entire frequency band 1500 is divided into n=4 RBSs 1501, 1502, 1503, and 1504, each RBS includes 24 RBs, and uplink-downlink is configured in the frequency domain for each pattern. For example, a period of a first pattern 1510 may be configured as 4 slots (1511, or 4 ms based on a subcarrier spacing of 15 kHz), the number of consecutive downlink RBSs from a start point of the entire frequency band may be configured as 2 (1512), the number of downlink RBs of a next RBS may be configured as 12 (1513), the number of consecutive uplink RBSs from the end of the entire frequency band may be configured as 1 (1514), and the number of uplink RBs of a next RBS may be configured as 4 (1515). A period of a second pattern 1520 may be configured as 1 slot (1521, or 1 ms based on a subcarrier spacing of 15 kHz) and the number of consecutive uplink RBSs from the end of the entire frequency band may be configured as 4 (1524).

For uplink-downlink configuration, because uplink-downlink is configured in the frequency domain with a period of the time domain for each pattern within limited overhead, uplink or downlink may be relatively flexibly configured in the frequency domain. In this case, in the XDD system, to reduce interference in an uplink channel or signal reception due to out-of-band emission occurring when the base station transmits a downlink channel or signal in a downlink resource, a guard band may be efficiently configured.

Embodiment 2: Frequency Band Division Method in an XDD System

In Embodiment 2 of the disclosure, a method of dividing an entire frequency band into n frequency bands in Embodiment 1 will be described. In detail, unlike in a TDD system in which uplink resources and downlink resources are divided only in time, in an XDD system, frequency resources need to be divided in specific units to configure uplink-downlink resources. In particular, when an entire frequency band is 100 MHz and a subcarrier spacing is 30 kHz, the frequency band may include 273 RBs. In this case, when each of the 273 RBs is configured as an uplink resource or a downlink resource, considerable overhead may occur.

Accordingly, in the XDD system, as a method of dividing a frequency band into groups for uplink-downlink configuration of a time domain and a frequency domain, the following methods may be considered.

[Method 1]

RBs of a frequency band may include n groups including a specific number of RBs. The number of RBs per group may be indicated through uplink-downlink pattern configuration or may be configured as a pre-agreed number to configure n groups. For example, when a subcarrier spacing (SCS) is 30 kHz and an entire frequency band is 100 MHz, the total number of RBs is 273. When the number of RBs per group is included and indicated as 24 in uplink-downlink pattern configuration or a pre-agreed number is configured as 24, n (=[total number of RBs/number of RBs configured per group]=[273/24]=12) groups may be configured. This may be efficiently determined to reduce overhead for uplink-downlink configuration of a frequency domain.

The above method is a method for configuring RBs of a frequency band into n groups including a specific number of RBs, and the number of RBs configured per group is not limited to a pre-agreed value or uplink-downlink pattern configuration. Information required to configure the number of RBs per group may be included in a system information block, user-specific configuration information through dedicated higher layer signaling, MAC CE, or downlink control information that is L1 signaling.

[Method 2]

An entire frequency band may include n groups include a specific frequency band. A specific frequency band value per group may be indicated through uplink-downlink pattern configuration or may be configured as a pre-agreed number to configure n groups. For example, when an entire frequency band is 100 MHz, and a frequency band per group is included and indicted as 20 MHz in uplink-downlink pattern configuration or a pre-agreed frequency band is configured as 20 MHz, n (=[total frequency band/configured frequency band per group]=[100/20]=5) groups may be configured. This may be efficiently determined to reduce overhead for uplink-downlink configuration of a frequency domain as described above.

The above method is a method for configuring a frequency band into n groups including a specific frequency band, and a method of configuring a frequency band value per group is not limited to a method of configuring an uplink-downlink pattern. A frequency band value per group may be configured as a pre-agreed number of RBs, or information used to configure a frequency band value per group may be included in a system information block, user-specific configuration information through dedicated higher layer signaling, MAC CE, or downlink control information that is L1 signaling.

[Method 3]

An entire frequency band may include 2 groups based on a guard band. A frequency band of a guard band may be indicated through uplink-downlink pattern configuration, and two groups of a frequency band lower than the guard band and a frequency band higher than the guard band may be configured based on the guard band. For example, in an entire frequency band of 100 MHz, when a start position and a size of a guard band are configured as 50 CRBs with a $100^{th}$ CRB as a start point based on Point A, Point A that is a frequency band lower than the guard band to a $99^{th}$ CRB may be a first group and a $150^{th}$ CRB to a last CRB may be a second group. This may be efficiently determined to reduce overhead for uplink-downlink configuration of a frequency domain as described above. In particular, it is very difficult for the base station to allocate resources so that downlink or uplink is not continuous at the same time point, and interference due to OOB may occur between uplink and downlink as described above. Accordingly, when downlink or uplink should always be consecutively configured, two groups may be efficiently divided by a guard band configured between downlink and the uplink.

The above method is a method for configuring a frequency band into two groups based on a guard band, and a method for guard band-related configuration is not limited to a method of configuring an uplink-downlink pattern. A guard band may be configured as a pre-agreed number of RBs, or information used to configure a guard band may be included in a system information block, user-specific configuration information through dedicated higher layer signaling, MAC CE, or downlink control information that is L1 signaling.

Embodiment 3: Uplink/Downlink Configuration Method in an XDD System

According to an embodiment of the disclosure, uplink resources and downlink resources may be flexibly configured in time and frequency domains. That is, arbitrary time and frequency resources may be configured as uplink or downlink. In the following description of the disclosure, when arbitrary time and frequency resources are configured as uplink or downlink, it is referred to as "uplink/downlink configuration (UL DL Configuration)". The uplink/downlink configuration may include downlink symbols, uplink symbols, flexible symbols, etc.

According to an embodiment of the disclosure, uplink/downlink configuration may be changed statically, semi-statically, or dynamically. According to an embodiment of the disclosure, the base station may configure or indicate, to the UE, uplink/downlink configuration information through higher layer signaling, L1 signaling, or a combination of higher layer signaling and L1 signaling. For example, the base station may perform uplink/downlink configuration on the UE through higher layer signaling. In another example, the base station may perform one or more uplink/downlink configurations on the UE through higher layer signaling, and may activate one uplink/downlink configuration of the one or more uplink/downlink configurations through higher layer signaling (e.g., MAC CE) or L1 signaling. The UE may obtain the uplink/downlink configuration information from the base station, and may expect to receive a signal in a resource configured as downlink, and may expect to transmit a signal in a resource configured as uplink. Various uplink/downlink configuration methods may follow Embodiment 1 and Embodiment 2.

According to an embodiment of the disclosure, uplink/downlink configuration may be changed based on L1 signaling (e.g., DCI). In more detail, the base station may transmit, through a PDCCH, a DCI format including an indicator for changing uplink/downlink configuration A to uplink/downlink configuration B, to the UE. The UE may receive the DCI format including the indicator for changing uplink/downlink configuration from the base station, and may change the uplink configuration A to the uplink configuration B based on content indicated in the received DCI format.

According to an embodiment of the disclosure, a table including a plurality of uplink/downlink configurations for changing uplink/downlink configuration may be pre-defined, or may be configured for the UE from the base station through higher layer signaling. For example, an "uplink/downlink configuration table" including N uplink/downlink configurations such as {uplink/downlink configuration #1, uplink/downlink configuration #2, uplink/downlink configuration #3, . . . , uplink/downlink configuration #N} may be pre-defined or may be configured for the UE from the base station through higher layer signaling. The base station may transmit an indicator for activating arbitrary uplink/downlink configuration #X in the uplink/downlink configuration table to the UE through L1 signaling (e.g., DCI format). The UE may activate the uplink/downlink configuration #X indicated through L1 signaling (e.g., DCI format) received from the base station based on the uplink/downlink configuration table that is pre-defined or pre-configured.

According to an embodiment of the disclosure, when uplink/downlink configuration is changed, an additional change delay time Tdelay may be considered. As described above, an optimal parameter value of each transmitting/receiving end block for effectively handling interference between downlink and uplink may vary according to uplink/downlink transmission resource patterns, and thus, a certain amount of delay time Tdelay for changing the transmitting/receiving end parameter value according uplink/downlink configuration change may occur.

Figure 16:
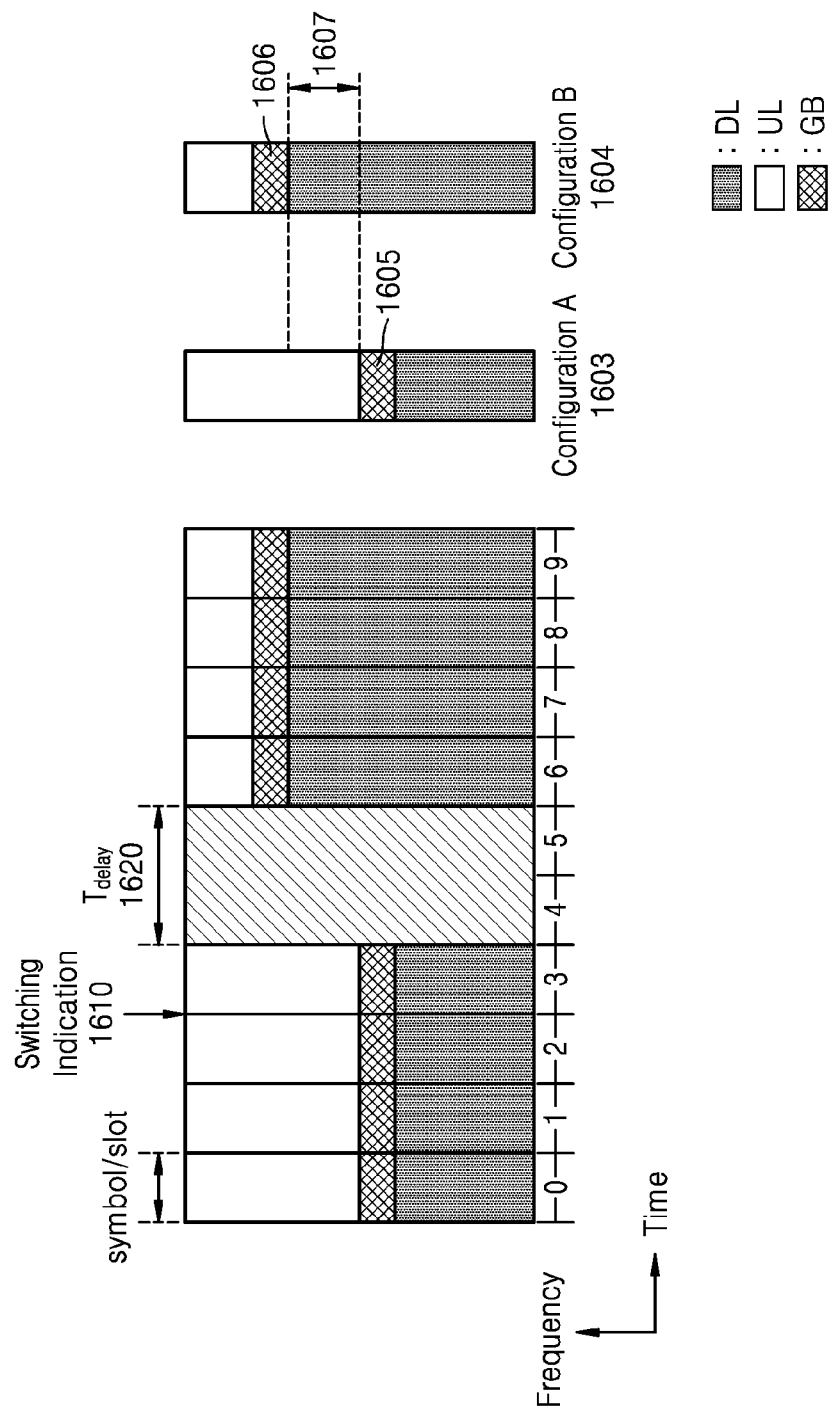
FIG. 16 illustrates a diagram of uplink configuration change, according to an embodiment of the disclosure.

FIG. 16 illustrates a diagram for describing uplink/downlink configuration change, according to an embodiment of the disclosure.

FIG. 16 illustrates an example where configuration change occurs between uplink/downlink configuration A 1603 and uplink/downlink configuration B 1604. A resource unit of a time domain is assumed to be a symbol, a slot, or any of various other time units (e.g., mini-slot), and in the example of FIG. 16, a slot unit is assumed. In the example of FIG. 16, a base station transmits an uplink/downlink configuration change indicator 1610 to a UE in a slot 3 so as to change uplink/downlink configuration from the uplink/downlink configuration A 1603 to the uplink/downlink configuration B 1604. In this case, in order to change uplink/downlink configuration from the uplink/downlink configuration A 1603 to the uplink/downlink configuration B 1604, a change time corresponding to $T_{delay}$ 1620 may be required. That is, the base station may transmit the configuration change indicator 1610 in an arbitrary slot n to change uplink/downlink configuration, and may operate XDD based on the changed uplink/downlink configuration from a time after a slot $n+T_{delay}$. When the UE receives the uplink/downlink configuration change indicator from the base station in the slot n, the UE may operate XDD based on the changed uplink/downlink configuration from the time after the slot $n+T_{delay}$.

According to an embodiment of the disclosure, a change delay time $T_{delay}$ 1620 may be considered only when a special "condition A" is satisfied. That is, when the condition A is satisfied, $T_{delay}$ 1620 may have a value greater than 0, and when the condition A is not satisfied, $T_{delay}$ 1620 may be 0. For example, when at least one or a combination of one or more of the following conditions is satisfied, $T_{delay}$ 1620 may be considered.

[Condition 1]

When an uplink/downlink direction in a specific frequency domain resource is changed in the uplink/downlink configuration A before change and the uplink/downlink configuration B after change, the change delay time $T_{delay}$ may be required. For example, in detail, in the example of FIG. 16, when the uplink/downlink configuration A 1603 is changed to the uplink/downlink configuration B 1604, a specific frequency domain resource 1607 may be changed from uplink to downlink. As such, when direction change occurs between uplink and downlink in a frequency domain resource, the change delay time $T_{delay}$ 1620 may be required. When direction change occurs between uplink and downlink in a frequency domain, an interference state between uplink and downlink may be changed. Accordingly, the change delay time $T_{delay}$ that is an additional time to set an optimal parameter value of a transmitting/receiving end of a base station or a UE device may be required.

[Condition 2]

When a guard band in the uplink/downlink configuration A before change and the uplink/downlink configuration B after change is changed (e.g., a position or a size of the guard band is changed), the change delay time $T_{delay}$ may be required. For example, in detail, in the example of FIG. 16, the uplink/downlink configuration A 1603 before change and the uplink/downlink configuration B 1604 after change may have guard bands 1605 and 1606 whose positions are different, and in this case, the change delay time $T_{delay}$ 1620 may be required. A required size and a required position of a guard band in uplink/downlink configuration may vary according to interference between uplink and downlink. That is, configuration information of a guard band may also vary according to uplink/downlink configuration, and when guard band configuration is changed, it may mean that an interference state between uplink and downlink is changed. Accordingly, when uplink/downlink configuration is changed and a guard band is also changed, it may mean that an interference state between uplink and downlink is changed. Accordingly, the additional change delay time $T_{delay}$ may be required to set an optimal parameter value of a transmitting/receiving end of a base station or UE device.

[Condition 3]

When the uplink/downlink configuration A before change corresponds to specific uplink/downlink configuration X, the change delay time $T_{delay}$ 1620 may be required. In an embodiment of the disclosure, when the specific uplink/downlink configuration X may be pre-defined, may be explicitly pre-configured through higher layer signaling from the based station to the UE, or may be implicitly determined by another system parameter. In an embodiment of the disclosure, there may be one or multiple specific uplink/downlink configurations X, and when there are a plurality of specific uplink/downlink configurations X, the plurality of uplink/downlink configurations may constitute an uplink/downlink configuration X set. In this case, when the uplink/downlink configuration A before change corresponds to an arbitrary uplink/downlink configuration in the uplink/downlink configuration X set, the change delay time may be required.

[Condition 4]

When the uplink/downlink configuration B after change corresponds to specific uplink/downlink configuration Y, the change delay time $T_{delay}$ 1620 may be required. In an embodiment of the disclosure, the specific uplink/downlink configuration Y may be pre-defined, may be explicitly pre-configured through higher layer signaling from the base station to the UE, or may be implicitly determined by another system parameter. In an embodiment of the disclosure, there may be one or multiple specific uplink/downlink configurations Y, and when there are a plurality of specific uplink/downlink configurations Y, the plurality of uplink/downlink configurations may constitute an uplink/downlink configuration Y set. In this case, when the uplink/downlink configuration B after change corresponds to an arbitrary uplink/downlink configuration in the uplink/downlink configuration Y set, the change delay time may be required.

[Condition 5]

When the uplink/downlink configuration A before change corresponds to the specific uplink/downlink configuration X and the uplink/downlink configuration B after change corresponds to the specific uplink/downlink configuration Y, the change delay time $T_{delay}$ 1620 may be required. In an embodiment of the disclosure, the specific uplink/downlink configuration X and the specific uplink/downlink configuration Y may be pre-defined, may be explicitly pre-configured through higher layer signaling from the base station to the UE, or may be implicitly determined by another system parameter. In an embodiment of the disclosure, there may be one or multiple specific uplink/downlink configurations X and specific uplink/downlink configurations Y, and when there are a plurality of specific uplink/downlink configurations X and specific uplink/downlink configurations Y, the plurality of uplink/downlink configurations may constitute an uplink/downlink configuration X set and an uplink/downlink configuration Y set. In this case, when the uplink/downlink configuration A before change corresponds to an arbitrary uplink/downlink configuration in the uplink/downlink configuration X set and the uplink/downlink configuration B after change corresponds to an arbitrary uplink/downlink configuration in the uplink/downlink configuration Y set, the change delay time may be required.

According to an embodiment of the disclosure, the change delay time $T_{delay}$ 1620 may always be considered when uplink/downlink configuration change occurs. That is, regardless of whether the condition A is satisfied, the change delay time $T_{delay}$ may always be required.

According to an embodiment of the disclosure, the uplink/downlink change delay time $T_{delay}$ may be pre-defined as a fixed value. The base station and the UE may determine a change delay time based on the pre-defined uplink/downlink change delay time $T_{delay}$.

According to an embodiment of the disclosure, the uplink/downlink change delay time Tdelay may be explicitly configured or notified through higher layer signaling from the base station to the UE. The UE may determine a change delay time based on the uplink/downlink change delay time $T_{delay}$ notified from the base station.

According to an embodiment of the disclosure, the uplink/downlink change delay time $T_{delay}$ may be notified through UE capability signaling from the UE to the base station. The base station may determine a change delay time based on the uplink/downlink change delay time $T_{delay}$ notified from the UE.

According to an embodiment of the disclosure, the uplink/downlink change delay time $T_{delay}$ may be defined as a value that varies according to a subcarrier spacing value. That is, $T_{delay,i}$ may be defined for a subcarrier spacing i. For example, when a subcarrier spacing is 15 kHz, $T_{delay,0}$ may be required; when a subcarrier spacing is 30 kHz, $T_{delay,1}$ may be required; when a subcarrier spacing is 60 kHz, $T_{delay,2}$ may be required; and when a subcarrier spacing is 120 kHz, $T_{delay,3}$ may be required.

According to an embodiment of the disclosure, the uplink/downlink change delay time $T_{delay}$ may be defined as the same value regardless of a subcarrier spacing value.

According to an embodiment of the disclosure, the uplink/downlink change delay time $T_{delay}$ may have a value that varies according to uplink/downlink configuration information before change or after change. For example, when uplink/downlink configuration A1 is changed to uplink/downlink configuration B1, the change delay time $T_{delay,1}$ may be required, and for example, when uplink/downlink configuration A2 is changed to uplink/downlink configuration B2, the change delay time $T_{delay,2}$ may be required.

According to an embodiment of the disclosure, the uplink/downlink change delay time $T_{delay}$ may have a value that varies according to a range of a changed frequency domain resource. A range of a frequency domain resource may be determined based on at least one of a band of the frequency domain resource or a size of the frequency domain resource.

According to an embodiment of the disclosure, the UE may not expect transmission or reception during the uplink/downlink change delay time $T_{delay}$. In more detail, when the UE receives an indicator for changing uplink/downlink configuration in a slot n and the change requires the uplink/downlink change delay time, the UE may not expect transmission or reception from the slot n to a slot $n+T_{delay}$.

According to an embodiment of the disclosure, an uplink/downlink configuration change indicator may be transmitted from the base station to the UE by using at least one of common DCI (or DCI format monitored in a common search space), group-common DCI (or DCI format monitored in a Type-3 common search space), UE-specific DCI (or DCI format monitored in a UE-specific search space), a DCI format including scheduling, or a DCI format not including scheduling.

According to an embodiment of the disclosure, an uplink/downlink configuration change indicator may include uplink/downlink configuration information for one or multiple slots. That is, the base station may transmit a configuration change indicator for indicating uplink/downlink configuration for one or multiple slots to the UE, and the UE may receive the configuration change indicator for indicating uplink/downlink configuration for one or multiple slots from the base station.

Figure 17:
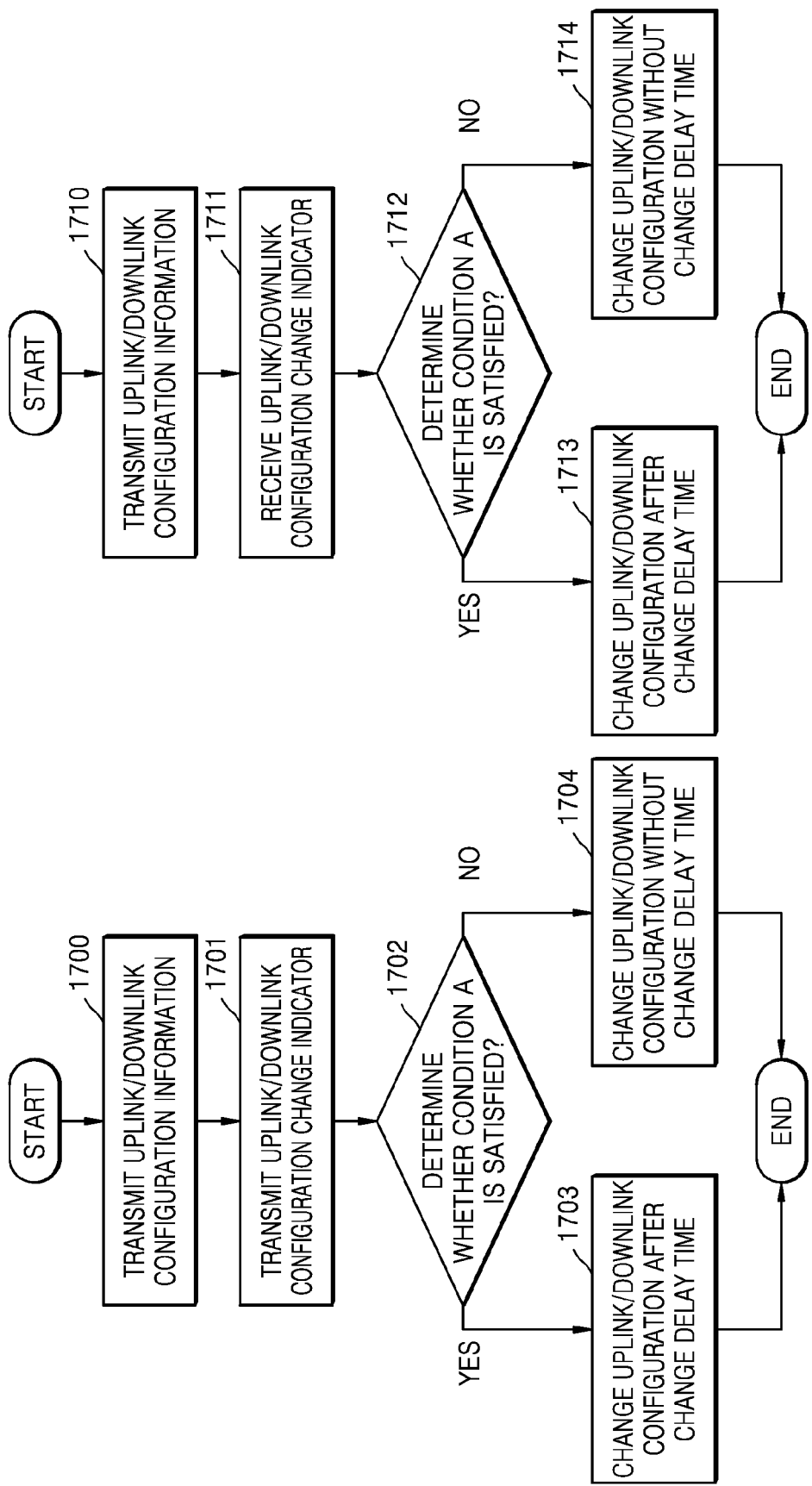
FIG. 17 illustrates a diagram of a base station procedure and a user equipment (UE) procedure, according to an embodiment of the disclosure.

FIG. 17 illustrates a diagram of a base station procedure and a UE procedure, according to an embodiment of the disclosure.

First, a base station procedure will be described.

In operation 1700, a base station may transmit uplink/downlink configuration information to a UE. In operation 1701, the base station may transmit an uplink/downlink configuration change indicator to the UE. In operation 1702, the base station may determine whether a condition A is satisfied. When it is determined that the condition A is satisfied, in operation 1703, the base station may change uplink/downlink configuration by considering a change delay time. When it is determined that the condition A is not satisfied, in operation 1704, the base station may change uplink/downlink configuration without a change delay time.

Next, a UE procedure will be described.

In operation 1710, the UE may receive uplink/downlink configuration information from the base station. In operation 1711, the UE may receive an uplink/downlink configuration change indicator from the base station. In operation 1712, the UE may determine whether a condition A is satisfied. When it is determined that the condition A is satisfied, in operation 1713, the UE may change uplink/downlink configuration by considering a change delay time. When it is determined that the condition A is not satisfied, in operation 1714, the UE may change uplink/downlink configuration without a change delay time.

Embodiment 4: L1-SINR Measurement and Reporting Method

In an embodiment of the disclosure, a layer 1 based signal to interference plus noise ratio (L1-SINR) measurement and reporting method will be described in detail based on the following sub-embodiments. In Embodiment 4-1, a resource configuration method for L1-SINR measurement and reporting will be described, and in Embodiment 4-2, a L1-SINR reporting method will be described.

Embodiment 4-1: Resource Configuration Method for L1-SINR Measurement and Reporting In an embodiment of the disclosure, a resource configuration method for L1-SINR measurement and reporting will be described. [Table 26] relates to CSI-ReportConfig configured through higher layer signaling related to CSI reporting, and may be used to describe L1-SINR measurement described below.

When one resource setting is configured in CSI-ReportConfig that is higher layer signaling for L1-SINR measurement, the resource setting (e.g., resourcesForChannelMeasurement that is higher layer signaling) may be an NZP CSI-RS for channel and interference measurement. In this case, the UE may assume that an NZP CSI RS having a port number of 1 and a density value of 3 REs/RB is used for channel and interference measurement.

When two resource settings are configured in CSI-ReportConfig that is higher layer signaling for L1-SINR measurement, the first resource setting (e.g., resourcesForChannelMeasurement that is higher layer signaling) may be an SSB or NZP CSI-RS for channel measurement, and the second resource setting (e.g., csi-IM-ResourcesForInterference or nzp-CSI-RS-ResourcesForInterference that is higher layer signaling) may be a CSI-IM for interference measurement or an NZP CSI-RS having a port number of 1 and a density value of 3 REs/RB. In this case, the SSB or NZP CSI-RS for channel measurement may be connected to one NZP CSI-RS for interference measurement or one CSI-IM resource in the same resource set. The number of SSBs or NZP CSI-RSs for channel measurement may be the same as the number of CSI-IMs or NZP CSI-RSs for interference measurement.

In this case, when a reference RS for QCL-TypeD of the CSI-IM or the NZP CSI-RS for interference measurement connected to the SSB or NZP CSI-RS for channel measurement is determined, a reference RS for QCL-TypeD of the SSB for channel measurement or the NZP CSI-RS for channel measurement may be used.

Also, the UE may expect that repetition that is higher layer signaling is configured for an NZP CSI RS resource set for channel measurement and an NZP CSI-RS resource set for interference measurement. That is, both the NZP CSI-RS resource set for channel measurement and the NZP CSI-RS resource set for interference measurement may be used for beam measurement.

For L1-SINR measurement based on a specific interference measurement resource, the UE may assume that total power received from a specific NZP CSI-RS resource for interference measurement or a specific CSI-IM resource for interference measurement corresponds to interference and noise.

For L1-SINR calculation, the UE may be configured with an NZP CSI-RS resource and/or SSB resource for channel measurement, and may be configured with an NZP CSI-RS or CSI-IM resource for interference measurement. In this case, for channel measurement, the UE may be configured with up to 16 CSI resource sets, and may be configured with up to 64 CSI-RS or 64 SSB resources throughout all resource sets.

When one or two resource settings are configured for L1-SINR measurement, time restriction for channel measurement or interference measurement described below may be considered.

When timeRestrictionForChannelMeasurements in CSI-ReportConfig that is higher layer signaling is configured as 'notConfigured', the UE should derive channel measurement for L1-SINR calculation to be reported in an nth uplink slot, based on an SSB or NZP CSI-RS that may be received prior to a CSI reference resource connected to the one or two resource settings.

When timeRestrictionForChannelMeasurements in CSI-ReportConfig that is higher layer signaling is configured as 'configured', the UE should derive channel measurement for L1-SINR calculation to be reported in an nth uplink slot, based on a latest one from among SSBs or NZP CSI-RSs that may be received prior to a CSI reference resource connected to the one or two resource settings.

When timeRestrictionForInterferenceMeasurements in CSI-ReportConfig that is higher layer signaling is configured as 'notConfigured', the UE should derive interference measurement for L1-SINR calculation to be reported in an nth uplink slot, based on a CSI-IM or an NZP CSI-RS for interference measurement which may be received prior to a CSI reference resource connected to the one or two resource settings.

When timeRestrictionForChannelMeasurements in CSI-ReportConfig that is higher layer signaling is configured as 'configured', the UE should derive interference measurement for L1-SINR calculation to be reported in an nth uplink slot, based on a latest one from among CSI-IMs or NZP CSI-RSs for interference measurement which may be received prior to a CSI reference resource connected to the one or two resource settings.

Embodiment 4-2: L1-SINR Reporting Method

In an embodiment of the disclosure, an L1-SINR reporting method will be described.

During L1-SINR reporting, a specific quantization level may be used according to the following condition.

When nrofReportedRS in CSI-ReportConfig that is higher layer signaling is configured as 1, an L1-SINR may be quantized and reported to 7 bits by using a step size of 0.5 dB for a value in a range of [−23, 40] dB.

When nrofReportedRS in CSI-ReportConfig that is higher layer signaling is greater than 1 or groupBasedBeamReporting that is higher layer signaling is configured as 'enabled', the UE may use differential L1-SINR reporting. In this case, a maximum L1-SINR may be quantized to 7 bits by using a step size of 0.5 dB for a value in a range of [−23, 40] dB, and a differential L1-SINR may be quantized to 4 bits by using a step size of 1 dB for a difference from the maximum L1-SINR reported along with the differential L1-SINR. When an NZP CSI-RS is configured for channel measurement and/or interference measurement, it may be expected that a reported L1-SINR is not compensated by a power offset such as powerControlOffsetSS or powerControlOffset that is higher layer signaling.

When the UE is configured with reportQuantity in CSI-ReportConfig that is higher layer signaling as 'cri-SINR' or 'ssb-Index-SINR', the UE may consider the following operations related to group-based beam reporting.

When the UE is configured with groupBasedBeamReporting that is higher layer signaling as 'disabled', the UE may include nrofReportedRS different CRIs or SSBRIs configured through higher layer signaling in one report and may report them to the base station.

When the UE is configured with groupBasedBeamReporting that is higher layer signaling as 'enabled', the UE may include two different CRIs or SSBRIs in one report and may report them to the base station. In this case, CSI-RSs and/or SSBs indicated by the CRIs or SSBRIs may be those simultaneously received from the UE.

When the UE is configured with reportQuantity in CSI-ReportConfig that is higher layer signaling as ssb-Index-SINR', the UE should derive an L1-SINR based on an SSBRI reported to the base station. In this case, SSBRIk (k≥0) may correspond to a (k+1)th entry among csi-SSB-ResourceList in CSI-SSB-ResourceSet for channel measurement, and may be connected to a (k+1)th entry among csi-IM-Resources in csi-IM-ResourceSet or a (k+1)th entry among nzp-CSI-RS-Resources in NZP-CSI-RS-ResourceSet for interference measurement.

When the UE is configured with reportQuantity in CSI-ReportConfig that is higher layer signaling as 'cri-RSRP', cri-SINR' or 'none' and CSI-ReportConfig is connected to resource setting in which resourceType that is higher layer signaling is configured as 'aperiodic', the UE may not expect that more than 16 CSI-RS resources are configured in a CSI-RS resource set in the resource setting.

As an equation for a priority rule, $Pri_{iCSI}(y, k, c, s) = 2 \cdot Ncells \cdot MS \cdot y \cdot Ncells \cdot Ms \cdot k + Ms \cdot c + s$ or the like may be considered, and in CSI reporting including L1-SINR reporting, k=0.

Embodiment 5: Improved L1-SINR Measurement and Reporting Method for an XDD System Because the purpose of introducing an XDD system is to enhance coverage of an uplink transmission signal and reduce a delay time as described above, signal transmission in different duplex directions may occur in the same time resource within a cell. Accordingly, cross-link interference (CLI) may occur in a UE receiving a downlink signal from a UE transmitting an uplink signal. Such CLI may occur between two operators in a cell using an XDD system, when both operators use an XDD system or one operator uses XDD and the other operator uses TDD. When an uplink reception-only access point (e.g., reception-only point (RP)) that may be used in combination with XDD is used, there are many different scenarios in which CLI occurs and the influence may increase, and occurrence of CLI may also be considered even in full-duplex communication in which uplink and downlink may be performed in the same time/frequency resource. In order to minimize the influence of CLI, the influence of corresponding interference should be measured, reported, and utilized by the base station.

In L1-RSRP in the related art, in FR2, the UE may measure reception power of a downlink transmission beam and may report the measured reception power to the base station, and thus, the base station may determine which transmission beam is a most appropriate transmission beam for the UE. In addition, in L1-SINR, a derived interference measurement result may be additionally reflected, the quality of a transmission beam in which interference is reflected may be measured, and thus, the base station may determine which transmission beam is a most appropriate transmission beam for the UE by considering the interference. However, in an L1-SINR in the related art, although CLI that may occur in an XDD system may be reflected and interference or noise reception power that may be received on a CSI-IM or NZP CSI-RS resource for interference measurement may be identified, which uplink transmission beam causes most serious interference may not be identified. Accordingly, it may be helpful in uplink and downlink transmission beam scheduling of the base station to determine how much interference is caused by a specific uplink transmission beam by considering an uplink transmission beam as an interference measurement resource and report a pair of a specific downlink transmission beam and uplink transmission beam which may be used together.

Based on the above description in an embodiment of the disclosure, an improved L1-SINR measurement and reporting method in consideration of CLI occurring from a specific uplink transmission beam for an XDD system will be described in detail based on the following sub-embodiments.

resources for interference measurement corresponding to the second resource setting have a port number of 1 or are configured with SRS-SpatialRelationInfo that is higher layer signaling. Also, the second resource setting may be explicitly configured in CSI-ReportConfig that is higher layer signaling as shown in Table 37, or connection between CSI-ReportConfig corresponding to specific CSI-ReportConfigId and SRS resource or SRS-ResourceSet corresponding to specific SRS-ResourceId or specific SRS-ResourceSetId may be implicitly defined in the standard. Table 37 shows a case where SRS-ResourceSet is configured in an explicit configuration method. However, the disclosure is not limited thereto, and one SRS resource may be explicitly configured in CSI-ReportConfig as described above.

TABLE 37

| CSI-ReportConfig ::= | SEQUENCE { | |
|---|---|---|
| reportConfigId | CSI-ReportConfigId, | |
| carrier | ServCellIndex | OPTIONAL, -- Need S |
| resourcesForChannelMeasurement | CSI-ResourceConfigId, | |
| csi-IM-ResourcesForInterference Need R | CSI-ResourceConfigId | OPTIONAL, -- |
| nzp-CSI-RS-ResourcesForInterference Need R | CSI-ResourceConfigId | OPTIONAL, -- |
| SRS-ResourcesForInterference Need R | SRS-ResourceSetId | OPTIONAL, -- |
| ... | | |
| } | | |

In Embodiment 5-1, a resource configuration method for improved L1-SINR measurement and reporting for an XDD system will be described. In Embodiment 5-2, an improved L1-SINR reporting method for an XDD system will be described. In Embodiment 5-3, a restriction configuration and defining method of improved L1-SINR measurement for an XDD system will be described.

Embodiment 5-1: Resource Configuration Method for Improved L-SINR Measurement and Reporting for an XDD System In an embodiment of the disclosure, a channel measurement and/or interference measurement resource configuration method for improved L1-SINR measurement and reporting for an XDD system will be described. A channel measurement and/or interference measurement resource configuration method for improved L1-SINR measurement and reporting may consider one of the following methods, and a corresponding method may be specified and pre-defined in the standard, may be configured through higher layer signaling, may be indicated through L1 signaling, or may be configured and indicated through higher layer signaling and L1 signaling. Also, individual UE capability reporting for supporting each following method may be defined, and corresponding UE capability reporting may not be essential.

[Method 5-1-1]

When two resource settings are configured in CSI-ReportConfig that is higher layer signaling for improved L1-SINR measurement, the first resource setting (e.g., resourcesForChannelMeasurement that is higher layer signaling) may be an SSB or NZP CSI-RS for channel measurement, and the second resource setting may be one SRS resource for interference measurement, may be a list referring to a plurality of SRS resources, or may be an SRS resource set including a plurality of SRS resources. Also, it may be additionally assumed that one or multiple SRS In this case, an SSB or NZP CSI-RS for channel measurement may be explicitly configured in CSI-ReportConfig, or may be connected to one SRS resource for interference measurement having implicit connection, a list including a plurality of SRS resources, or an SRS resource set including a plurality of SRS resources. The number of SSBs or NZP CSI-RSs for channel measurement may be the same as the number of SRS resources having explicit or implicit connection (e.g., which will be described as a one-to-one connection relationship), or may be less than the number of SRS resources (e.g., which will be described as a one-to-many connection relationship). In the one-to-one connection relationship, the UE may consider only one SRS resource for one SSB or NZP CSI-RS during uplink interference measurement, and in the one-to-many connection relationship, the UE may consider a plurality of SRS resources for one SSB or NZP CSI-RS during uplink interference measurement, to calculate an L1-SINR. In this case, the UE may calculate an L1-SINR considering different uplink transmission beams of different SRS resources, may determine the influence of an uplink transmission beam, and may report a determination result to the base station.

An SRS resource that is in a one-to-one or one-to-many connection relationship with an SSB or NZP CSI-RS for channel measurement may not refer to configuration for an SRS resource transmitted by a corresponding UE but may refer to configuration of an SRS resource transmitted by another UE. That is, when another UE transmits an SRS resource as uplink and a corresponding UE receives a downlink signal, it may be interference received as CLI. Accordingly, one or multiple SRS resources may be defined assuming that they are received by a corresponding UE.

In this case, when the UE receives an SRS resource that is in a one-to-one or one-to-many connection relationship with an SSB or NZP CSI-RS for channel measurement, a reference RS for QCL-TypeD of an SSB for channel measurement or an NZP CSI-RS for channel measurement may be used.

Also, the UE may expect that repetition that is higher layer signaling is configured for an NZP CSI-RS resource set for channel measurement. That is, the NZP CSI-RS resource set for channel measurement may be used for beam management. Also, the UE may expect that usage of an SRS resource set including SRS resources for interference measurement is configured as beammanagement, and another configuration value (e.g., codebook, non-codebook, or antennaswitching) may not be excluded.

[Method 5-1-2]

When three resource settings are configured in CSI-ReportConfig that is higher layer signaling for improved L1-SINR measurement, the first resource setting (e.g., resourcesForChannelMeasurement that is higher layer signaling) may be an SSB or NZP CSI-RS for channel measurement, the second resource setting (e.g., csi-IM-ResourcesForInterference or nzp-CSI-RS-ResourcesForInterference that is higher layer signaling) may be a CSI-IM for interference measurement or an NZP CSI-RS having a port number of 1 and a density value of 3 REs/RB, and the third resource setting may be one SRS resource for interference measurement, a list referring to a plurality of SRS resources, or an SRS resource set including a plurality of SRS resources. Also, it may be additionally assumed that one or multiple SRS resources for interference measurement corresponding to the second resource setting have a port number of 1 or are configured with SRS-SpatialRelationInfo that is higher layer signaling. In this case, an SSB or NZP CSI-RS for channel measurement may be connected to one CSI-IM resource or one NZP CSI-RS for interference measurement in the same resource set. The number of SSBs or NZP CSI-RSs for channel measurement may be the same as the number of CSI-IMs or NZP CSI-RSs for interference measurement.

In this case, an SSB or NZP CSI-RS for channel measurement may be connected to one CSI-IM resource or one NZP CSI-RS for interference measurement in the same resource set. The number of SSBs or NZP CSI-RSs for channel measurement may be the same as the number of CSI-IMs or NZP CSI-RSs for interference measurement. Also, the third resource setting may be explicitly configured in CSI-ReportConfig that is higher layer signaling as shown in Table 37, and connection between CSI-ReportConfig corresponding to specific CSI-ReportConfigId and SRS resource or SRS-ResourceSet corresponding to specific SRS-ResourceId or specific SRS-ResourceSetId may be implicitly defined in the standard.

Also, connection between a pair of the first and second resource settings and the third resource setting may have a one-to-one or one-to-many connection relationship as shown in [Method 5-1-1]. That is, a pair of an SSB or NZP CSI-RS for channel measurement which is the first resource setting and a CSI-IMs or NZP CSI-RS for interference measurement which is the second resource setting, and one or multiple SRS resources which is the third resource setting may have a one-to-one or one-to-many connection relationship. In particular, when a specific downlink transmission beam is used through the one-to-many connection relationship, the degree of interference of different uplink transmission beams may be measured through L1-SINR calculation.

An SRS resource that is in a one-to-one or one-to-many connection relationship with an SSB or NZP CSI-RS for channel measurement may not refer to a configuration for an SRS resource transmitted by the UE but may refer to a configuration for an SRS resource transmitted by another UE. That is, when another UE transmits an SRS resource as uplink and a corresponding UE receives a downlink signal, it may refer to interference received as CLI. Accordingly, one or multiple SRS resources may be defined assuming that they are received by a corresponding UE.

In this case, when the UE determines a reference RS for QCL-TypeD of a CSI-IM or an NZP CSI-RS for interference measurement which is connected to an SSB or NZP CSI-RS for channel measurement, the UE may use a reference RS for QCL-TypeD of the SSB for channel measurement or the NZP CSI-RS for channel measurement.

Also, when the UE receives an SRS resource that is in a one-to-one or one-to-many connection relationship with a pair of an SSB or NZP CSI-RS for channel measurement and a CSI-IM or NZP CSI-RS for interference measurement, the UE may use a reference RS for QCL-TypeD of the SSB for channel measurement or the NZP CSI-RS for channel measurement.

Also, the UE may expect that repetition that is higher layer signaling is configured for an NZP CSI-RS resource set for channel measurement and/or an NZP CSI-RS resource set for interference measurement. That is, the NZP CSI-RS resource set for channel measurement may be used for beam management. Also, the UE may expect that usage of an SRS resource set including SRS resources for interference measurement is configured as beammanagement, and another configuration value (e.g., codebook, non-codebook, or antennaswitching) may not be excluded.

Embodiment 5-2: Improved L1-SINR Reporting Method for an XDD System

In an embodiment of the disclosure, an improved L1-SINR reporting method for an XDD system will be described. For improved L1-SINR reporting, methods in [Consideration 5-2-1] through [Consideration 5-2-3] may be used, and a method that may be used for each consideration may be specified and pre-defined in the standard, may be configured through higher layer signaling, may be indicated through L1 signaling, or may be configured and indicated through higher layer signaling and L1 signaling. Also, individual UE capability reporting for supporting each method for each following consideration may be defined or UE capability reporting may be defined for each consideration, and corresponding UE capability reporting may not be essential.

[Consideration 5-2-1] Frequency Unit of L1-SINR Reporting

A first consideration is a frequency unit that may be used during L1-SINR measurement and reporting. As a frequency unit that may be used when an L1-SINR is measured and reported, a wideband (WB) or subband (SB) may be considered. A WB may be a method of deriving and reporting one L1-SINR for a specific band from among bands in which an SSB or NZP CSI-RS for channel measurement, a CSI-IM or NZP CSI-RS for interference measurement, and an SRS resource for interference measurement are transmitted. In this case, the specific band will be described in detail with reference to FIG. 18.

Figure 18:
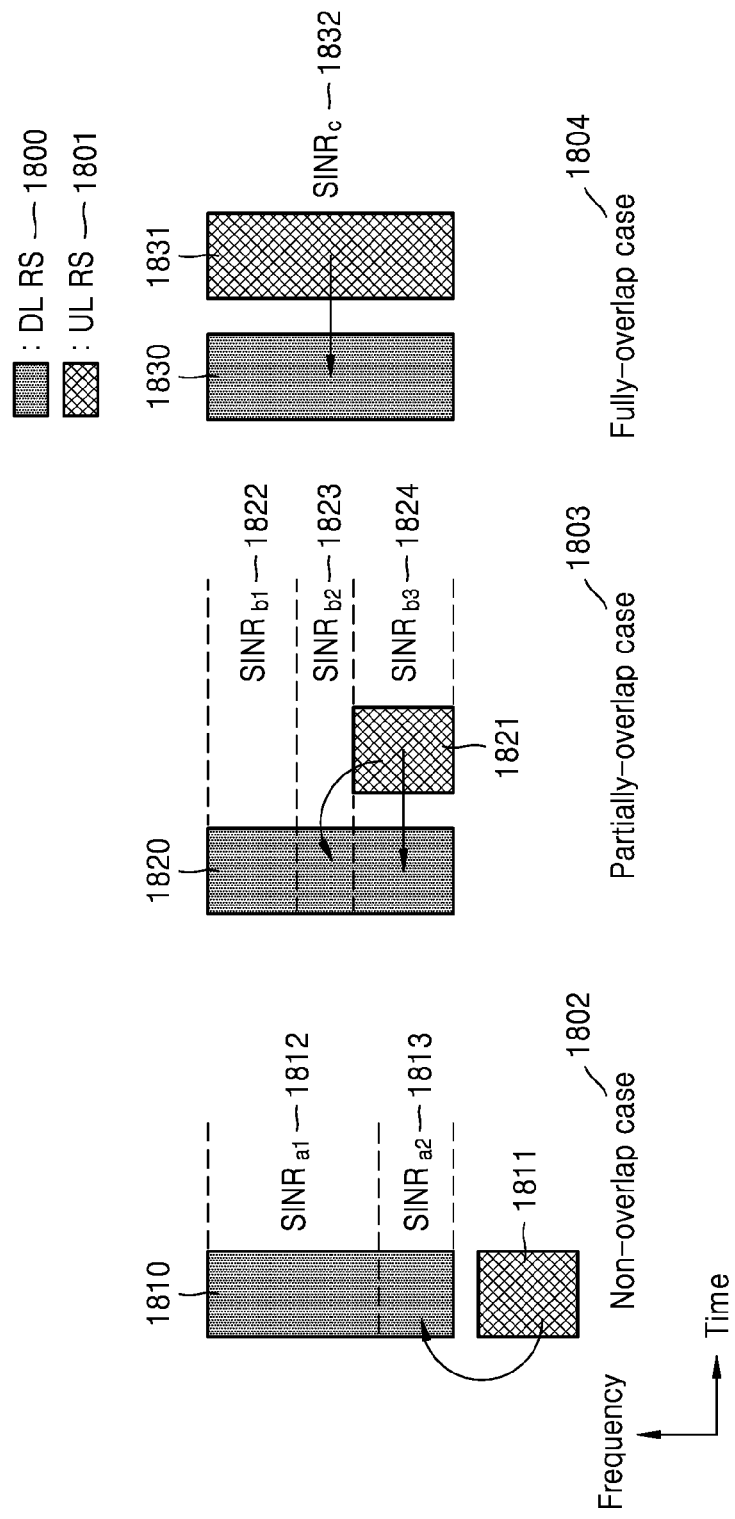
FIG. 18 illustrates a diagram of resource setting for layer 1 based signal to interference plus noise ratio (L1-SINR) measurement and reporting and wideband (WB) and subband (SB) L1-SINR measurement situations according to frequency bands, according to an embodiment of the disclosure.

FIG. 18 illustrates a diagram of resource setting for L1-SINR measurement and reporting and WB and SB L1-SINR measurement situations according to frequency bands, according to an embodiment of the disclosure. In FIG. 18, a downlink RS 1800 may include an SSB or NZP CSI-RS for channel measurement and a CSI-IM or NZP CSI-RS for interference measurement, and an uplink RS 1801 may include an SRS resource for interference measurement. A non-overlap case 1802, a partially-overlap case 1803, and a fully-overlap case 1804 may be divided and considered, according to a bandwidth of a frequency domain of a downlink RS and an uplink RS during L1-SINR measurement and reporting.

In the non-overlap case 1802, because transmission bands of a downlink RS 1810 and an uplink RS 1811 do not overlap, the non-overlap case 1802 may be suitable for L1-SINR measurement and reporting required for base station operation in an XDD system. In the non-overlap case 1802, when the uplink RS 1811 interferes with the downlink RS 1810, there may be a difference between $SINR_{a1}$ 1812 that is an L1-SINR at a frequency position far from the uplink RS 1811 and $SINR_{a2}$ 1813 that is an L1-SINR at a frequency position close to the uplink RS 1811. Accordingly, the difference between $SINR_{a1}$ and $SINR_{a2}$ may increase according which uplink transmission beam is used by the uplink RS 1811. Accordingly, in this case, both WB and SB L1-SINR measurement and reporting may be required.

In the partially-overlap case 1803, because transmission bands of a downlink RS 1820 and an uplink RS 1821 partially overlap, the partially-overlap case 1803 may be suitable for L1-SINR measurement and reporting required for base station operation in XDD and full-duplex systems. In the partially-overlap case 1803, when the uplink RS 1821 interferes with the downlink RS 1820, $SINR_{b1}$ 1822 that is an L1-SINR at a frequency position farthest from the uplink RS 1821, $SINR_{b2}$ 1823 that is an L1-SINR at a frequency position that is close to the uplink RS 1821, and $SINR_{b3}$ 1824 that is an L1-SINR at the same frequency position may have different values, and a difference between values may increase according to which uplink transmission beam is used by the uplink RS 1821. Accordingly, in this case, WB and multiple SB L1-SINR measurement and reporting may be required.

In the fully-overlap case 1804, because transmission bands of a downlink RS 1830 and an uplink RS 1831 are the same, the fully-overlap case 1804 may be suitable for L1-SINR measurement and reporting required during base station operation in a full-duplex system. In the fully-overlap case 1804, when the uplink RS 1831 interferes with the downlink RS 1830, SINRc 1832 that is an L1-SINR at the same frequency position as the uplink RS 1831 may be measured, and may vary according to which uplink transmission beam is used by the uplink RS 1821. Accordingly, in this case, WB L1-SINR measurement and reporting may be required.

According to the description of each case of FIG. 18, various methods of determining a frequency unit of L1-SINR reporting may be considered.

[Method 5-2-1-1] WB L1-SINR Reporting

The UE may report only a WB L1-SINR by considering case 3 in FIG. 18. Alternatively, even when case 1 or case 2 of FIG. 18 is considered, only a WB L1-SINR may be reported.

[Method 5-2-1-2] WB L1-SINR and One or Multiple SB L1-SINR Reporting

The UE may report a WB L1-SINR by considering case 1 and 2 of FIG. 18, and may report one or multiple SB L1-SINRs by considering that the amount of interference occurring due to uplink transmission is differently received for each frequency domain.

[Method 5-2-1-3] Multiple SB L1-SINR Reporting

The UE may report one or multiple SB L1-SINRs by considering that the amount of interference occurring due to uplink transmission is differently received for each frequency domain in consideration of case 1 and case 2 of FIG. 18. In this case, when it is determined that only calculation of an L1-SINR for each SB is important, a WB L1-SINR may not be reported.

[Consideration 5-2-2] Quantization Level (L1-SINR and/or Differential L1-SINR)

A second consideration is a quantization level that may be used during L1-SINR measurement and reporting. A quantization level that may be used when an L1-SINR is measured and reported may be a 7-bit quantization method or a 4-bit quantization method for quantizing a differential L1-SINR, and the following detailed methods may be considered.

[Method 5-2-2-1] Using 7-Bit Quantization (L1-SINR)

Even when a plurality of L1-SINRs are reported, a method of quantizing all of the L1-SINRs to 7 bits may be used. This method may be a method of quantizing all L1-SINRs to 7 bits because, when a difference between the L1-SINRs is very large, accuracy may be reduced during differential L1-SINR calculation. In 7-bit quantization, [−23, 40] dB that is a 7-bit quantization range of an existing L1-SINR may be quantized in units of 1 dB. Also, unlike the existing L1-SINR, in 7-bit quantization, a range of [X, Y] dB may be quantized and used in units of 1 dB, and because interference received from uplink transmission is additionally reflected, X and Y values less than X=−23 and Y=40 used in the existing L1-SINR may be used.

[Method 5-2-2-2] Using 7-Bit Quantization and 4-Bit Quantization (L1-SINR, Differential L1-SINR)

When a plurality of L1-SINRs are reported, a specific reference value may be quantized to 7 bits and the remaining L1-SINRs may be reported by quantizing a difference from the reference L1-SINR (differential L1-SINR) to 4 bits in units of 0.5 dB. In 7-bit quantization, [−23, 40] dB that is a 7-bit quantization range of an existing L1-SINR may be quantized in units of 1 dB. Also, unlike the existing L1-SINR, in 7-bit quantization, a range of [X, Y] dB may be quantized and used in units of 1 dB, and because interference received from uplink transmission is additionally reflected, X and Y values less than X=−23 and Y=40 used in the existing L1-SINR may be used. An existing 1 dB unit value may be adjusted during 4-bit quantization for a differential L1-SINR (e.g., 2 dB unit), and the adjustment may be defined in the standard or may be configured through higher layer signaling.

[Consideration 5-2-3] Measurement Resource Index Reporting

A third consideration is whether an index of a measurement resource may be reported during L1-SINR measurement and reporting. The UE may not only report a CRI or SSBRI that is an index of an SSB or NZP CSI-RS for channel measurement during L1-SINR measurement and reporting, but also report an index of an SRS resource for interference measurement (e.g., SRI or SRSRI), so that the base station recognizes which L1-SINR is derived from which combination of uplink and downlink transmission beams.

[Method 5-2-3-1] One or Multiple CRI or SSBRI Reporting

The UE may report one or multiple CRI or SSBRIs. For example, when the UE is configured with four NZP CSI-RS resources 1 through 4 for channel measurement and additionally configured with an SRS resource corresponding thereto in a one-to-one manner, to derive an L1-SINR, the UE may calculate $CRI_1$, $CRI_2$, $CRI_3$, $CRI_4$, and an L1-SINR corresponding to each CRI value and may report the same to the base station.

[Method 5-2-3-2] One or Multiple CRI or SSBRI Reporting and One SRI (or SRSRI) Reporting Corresponding to Each CRI or SSBRI The UE may report one or multiple CRIs or SSBRIs, and may additionally report one SRI (or SRSRI) corresponding to each reported CRI or SSBRI. For example, when the UE is configured with four NZP CSI-RS resources 1 through 4 for channel measurement, and may be additionally configured with SRS resources 1 through 4 connected thereto in a one-to-one manner, to derive an L1-SINR, the UE may report four pairs such as $CRI_1$-$SRI_1$, $CRI_2$-$SRI_2$, $CRI_3$-$SRI_3$, and $CRI_4$-$SRI_4$. In another example, the UE may be configured with four NZP CSI-RS resources for channel measurement and may be additionally configured with SRS resources 1 through 8 connected thereto in a one-to-many manner (e.g., 1-to-2 manner), to derive L1-SINR, and may assume that an NZP CSI-RS resource n and SRS resources 2n−1 and 2n are connected to each other (n=1,2,3,4). In this case, the UE may report four pairs such as $CRI_1$-$SRI_1$, $CRI_2$-$SRI_4$, $CRI_3$-$SRI_5$, and $CRI_4$-$SRI_8$, and may calculate an L1-SINR corresponding to each pair and may report the L1-SINR to the base station.

[Method 5-2-3-3] One CRI or SSBRI Reporting and Multiple SRI (or SRSRI) Reporting Corresponding to the CRI or SSBRI The UE may report one CRI or SSBRI, and may additionally report a plurality of SRIs (or SRSRIs) corresponding to each reported CRI or SSBRI. For example, when the UE is configured with one NZP CSI-RS resource 1 for channel measurement and is additionally configured with SRS resources 1 through 4 connected thereto in a one-to-many manner (e g, 1-to-4 manner), to derive L1-SINR, the UE may report four pairs such as $CRI_1$-$SRI_1$, $CRI_2$-$SRI_2$, $CRI_3$-$SRI_3$, and $CRI_4$-$SRI_4$ and may calculate an L1-SINR corresponding to each pair and may report the L1-SINR to the base station.

A final L1-SINR reporting method may be determined, according to a combination of sub-methods for each consideration described above. For example, when [Method 5-2-1-2] is used for [Consideration 5-2-1], [Method 5-2-2-2] is used for [Consideration 5-2-2], and [Method 5-2-3-3] is used for [consideration 5-2-3], the UE may report $CRI_1$-$SRI_1$ rough $CRI_1$-$SRI_4$ by considering four SRIs (or SRSRIs) for one CRI and may report a WB L1-SINR and one SB L1-SINR for each CRI-SRI pair, and may quantize the WB L1-SINR to 7 bits for each CRI-SRI pair and may quantize the SB L1-SINR to 4 bits by calculating the SB L1-SINR as a differential L1-SINR based on the WB L1-SINR. A combination of methods for each consideration is merely an example, and other combinations may be considered. Also, as an L1-SINR reporting method, one of all or a limited number of combinations (e.g., only four possible combinations that are part of all cases) may be configured through higher layer signaling, may be indicated through L1 signaling, may be configured and indicated in a combination of higher layer signaling and L1 signaling, or may be pre-defined in the standard.

Embodiment 5-3: Restriction Configuration and Defining Method During Improved L-SINR Measurement for an XDD System In an embodiment of the disclosure, a restriction configuration and defining method of improved L1-SINR measurement for an XDD system will be described.

When two or three resource settings are configured for improved L1-SINR measurement for an XDD system, time restriction for channel measurement or interference measurement described below may be considered.

When timeRestrictionForChannelMeasurements in CSI-ReportConfig that is higher layer signaling is configured as 'notConfigured', the UE should derive channel measurement for L1-SINR calculation to be reported in an nth uplink sot, based on an SSB or NZP CSI-RS that may be received prior to a CSI reference resource connected to the two or three resource settings.

When timeRestrictionForChannelMeasurements in CSI-ReportConfig that is higher layer signaling is configured as 'configured', the UE should derive channel measurement for L1-SINR calculation to be reported in an nth uplink slot, based on a latest one from among SSBs or NZP CSI-RSs that may be received prior to a CSI reference resource connected to the two or three resource settings.

When timeRestrictionForInterferenceMeasurements in CSI-ReportConfig that is higher layer signaling is configured as 'notConfigured', the UE should derive interference measurement for L1-SINR calculation to be reported in an nth uplink slot, based on a CSI-IM or an NZP CSI-RS for interference measurement which may be received prior to a CSI reference resource connected to the two or three resource settings. Also, the UE should derive interference measurement for L1-SINR calculation to be reported in an nth uplink slot, based on an SRS resource that may be received prior to a CSI reference resource connected to the two or three resource settings, and a configuration condition for higher layer signaling in this case may be that timeRestrictionForInterferenceMeasurements in CSI-ReportConfig is configured as 'notConfigured', corresponding configuration information is configured as 'notConfigured' through timeRestrictionForInterferenceMeasurements in CSI-Report and other higher layer configuration information (e.g., timeRestrictionForInterferenceMeasurements-UL), or there is no configuration value.

When timeRestrictionForChannelMeasurements in CSI-ReportConfig that is higher layer signaling is configured as 'configured', the UE should derive interference measurement for L1-SINR calculation to be reported in an nth uplink slot, based on a latest one from among CSI-IMs or NZP CSI-RSs for interference measurement which may be received prior to a CSI reference resource connected to the two or three resource settings. Also, the UE should derive interference measurement for L1-SINR calculation to be reported in an nth uplink slot, based on a latest one from among SRS resources that may be received prior to a CSI reference resource connected to the two or three resource settings, and a configuration condition of higher layer signaling in this case may be that timeRestrictionForInterferenceMeasurements in CSI-ReportConfig is configured as 'notConfigured', corresponding configuration information is configured as 'notConfigured' through timeRestrictionForInterferenceMeasurements in CSI-Report and other higher layer configuration information (e.g., timeRestrictionForInterferenceMeasurements-UL), or there is no configuration value.

Figure 19:
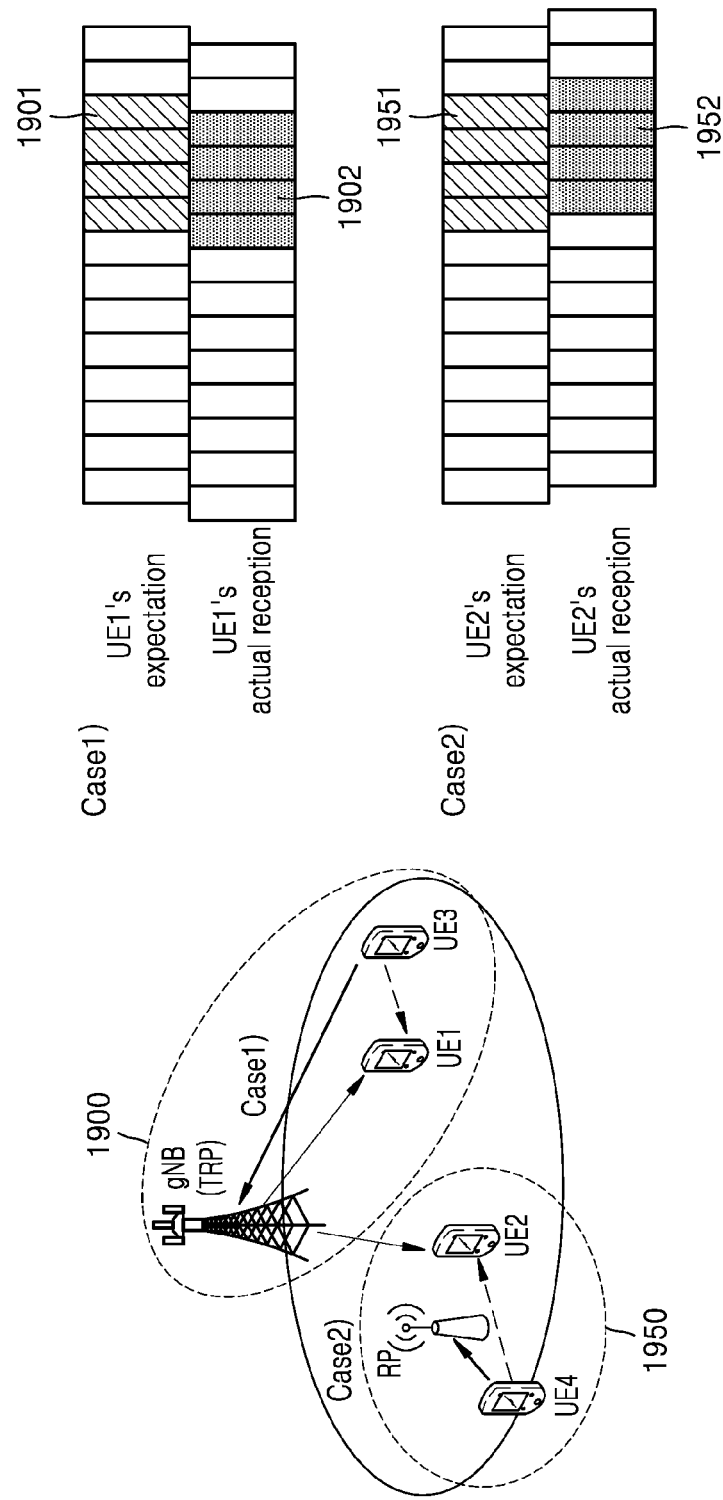
FIG. 19 illustrates a diagram of two cases that may occur during sounding reference signal (SRS) measurement in a UE, according to an embodiment of the disclosure.

FIG. 19 illustrates a diagram of two cases that may occur during SRS measurement in a UE, according to an embodiment of the disclosure. In Case 1 1900 in FIG. 19, in the same time resource, UE1 receives a downlink signal from a base station and UE3 transmits an uplink to the base station. In this situation, a distance between UE1 and UE3 is less than a distance between the base station and the UE3, a time point 1902 at which UE1 actually receives may be earlier than a time position 1901 for SRS resource transmission of UE3 expected by UE1. In contrast, in Case 2 1950, UE2 receives a downlink signal on the same time resource from the base station and UE4 transmits an uplink to a nearby reception point (RP). In this situation, because a distance between the RP and UE4 is less than a distance between UE2 and UE4, a time 1952 at which UE2 actually receives may be later than a time position 1951 for SRS resource transmission of UE4 expected by UE2. For two cases, the UE may perform only for some symbols in a time position for SRS resource reception configured through higher layer signaling.

For example, as shown in Case 1 1900 of FIG. 19, when the UE receives SRS resource earlier than a time position for SRS resource reception configured through higher layer signaling, a measurement result for an SRS resource received in a last symbol in the time position for SRS reception may not be included in L1-SINR calculation.

In another example, as shown in Case 2 1950 of FIG. 19, when the UE receives SRS resource later than a time position for SRS resource reception configured through higher layer signaling, a measurement result for an SRS resource received in a first symbol in the time position for SRS reception may not be included in L1-SINR calculation.

In another example, when the base station configures information about an SRS resource for a specific UE through higher layer signaling to the UE, by considering that the UE does not measure interference in some OFDM symbols for SRS resource reception in a situation such as Case 1 1900 or Case 2 1950 or does not include it in L1-SINR calculation even when it measures, only information about some symbols may be configured from a time of configuration through higher layer signaling. For example, when the UE should not measure a last OFDM symbol of an SRS resource, the base station may notify configuration information about SRS resource transmission to the UE without including information about the last OFDM symbol that is actually transmitted.

Embodiment 6: UE Capability Reporting Method

In an embodiment of the disclosure, the UE may report at least one of the following UE capabilities indicating that operations of the UE in the above embodiments may be performed.

UE capability indicating whether to support an XDD system

UE capability indicating whether to support each resource configuration method in an XDD system UE capability indicating whether to support each frequency band division method in an XDD system UE capability indicating whether to support each uplink/downlink configuration and indicating method in an XDD system UE capability indicating whether to support each BWP configuration and indicating method in an XDD system UE capability indicating whether to support a resource configuration method for improved L1-SINR measurement and reporting in an XDD system UE capability indicating whether to support each improved L1-SINR reporting method in an XDD system UE capability indicating whether to support each restriction configuration and defining method during improved L1-SINR measurement in an XDD system The UE capability may be optional with capability signaling, and may support signaling distinguished according to FR1/FR2. Some or all of the UE capabilities may be included in one feature group, and each UE capability may support individual feature group signaling. The UE capability may support signaling for each UE, each band combination, each band, or each CC.

Figure 20:
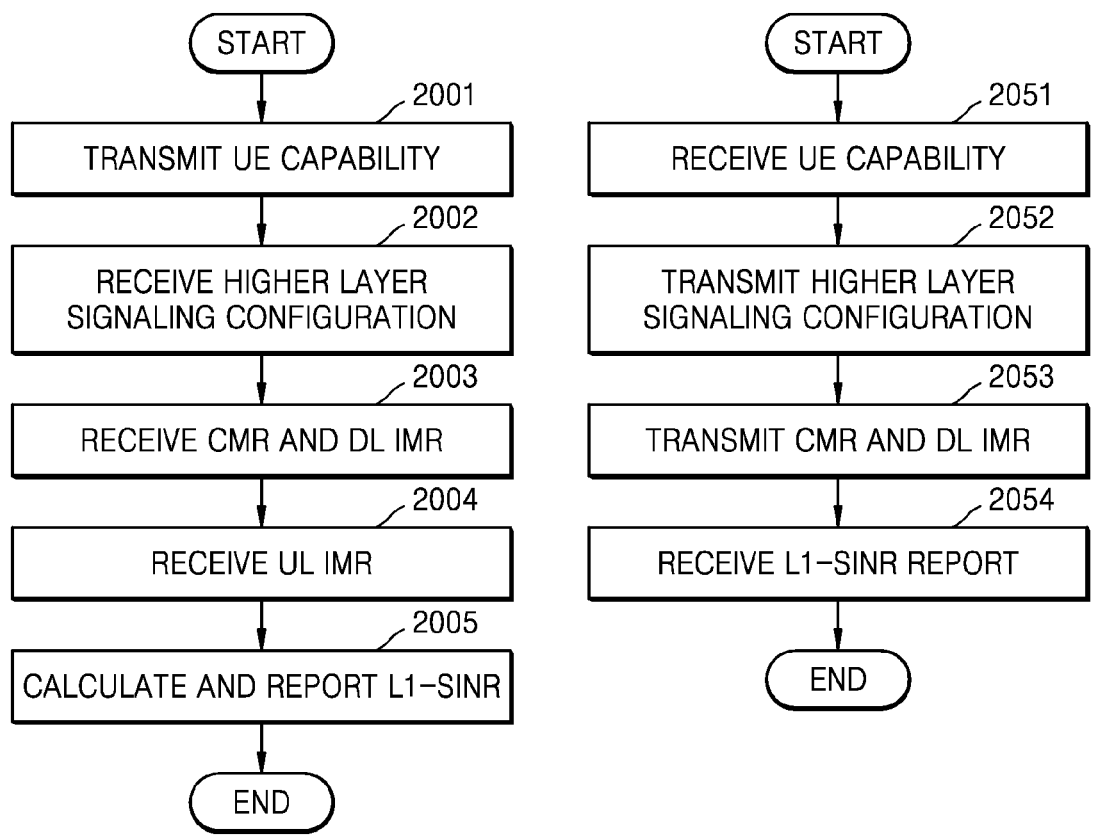
FIG. 20 illustrates a flowchart for describing operations of a UE and a base station for an improved L1-SINR measurement and reporting method, according to an embodiment of the disclosure.

FIG. 20 illustrates a flowchart of operations of a UE and a base station for an improved L1-SINR measurement and reporting method, according to an embodiment of the disclosure.

A UE may transmit at least one UE capability to a base station (2001, 2051). The base station may transmit higher layer signaling configuration to the UE, based on the received UE capability (2002, 2052). In this case, examples of higher layer signaling may include a resource configuration method of an XDD system, a frequency band division method, an uplink/downlink configuration method, a resource configuration method for improved L1-SINR measurement and reporting ([Method 5-1-1] or [Method 5-1-2]), and an improved L1-SINR reporting method (one of [Method 5-2-1-1] through [Method 5-2-1-2] for a frequency unit of L1-SINR reporting which is [Consideration 5-2-1], [Method 5-2-2-1] or [Method 5-2-2-2] for determining a quantization level that is [Consideration 5-2-2], and one of [Method 5-2-3-1] through [Method 5-2-3-3] for reporting a measurement resource index that is [Consideration 5-2-3].

According to an embodiment of the disclosure, the base station may transmit, to the UE, a channel measurement resource (CMR) and a downlink interference measurement resource (DL IMR) based on the higher layer signaling, and the UE may receive the CMR and the DL IMR according to corresponding configuration (2003, 2053). Also, the UE may receive an uplink interference measurement resource (UL IMR) from another UE based on the higher layer signaling (2004). Next, the UE may calculate an L1-SINR based on the received downlink CMR, downlink IMR, and uplink IMR, and may report the L1-SINR to the base station through the configured higher layer signaling (2005, 2054). The base station may perform scheduling for downlink and uplink transmission beams for the UE receiving a downlink signal or the UE transmitting an uplink signal based on the reported L1-SINR.

Figure 21:
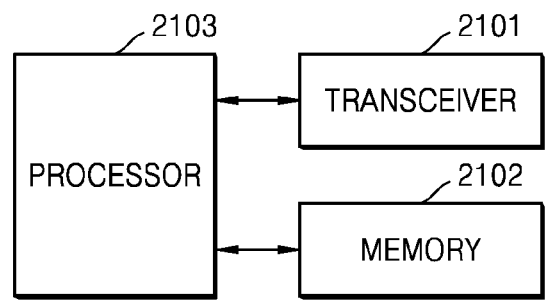
FIG. 21 illustrates a block diagram of a structure of a UE, according to an embodiment of the disclosure.

FIG. 21 illustrates a block diagram of a structure of a UE, according to an embodiment of the disclosure.

Referring to FIG. 21, a UE may include a transceiver 2101, a memory 2102, and a processor 2103. However, elements of the UE are not limited thereto. For example, the UE may include more or fewer elements than those illustrated in FIG. 21. In addition, at least some or all of the transceiver 2101, the memory 2102, and the processor 2103 may be implemented as one chip.

In an embodiment of the disclosure, the transceiver 2101 may transmit and receive a signal to and from a base station. The signal may include control information and data. To this end, the transceiver 2101 may include a radio frequency (RF) transmitter for up-converting and amplifying a frequency of a transmitted signal, and a RF receiver for low-noise amplifying and down-converting a frequency of a received signal. Also, the transceiver 2101 may receive a signal through a radio channel, output the received signal to the processor 2103, and transmit an output signal of the processor 2103 through a radio channel.

According to an embodiment of the disclosure, the memory 2102 may store programs and data required for operations of the UE. Also, the memory 1202 may store control information or data included in signals transmitted and received by the UE. The memory 2102 may include a storage medium, such as a read-only memory (ROM), a random-access memory (RAM), a hard disk, a compact disc (CD)-ROM, or a digital versatile disk (DVD), or a combination of storage media. Also, the memory 2102 may include a plurality of memories. According to an embodiment of the disclosure, the memory 2102 may store a program for executing an operation for power saving of the UE.

According to an embodiment of the disclosure, the processor 2103 may control a series of processes so that the UE operates according to the above embodiments of the disclosure. In an embodiment of the disclosure, the processor 2103 may execute the program stored in the memory 2102, to receive information such as configuration for CA, BWP configuration, SRS configuration, and PDCCH configuration from the base station, and to control a dormant cell operation based on the configuration information.

Figure 22:
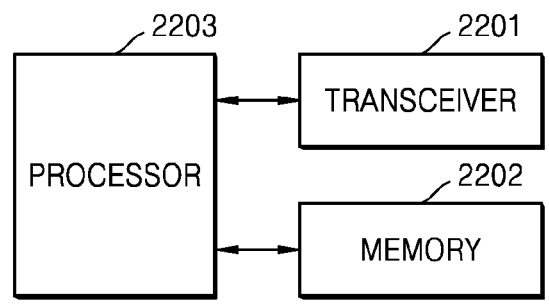
FIG. 22 illustrates a block diagram of a structure of a base station, according to an embodiment of the disclosure.

FIG. 22 illustrates a block diagram of a structure of a base station according to an embodiment of the disclosure.

Referring to FIG. 22, a base station may include a transceiver 2201, a memory 2202, and a processor 2203. However, elements of the base station are not limited thereto. For example, the base station may include more or fewer elements than those illustrated in FIG. 22. Also, the transceiver 2201, the memory 2202, and the processor 2203 of the base station may be implemented as one chip.

According to an embodiment of the disclosure, the transceiver 2201 may transmit and receive signals to and from a UE. The signal may include control information and data. To this end, the transceiver 2201 may include a radio-frequency (RF) transmitter for up-converting and amplifying a frequency of a transmitted signal, and a RF receiver for low-noise amplifying and down-converting a frequency of a received signal. Furthermore, the transceiver 2201 may receive a signal through a radio channel, output the received signal to the processor 2203, and transmit an output signal of the processor 2203 through a radio channel.

According to an embodiment of the disclosure, the memory 2202 may store programs and data required for operations of the base station. Furthermore, the memory 2202 may store control information or data included in signals transmitted or received by the based station. The memory 2202 may include a storage medium such as a ROM, a RAM, a hard disk, a CD-ROM, or a DVD, or a combination of storage media. Also, the memory 2202 may include a plurality of memories. According to an embodiment of the disclosure, the memory 2202 may store a program for executing an operation for power saving of the base station.

According to an embodiment of the disclosure, the processor 2203 may control a series of processes so that the base station operates according to the above embodiments of the disclosure. In an embodiment of the disclosure, the processor 2203 may execute the program stored in the memory 2202, to transmit information such as configuration for CA, BWP configuration, SRS configuration, and PDCCH configuration to the UE, and to control a dormant cell operation of the UE based on the configuration information.

Methods according to the claims of the disclosure or the embodiments described in the specification may be implemented in hardware, software, or a combination of hardware and software.

When the methods are implemented as software, a computer-readable storage medium or a computer program product storing one or more programs (software modules) may be provided. The one or more programs that are stored in the computer-readable storage medium or the computer program product are configured to be executable by one or more processors in an electronic device. The one or more programs include instructions for allowing the electronic device to execute the methods according to the claims or the embodiments of the disclosure.

The programs (e.g., software modules or software) may be stored in a non-volatile memory including a random access memory (RAM) or a flash memory, a read-only memory (ROM), an electrically erasable programmable read-only memory (EEPROM), a magnetic disc storage device, a compact disc-ROM (CD-ROM), a digital versatile disk (DVD), another optical storage device, or a magnetic cassette. Alternatively, the programs may be stored in a memory including any combination of some or all of the above storage media. Also, each of the memories may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may be connected through an external port to an apparatus for performing an embodiment of the disclosure. Furthermore, an additional storage device on the communication network may access the apparatus for performing an embodiment of the disclosure.

In the afore-described embodiments of the disclosure, an element or elements included in the disclosure are expressed in a singular or plural form according to the described embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

Meanwhile, the embodiments disclosed in the specification and drawings are merely presented to easily describe the technical content of the disclosure and help understanding of the disclosure, and are not intended to limit the scope of the disclosure. Thus, it will be apparent to those of ordinary skill in the art that the disclosure is not limited to the embodiments of the disclosure, which have been provided only for illustrative purposes. Also, the embodiments of the disclosure may be used in combination when necessary. For example, a base station and a UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments of the disclosure may be applied to an LTE, 5G or NR system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first user equipment (UE) for reporting channel state information, the method comprising:
receiving, from a base station, channel measurement resource (CMR) configuration information;
receiving, from the base station, uplink interference measurement resource (UL IMR) configuration information including at least one sounding reference signal (SRS) resource information for measurement of cross link interference (CLI) between at least one second UE and the first UE;
measuring one or more signal to interference pulse noise ratio (SINR) related to a downlink based on at least one downlink reference signal (DL RS) received on a CMR identified from the CMR configuration information and at least one uplink reference signal (UL RS) received on a UL IMR identified from the UL IMR configuration information; and
transmitting, to the base station, information about the measured one or more SINR related to the downlink.

2. The method of claim 1, wherein measuring the SINR comprises:
in case that bandwidths in a frequency domain of the UL RS and the DL RS are non-overlapped, measuring the SINR based on a wideband (WB) frequency unit and a subband (SB) frequency unit,
in case that the bandwidths in the frequency domain of the UL RS and the DL RS are partially overlapped, measuring the SINR based on the WB frequency unit and a plurality of SB frequency units, and
in case that the bandwidths in the frequency domain of the UL RS and the DL RS are fully overlapped, measuring the SINR based on the WB frequency unit.

3. The method of claim 1, wherein the transmitting comprises, in case that a plurality of SINR values are obtained based on the measurement, transmitting information about the plurality of SINR values,
wherein the information about the plurality of SINR values includes,
a 7-bit quantization value for each of the plurality of SINR values, or
a 7-bit quantization value for a reference SINR value and a 4-bit quantization value for a difference between the reference SINR value and other SINR values among the plurality of SINR values.

4. The method of claim 1, further comprising transmitting, to the base station, capability information of the first UE, regarding whether to support a resource for the SINR measurement including the CLI and whether to support reporting of the measured SINR.

5. The method of claim 1, further comprising
receiving, from the base station, downlink interference measurement resource (DL IMR) configuration information, and
wherein the one or more SINR include interference measured based on at least one DL RS based on a DL IMR identified from the DL IMR configuration information.

6. The method of claim 5, wherein the at least one DL RS received on the CMR includes at least one of a synchronization signal/broadcast block (SSB) or a non-zero-power channel state information reference signal (NZP CSI-RS),
the at least one UL RS received on the UL IMR includes a sounding reference signal (SRS), and
the at least one DL RS received on the DL IMR includes at least one of a channel state information interference measurement (CSI-IM) or an NZP CSI-RS.

7. A method performed by a base station of receiving channel state information, the method comprising:
transmitting, to a first user equipment (UE), channel measurement resource (CMR) configuration information; and
receiving, from the first UE, information about one or more signal to interference pulse noise ratio (SINR) related to a downlink,
wherein the one or more SINR related to the downlink are measured at the first UE based on at least one downlink reference signal (DL RS) received on a CMR identified from the CMR configuration information and at least one uplink reference signal (UL RS) received on an uplink interference measurement resource (UL IMR) identified from UL IMR configuration information, and
the UL IMR configuration information including at least one sounding reference signal (SRS) resource information is received at the first UE from the base station for measurement of cross link interference (CLI) between at least one second UE and the first UE.

8. The method of claim 7, wherein:
in case that bandwidths in a frequency domain of the UL RS and the DL RS are non-overlapped, the SINR is measured based on a wideband (WB) frequency unit and a subband (SB) frequency unit,
in case that the bandwidths in the frequency domain of the UL RS and the DL RS are partially overlapped, the SINR is measured based on the WB frequency unit and a plurality of SB frequency units, and
in case that the bandwidths in the frequency domain of the UL RS and the DL RS are fully overlapped, the SINR is measured based on the WB frequency unit.

9. The method of claim 7, wherein the receiving comprises:
in case that a plurality of SINR values are obtained based on the measurement, receiving information about the plurality of SINR values,
wherein the information about the plurality of SINR values includes,
a 7-bit quantization value for each of the plurality of SINR values, or
a 7-bit quantization value for a reference SINR value and a 4-bit quantization value for a difference between the reference SINR value and other SINR values among the plurality of SINR values.

10. The method of claim 7, further comprising receiving, from the first UE, capability information of the first UE, regarding whether to support a resource for the SINR measurement including the CLI and whether to support reporting of the measured SINR.

11. The method of claim 7, further comprising transmitting, to the first UE, downlink interference measurement resource (DL IMR) configuration information, and
wherein the one or more SINR include interference measured based on at least one DL RS received on a DL IMR identified from the DL IMR configuration information.

12. The method of claim 11, wherein:
the at least one DL RS received on the CMR includes at least one of a synchronization signal/broadcast block (SSB) or a non-zero-power channel state information reference signal (NZP CSI-RS), the at least one UL RS received on the UL IMR includes a sounding reference signal (SRS), and
the at least one DL RS received on the DL IMR includes at least one of a channel state information interference measurement (CSI-IM) or an NZP CSI-RS.

13. A first user equipment (UE) configured to report channel state information, the first UE comprising:
a transceiver; and
at least one processor coupled with the transceiver, wherein the at least one processor is configured to:
receive, from a base station, channel measurement resource (CMR) configuration information,
receive, from the base station, uplink interference measurement resource (UL IMR) configuration information including at least one sounding reference signal (SRS) resource information for measurement of cross link interference (CLI) between at least one second UE and the first UE,
measure one or more signal to interference pulse noise ratio (SINR) related to a downlink based on at least one downlink reference signal (DL RS) received on a CMR identified from the CMR configuration information and at least one uplink reference signal (UL RS) received on a UL IMR identified from the UL IMR configuration information; and
transmit, to the base station, information about the measured one or more SINR related to the downlink.

14. The first UE of claim 13, wherein the at least one processor is further configured to:
in case that bandwidths in a frequency domain of the UL RS and the DL RS are non-overlapped, measure the SINR based on a wideband (WB) frequency unit and a subband (SB) frequency unit,
in case that the bandwidths in the frequency domain of the UL RS and the DL RS are partially overlapped, measure the SINR based on the WB frequency unit and a plurality of SB frequency units, and
in case that the bandwidths in the frequency domain of the UL RS and the DL RS are fully overlapped, measuring the SINR based on the WB frequency unit.

15. The first UE of claim 13, wherein the at least one processor is further configured to:
in case that a plurality of SINR values are obtained based on the measurement, transmit information about the plurality of SINR values,
wherein the information about the plurality of SINR values includes,
a 7-bit quantization value for each of the plurality of SINR values, or
a 7-bit quantization value for a reference SINR value and a 4-bit quantization value for a difference between the reference SINR value and other SINR values among the plurality of SINR values.

16. The first UE of claim 13, wherein the at least one processor is further configured to transmit, to the base station, capability information of the first UE, regarding whether to support a resource for the SINR measurement including the CLI and whether to support reporting of the measured SINR.

17. A base station configured to receive channel state information, the base station comprising:
a transceiver; and
at least one processor coupled with the transceiver, wherein the at least one processor is configured to:
transmit, to a first user equipment (UE), channel measurement resource (CMR) configuration information; and
receive, from the first UE, information about one or more signal to interference pulse noise ratio (SINR) related to a downlink,
wherein the one or more SINR related to the downlink are measured at the first UE based on at least one downlink reference signal (DL RS) received on CMR identified from the CMR configuration information and at least one uplink reference signal (UL RS) received on uplink interference measurement resource (UL IMR) identified, from UL IMR configuration information, and
the UL IMR configuration information including at least one sounding reference signal (SRS) resource information is received at the first UE from the base station for measurement of cross link interference (CLI) between at least one second UE and the first UE.

18. The base station of claim 17, wherein
in case that bandwidths in a frequency domain of the UL RS and the DL RS are non-overlapped, the SINR is measured based on a wideband (WB) frequency unit and a subband (SB) frequency unit,
in case that the bandwidths in the frequency domain of the UL RS and the DL RS are partially overlapped, the SINR is measured based on the WB frequency unit and a plurality of SB frequency units, and
in case that the bandwidths in the frequency domain of the UL RS and the DL RS are fully overlapped, the SINR is measured based on the WB frequency unit.

19. The base station of claim 17, wherein in case that a plurality of SINR values are obtained based on the measurement, the processor is further configured to receive information about the plurality of SINR values,
wherein the information about the plurality of SINR values includes,
a 7-bit quantization value for each of the plurality of SINR values, or
a 7-bit quantization value for a reference SINR value and a 4-bit quantization value for a difference between the reference SINR value and other SINR values among the plurality of SINR values.

20. The base station of claim 17, wherein the at least one processor is further configured to receive, from the first UE, capability information of the first UE, regarding whether to support a resource for the SINR measurement including the CLI and whether to support reporting of the measured SINR.

* * * * *